(12) United States Patent
Tanaka et al.

(10) Patent No.: US 6,388,649 B1
(45) Date of Patent: May 14, 2002

(54) SPATIAL LIGHT MODULATOR AND A METHOD FOR DRIVING THE SAME

(75) Inventors: Yukio Tanaka, Kadoma; Akio Takimoto; Koji Akiyama, both of Neyagawa; Yasunori Kuratomi; Junko Asayama, both of Suita; Hisahito Ogawa, Nara-ken, all of (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 08/217,641

(22) Filed: Mar. 24, 1994

(30) Foreign Application Priority Data

| Mar. 26, 1993 | (JP) | ............................................. 5-068525 |
| Apr. 30, 1993 | (JP) | ............................................. 5-104051 |
| Jun. 10, 1993 | (JP) | ............................................. 5-138066 |

(51) Int. Cl.$^7$ ................................................. G09G 3/18
(52) U.S. Cl. .............................. 345/89; 345/94; 345/97
(58) Field of Search .............................. 359/56, 72, 75, 359/71; 345/87, 94, 95, 96, 97, 208, 209, 210, 89; 349/30, 29

(56) References Cited

U.S. PATENT DOCUMENTS

| 4,888,599 A | * 12/1989 | Harwood et al. | ............. 345/89 |
| 4,932,757 A | *  6/1990 | Hanyu et al.   | ............. 359/75 |
| 4,976,515 A | * 12/1990 | Hartmann       | ............. 345/89 |
| 4,984,198 A |    1/1991 | Kobayashi et al. | ......... 365/108 |
| 5,089,812 A | *  2/1992 | Fuse et al.    | ............. 345/89 |
| 5,130,830 A | *  7/1992 | Fukushima et al. | ........... 359/72 |
| 5,178,445 A |    1/1993 | Moddel et al.  | ............. 359/85 |
| 5,231,282 A | *  7/1993 | Nishi et al.   | ............. 359/72 |
| 5,364,668 A | * 11/1994 | Takimoto et al. | ............ 359/75 |

FOREIGN PATENT DOCUMENTS

| EP | 0385346 | 9/1990 | |
| EP | 0494452 | * 7/1992 | ................. 345/97 |
| EP | 0508227 | 10/1992 | |

OTHER PUBLICATIONS

Wen Li et al. "Hydrogenated Amorphous–Silicon Photosensor For Optically Addressed High–Speed Spatial Light Modulator". IEEE Dec., 1989.*

Clark et al, *Appl. Phys. Lett.*, pp. 899–901, Jun. 1, 1980, "Submicrosecond Bistable Electro–Optic Switching in Liquid Crystals."

Killinger et al; *Ferroelectrics*, 1991, vol. 122, pp. 89–99, "Controlling the Grey Level Capacity of a Bistable FLC Spatial Light Modulator."

Hartmann, *J. Appl. Phys.*, 66(3), pp. 1132–1136, Aug. 1, 1989, "Charge–Controlled Phenomena in the Surface–Stabilized Ferroelectric Liquid–Crystal Structure."

Li et al, *IEEE Transactions on Electron Devices*, vol. 36, No. 12, pp. 2959–2964, 12/89, "Hydrogenated Amorphous Silicon Photosensor for Optically Addressed High–Speed Spatial Light Modulator."

(List continued on next page.)

*Primary Examiner*—Lun-Yi Lao
(74) *Attorney, Agent, or Firm*—Renner, Otto, Boisselle & Sklar

(57) ABSTRACT

The disclosed spatial light modulator includes a pair of facing transparent electrodes, and a light-modulating layer and a photoconductive layer provided between the transparent electrodes In the spatial light modulator, the light-modulating layer has different optical states depending on an applied charge amount. Specifically, the light-modulating layer has: a first optical state when the applied charge amount is a first threshold charge amount or more; a second optical state when the applied charge amount is a second threshold charge amount or less; and a spatially uniform intermediate state between the first optical state and the second optical state depending on the applied charge amount. Also, a driving method for such a spatial light modulator is disclosed.

29 Claims, 21 Drawing Sheets

OTHER PUBLICATIONS

Bone et al, *SID 91 Digest,* pp. 254–256, "13.3: Video Rate Photoaddressed Ferroelectric LC Light Valve with Gray Scale."

Takimoto et al, *Journal of Photopolymer Science and Technology,* vol. 3, No. 1, pp. 73–81, 1990, "A Highly Photoconductive Polyimide Film."

Gomes et al, *Japanese Journal of Applied Physics,* vol. 30, No. 3A, pp. L386–L388, 3/91, "Ferroelectric Liquid Crystal Spatial Light Modulator with Gray–Scale Capability."

Search Report for European Appl. 94104695.5, mailed Jul. 28, 1994.

Ikeno et al, "A Ferroelectric LCD with Gray–Scale Capability Using Conventional–CTC Doped and/or Undoped–LB Polyimide Alignment Layers", Tokyo, Univ. of Agriculture, SID 89 Digest, pp. 382–385. (1989).

Landreth et al, "Variable Sensitivity Analog Response from an optically Addressable Spatial Light Modulator", Nevada Sep. 1990, pp. 109–112.

Robinson, "Analog Nonvolatile Data Storage & Update in an Optically Addressed Spatial Light Modulator", 1992 Optical Society of America, pp. 895–897.

Drzaic, "Liquid Crystal Devices & Materials", Feb. 1991, Calif., pp. 190–205.

Fukushima et al, "Ferroelectric Liquid–Crystal Spatial Light Modulator Achieving Bipolar Image Operation & Cascadability," pp. 6859–6866, Allied Optics, Nov. 1992, vol. 31, No. 32.

Chieu et al, "Effect of Alignment & Layer Conductivity on the Bistability of Surface Stabilized Ferroelectric Liquid–Crystal Devices," *Applied Physics,* 1990, pp. 1326–1328.

Xue et al, "The Performance Characteristics of a Ferroelectric Liquid Crystal Light Valve With Pixellated Metal Reflector," Optical Computing & Processing, 1992, vol. 2, No. 2, pp. 107–114.

\* cited by examiner

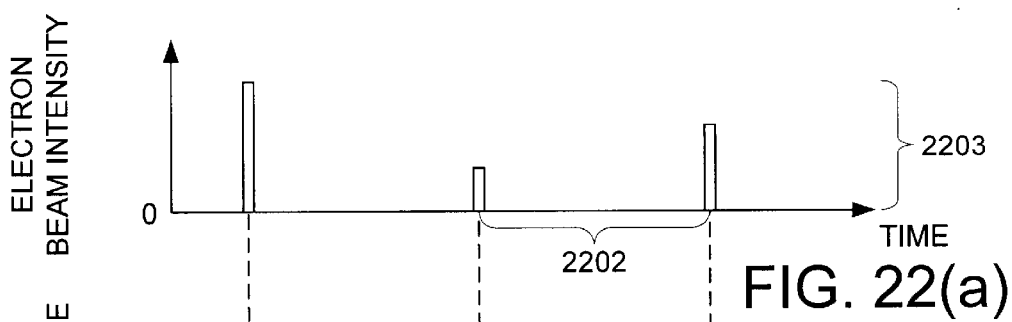
FIG. 22(a)
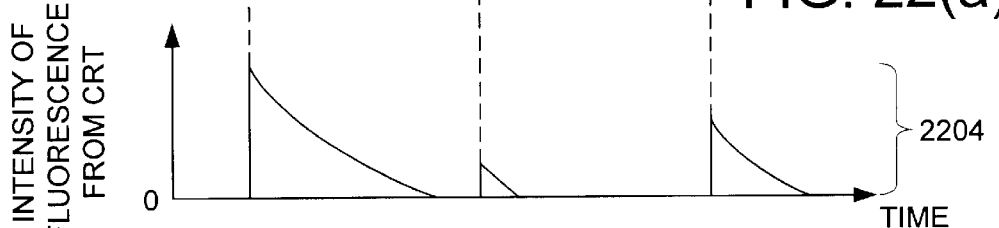
FIG. 22(b)
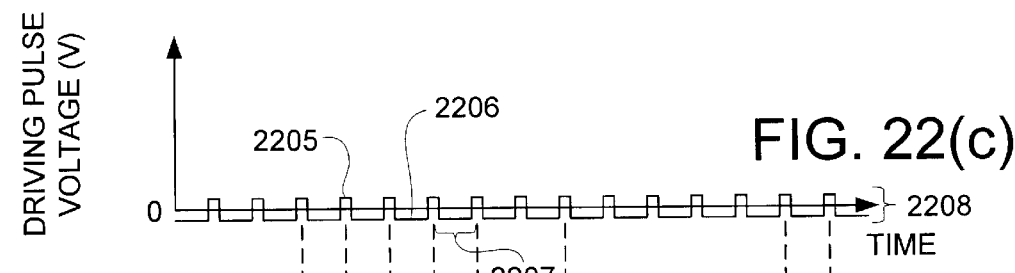
FIG. 22(c)
FIG. 22(d)
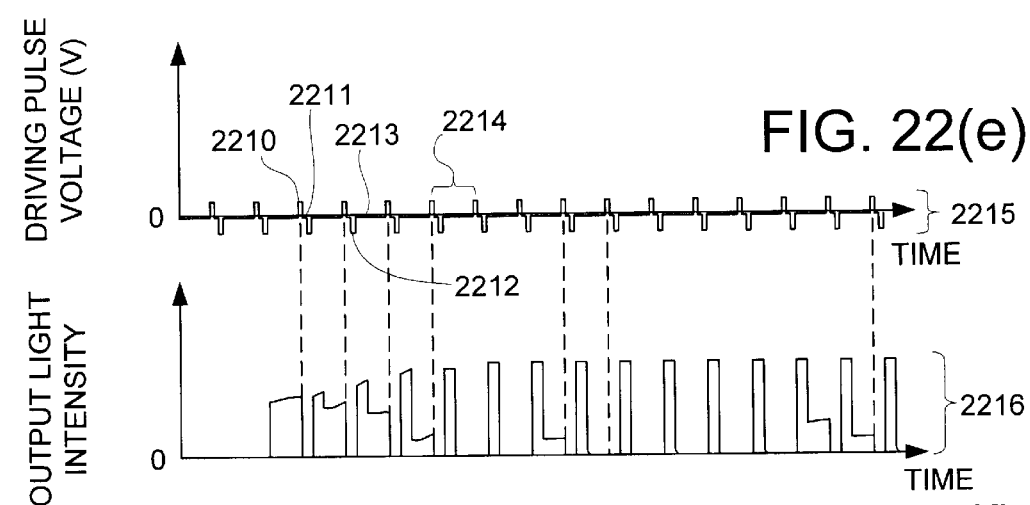
FIG. 22(e)
FIG. 22(f)

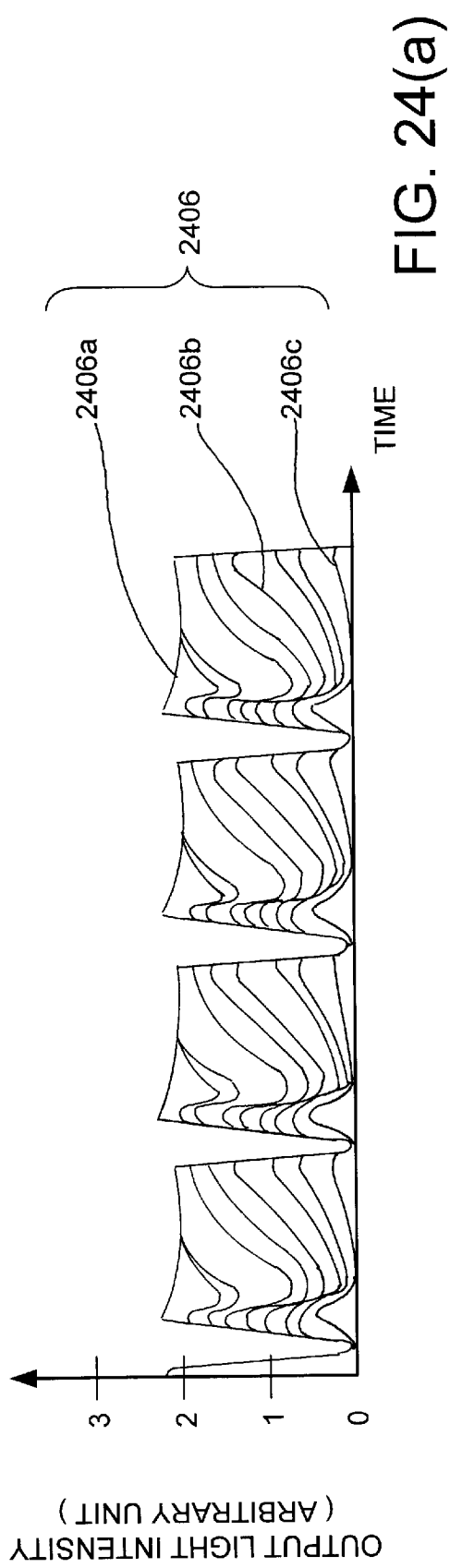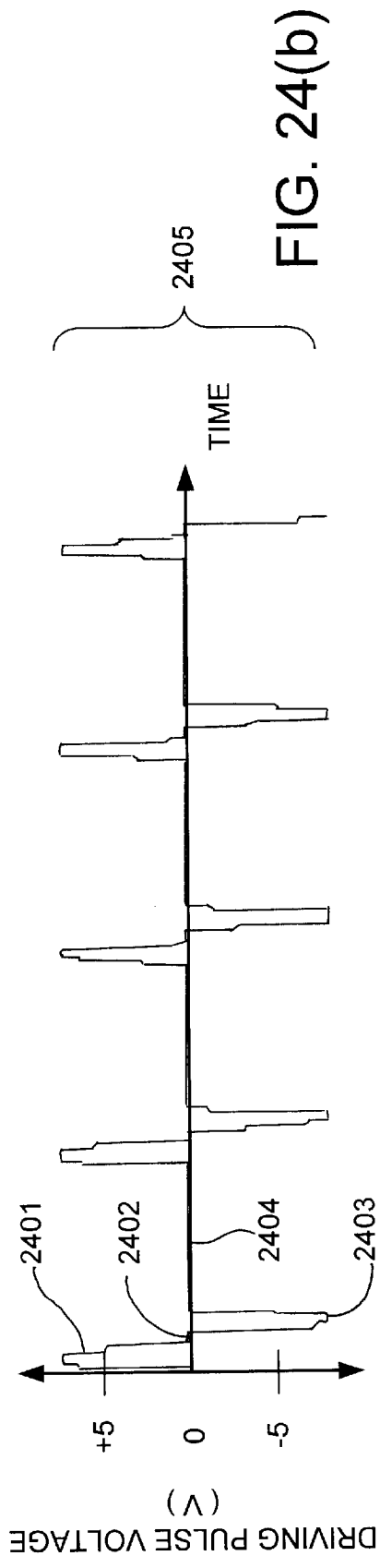

SPATIAL LIGHT MODULATOR AND A METHOD FOR DRIVING THE SAME

BACKGROUND OF THE INVENTION

1. Field of the Invention

The present invention relates to a spatial light modulator (hereinafter abbreviated as an SLM) used in a projection-type display, a holography television, or an optical computer.

2. Description of the Related Art

An optically addressed SLM is positively developed as an essential part of a projection-type display apparatus having a large screen size which is an alternative to a thin film transistor (TFT) liquid crystal panel or a cathode ray tube (CRT).

An SLM performs a light amplification of a two-dimensional image pattern. The SLM includes a photoconductive layer and a light-modulating layer as main components thereof. When image information with low luminance enters the SLM from the side of the photoconductive layer, the electric characteristics of the photoconductive layer are modulated depending on the luminance of the image information. As the result of the modulation, the optical characteristics of the light-modulating layer are modulated. Then, reading light with high luminance enters the SLM from the side of the light-modulating layer, whereby amplified image information can be output.

As the material of the photoconductive layer, CdS, crystalline silicon (Si), amorphous Si (a—Si:H), or the like is used. Among them, a—Si:H is widely used, since a—Si:H has various superior characteristics such as high sensitivity to writing light, a low dark conductivity, wide variations of film formations, and the like. The erasure of the written image is performed without using special erasure pulse light, so that the photoconductive layer is often provided with rectification.

As the material of the light-modulating layer, electrooptic crystals or liquid crystals are used. Among such crystals, surface stabilized ferroelectric liquid crystals (SSFLC; hereinafter referred to simply as PLC) are positively used since the FLC has a faster response (about 100 μsec.) as compared with the conventional liquid crystal of the twisted nematic (TN) type.

It is conventionally known that the FLC has bistability (the binary characteristics). Specifically, the direction of spontaneous polarization of FLC is changed depending on the polarity of the applied electric field, so that the FLC has two different optical states, i.e., ON (or UP) and OFF (or DOWN). The bistability is described in detail in, for example, Appl. Phys. Lett., vol. 36 (1980) pp. 899–901.

In the case where the FLC is used practically in a display or the like, the FLC must be able to display a half-tone state between the ON state and the OFF state. In order to realize the half-tone state, the amount of applied charges is controlled, rather than the externally applied electric field. Since the FLC has the spontaneous polarization which is represented by the spontaneous polarization charge $P_s$, it is that the aging due to the decomposition of the FLC molecules can be prevented. On the other hand, the driving waveform has the following problems. The voltage of the writing pulse (characterized by a writing period and a writing voltage) 202 is a very high negative voltage, so that the FLC polarization is inverted (electric field switching) even in a condition without writing light. As a result, the contrast is deteriorated. Also, since the duty ratio of the output light is ½ at most, this causes a loss of brightness. The driving method using the voltage waveform in FIG. 2(b) was proposed by the inventors of this invention. In the driving method, the obtained duty ratio can substantially be 1. However, also in this method, it is impossible to prevent the contrast deterioration due to the electric field switching during the application of the writing pulse 205.

FIG. 3 shows a driving pulse waveform used for solving the above problems. Such waveforms are used, for example, in SID Digest (1991), pp. 254–256 and U.S. Pat. No. 5,178,445. The driving pulse includes a short erasure pulse 301 with a high voltage and a long writing pulse 302 with a low voltage. In the driving pulse, the absolute value of the voltage of the writing pulse 302 is set to be smaller than the absolute value of the voltage of the erasure pulse 301, so that it is possible to prevent the electric field switching. In addition, since the period of the writing pulse 302 is long, the duty ratio of the reading light can substantially be 1. Thus, the driving method is suitable for the application to a projection-type display or the like. The latter reference specifically mentions the driving voltage conditions for the driving with high contrast. However in both cases, the employed FLC cannot stably have states other than the ON and OFF states. In the former case, the half-tone display is realized by using the above-mentioned multi-domain grayscale. The latter case uses, as the writing light, pulse light (for example, the emitted light from CRT having phosphors with shorter emission time than the length of one driving period of the SLM).

When the image on a CRT is written on the SLM, the period of the driving pulse voltage signal of the SLM is generally synchronized with one display period of the CRT. FIG. 4 shows the timing chart for driving the CRT and the SLM. In FIG. 4, the timing chart (a) indicates the synchronization pulse voltage of the CRT, and the timing chart (b) indicates the fluorescence intensity from a phosphor on the CRT screen. Also, the timing chart (c) indicates the voltage of a driving pulse of the SLM which is synchronized with one display period of the CRT, and the timing chart (d) indicates the intensity of an output light from the SLM. As is shown in the timing chart (c), a unit driving pulse voltage signal 404 includes an erasure pulse 402 and a reading pulse (characterized by a reading period and a reading voltage) 403, and the signal 404 is synchronized with a synchronization pulse 401 of the CRT display shown in the timing chart (a). The SLM is driven by the driving pulse voltage signal 404. As is shown in the timing chart (b), at a certain timing in the reading period of reading pulse 403 of the driving pulse voltage signal 404, a phosphor of the CRT emits a writing light pulse 405. The light is received by the photoconductive layer of the SLM, and the light-modulating layer of the SLM is switched into the ON state. As a result, as is shown in the timing chart (d), the intensity 406 of the output light from the SLM rises. When an erasure pulse 402 of the next unit driving pulse voltage signal 404 is applied, the light-modulating layer is switched into the OFF state, so that the intensity 406 of the output light from the SLM becomes 0. By repeatedly performing the above operations, the output light from the SLM can be observed. This method has an advantage in that the duty ratio of the reading light (the ratio of the ON state period of the reading light to one driving period) can be increased even in the CRT screen having phosphors which emit fluorescence with a short decay time. In general, in the case where a negative voltage of a large value is applied to the SLM, the SLM may erroneously be switched into the ON state due to the electric field caused by the negative voltage even if the writing light is not incident. However, if the driving signal having a waveform shown in the timing chart (c) is used, such a negative voltage having a large value is not applied to the SLM, so that the light-modulating layer of the SLM cannot be erroneously switched into the ON state. In addition, the deterioration of the contrast ratio of the image which may be caused by such erroneous switching can be prevented. It is also reported that, by varying the fluorescence intensity from a phosphor on the CRT screen, it is possible to realize the half-tone display of the output light of the SLM.

If an SLM is applied to a projection-type display or a holography television, it is necessary that a stable half-tone display with good contrast and with good controllability can be performed.

The conventional SLM could stably have only two optical states as the light-modulating layer, and hence the multi-domain gray-scale has been used for the half-tone display. Therefore in this method, as the resolution of the input image is increased (i.e., the size of each pixel is reduced), the number of domains included in one pixel is decreased, and hence the number of obtainable gray scales is decreased. This causes a problem in that it is difficult to perform the half-tone display.

Since, in the practical driving of the SLM, the charge control is not performed in the range of the applied charge amount for obtaining the intermediate state of FLC (e.g., see U.S. Pat. No. 5,178,445), it is difficult to perform the half-tone display with high contrast.

In addition, the time-averaged value of voltages applied to the FLC is not 0, so that the switching threshold voltage is changed as a function of time due to a drift of ions in the liquid crystal molecules. This causes another problem in that the input/output response characteristics of the light-modulating layer are changed as a result of a long time driving.

In the case where one frame of CRT as the writing means (i.e., one display period) is completely synchronized with the driving period of the SLM, it is difficult to make the brightness uniform over every portion of the SLM. This is described below with reference to FIG. 5. In FIG. 5, (a) is a plan view showing scanning lines 501 and 503 on the CRT screen 505. The timing chart (b) shows the waveform of the driving signal (the driving pulse voltage) of the CRT and the SLM. The timing chart (c) indicates the fluorescence intensity from a pixel 502 of the CRT screen 505, and the timing chart (d) indicates the intensity of output light from a pixel of the SLM corresponding to the pixel 502. The timing chart (e) indicates the fluorescence intensity of a pixel 504 of the CRT screen 505, and the timing chart (f) indicates the intensity of output light from a pixel of the SLM corresponding to the pixel 504 of the CRT screen 505.

In general, the CRT screen 505 is scanned with an electron beam, and light is emitted from the pixels 502 and 504 in the irradiated portion by the electron beam. As a result, the image is displayed on the CRT screen 505. When the electron beam scans the CRT screen 505 from the top to the bottom, the pixel 502 on the scanning line 501 in the upper portion of the CRT emits light at an earlier timing, but the pixel 504 on the scanning line 503 in the lower portion of the CRT emits light at a later timing. As a result, if the driving pulse shown in (b) of FIG. 5 which includes an erasure pulse 506 and a reading pulse 507 is used and the reading period of the reading pulse 507 is set to be substantially equal to one frame of CRT, as a result, the light pulses from the pixels 502 and 504 have waveforms indicated by 508 and 510 shown in the timing charts (c) and (e) in FIG. 5. The intensities of the output light from the pixels of the SLM corresponding to the light pulses 508 and 510 have waveforms indicated by 509 and 511 shown in the timing charts (d) and (f). Even if it is assumed that the writing light pulses 508 and 510 have an equal intensity, the averaged value of the intensity of the output reading light 511 is smaller than the averaged value of the intensity of the output reading light 509 in one-and the same period. Accordingly, a viewer senses that the output light 511 is darker than the output light 509, that is, the upper left portion of the screen 505 is brighter than the lower right portion thereof. For the above-mentioned reasons, the brightness of every portion of the output from the SLM is not uniform.

SUMMARY OF THE INVENTION

The spatial light modulator of this invention includes a pair of facing transparent electrodes, and a light-modulating layer and a photoconductive layer provided between the transparent electrodes, wherein the light-modulating layer has different optical states depending on an applied charge amount, the light-modulating layer having: a first optical state when the applied charge amount is a first threshold charge amount or more; a second optical state when the applied charge amount is a second threshold charge amount or less; and a spatially uniform intermediate state between the first optical state and the second optical state depending on the applied charge amount.

In one embodiment of the invention, the photoconductive layer has rectification, and generates, when the photoconductive layer is in a reversed bias condition, a photoelectric current having a magnitude depending on an intensity of writing light incident on the photoconductive layer.

In another embodiment of the invention, the light-modulating layer includes a ferroelectric liquid crystal layer which is sandwiched by two alignment films.

In another embodiment of the invention, wherein a specific resistance of the alignment films is in the range of $10^8$ $\Omega \cdot cm$ to $10^{11}$ $\Omega \cdot cm$.

According to another aspect of the invention, a driving method for a spatial light modulator is provided. In the method, the spatial light modulator includes a pair of facing transparent electrodes, and a light-modulating layer and a photoconductive layer provided between the transparent electrodes, the light-modulating layer having different optical states depending on an applied charge amount, the light-modulating layer having: a first optical state when the applied charge amount is a first threshold charge amount or more; a second optical state when the applied charge amount is a second threshold charge amount or less; and a spatially uniform intermediate state between the first optical state and the second optical state depending on the applied charge amount, wherein the photoconductive layer has rectification, and generates, when the photoconductive layer is in a reversed bias condition, a photoelectric current having a magnitude depending on an intensity of writing light incident on the photoconductive layer, wherein one period of a waveform of a driving voltage includes an erasure period in which the photoconductive layer is in a forward bias condition and a charge amount larger than the first threshold charge amount is applied, and a writing period in which the photoconductive layer is in a reversed bias condition so as to generate a photoelectric current having a magnitude depending on an intensity of writing light, and wherein the method includes a step of applying the driving voltage to the two transparent electrodes, so that in the writing period, the applied charge amount to the light-modulating layer is kept in the range of the first threshold charge amount or more when the intensity of the writing light is a first threshold light intensity or lower, and the applied charge amount to the light-modulating layer is reduced to the second threshold charge amount or less when the intensity of the writing light is a second threshold light intensity of higher.

In one embodiment of the invention, the light-modulating layer includes a ferroelectric liquid crystal layer which is sandwiched by two alignment films, and wherein conditions of:

$$-V_{th} \leq (C_f V_e + C_a V_w)/(C_f + C_a) - V_d, \text{ and}$$

$$V_w - V_d \leq -V_{th}$$

are satisfied, where $V_e$ denotes the maximum value of the driving voltage in the erasure period, $V_w$ denotes the minimum value of the driving voltage in the writing period, $C_f$ denotes a capacitance of the ferroelectric liquid crystal layer without polarization inversion of the ferroelectric liquid crystal layer, $C_a$ denotes a capacitance of the photoconductive layer, $V_d$ denotes a diffusion potential of the photoconductive layer, and $-V_{th}$ denotes a threshold voltage of the ferroelectric liquid crystal layer.

In another embodiment of the invention, the driving voltage $V_e$ in the erasure period and the driving voltage $V_w$ in the writing period are respectively in the ranges of:

$$1 \text{ V} \leq V_e \leq 40 \text{ V, and}$$

$$-20 \text{ V} \leq V_w \leq 4 \text{ V.}$$

According to another aspect of the invention, a driving method for a spatial light modulator is provided. In the driving method, the spatial light modulator includes a pair of facing transparent electrodes, and a light-modulating layer and a photoconductive layer provided between the transparent electrodes, the light-modulating layer having different optical states depending on an applied charge amount, the light-modulating layer having: a first optical state when the applied charge amount is a first threshold charge amount or more; a second optical state when the applied charge amount is a second threshold charge amount or less; and a spatially uniform intermediate state between the first optical state and the second optical state depending on the applied charge amount, and wherein the driving method includes the steps of: applying a driving voltage to the two transparent electrodes; irradiating the spatial light modulator with writing light; measuring an output light intensity of the spatial light modulator with respect to at least one writing light intensity; detecting a change of the output light intensity as a function of time; and performing a feedback to at least one of the writing light intensity and the driving voltage, in accordance with the detected change of the output light intensity.

In one embodiment of the invention, the photoconductive layer has rectification, and generates, when the photoconductive layer is in a reversed bias condition, a photoelectric current having a magnitude depending on an intensity of writing light incident on the photoconductive layer, wherein one period of a waveform of a driving voltage includes an erasure period in which the photoconductive layer is in a forward bias condition and a charge amount larger than the first threshold charge amount is applied, and a writing period in which the photoconductive layer is in a reversed bias condition so as to generate a photoelectric current having a magnitude depending on an intensity of writing light, and wherein the driving voltage, in the writing period, keeps the applied charge amount to the light-modulating layer in the range of the first threshold charge amount or more when the intensity of the writing light is a first threshold light intensity or lowers and reduces the applied charge amount to the light-modulating layer to the second threshold charge amount or less when the intensity of the writing light is a second threshold light intensity of higher.

In another embodiment of the invention, the light-modulating layer includes a ferroelectric liquid crystal layer which is sandwiched by two alignment films, wherein conditions of:

$$-V_{th} \leq (C_f V_e + C_a V_w)/(C_f + C_a) - V_d, \text{ and}$$

$$V_w - V_d \leq -V_{th}$$

are satisfied, where $V_e$ denotes the maximum value of the driving voltage in the erasure period, $V_w$ denotes the minimum value of the driving voltage in the writing period, $C_f$ denotes a capacitance of the ferroelectric liquid crystal layer without polarization inversion of the ferroelectric liquid crystal layer, $C_a$ denotes a capacitance of the photoconductive layer, $V_d$ denotes a diffusion potential of the photoconductive layer, and $-V_{th}$ denotes a threshold voltage of the ferroelectric liquid crystal layer, wherein the driving method includes a step of keeping values of $L_1$ and $L_s$ constant by changing at least one of $V_e$, $V_w$, $T_w$ and $\tau$, the values of $L_1$ and $L_2$ being defined by $$L_1 = (h\nu/\eta e)(C_f + C_a)(V_{f0} + V_{th})/T_w \tau,$$

$$L_s = (h\nu/\eta e)(2P_s/T_w \tau), \text{ and}$$

$$V_{f0} = (C_f V_e + C_a V_w)/(C_f + C_a) - V_d,$$

where $T_w$ denotes a width of the writing period, $\tau$ denotes a ratio (utilization efficiency) of an intensity of light actually incident on the photoconductive layer to the intensity of the writing light, $h\nu$ denotes a photon energy of the writing light, $\eta$ denotes a quantum efficiency of the photoconductive layer, and e denotes an electron charge.

In another embodiment of the invention, the driving method further includes the steps of: measuring changes $dY_A$ and $dY_B$ in output light intensities of the spatial light modulator as a function of time with respect to two different writing light intensities $L=L_A$ and $L=L_B$; obtaining changes $dL_1$ and $dL_s$ of $L_1$ and $L_2$ by using equations of $$dL_1 = [(\partial Y/\partial L_s)_{L=L_B} \cdot dY_A - (\partial Y/\partial L_s)_{L=L_A} \cdot dY_B]/\Delta,$$

$$dL_s = [-(\partial Y/\partial L_1)_{L=L_B} \cdot dY_A + (\partial Y/\partial L_1)_{L=L_A} \cdot dY_B]/\Delta,$$

and $$\Delta = (\partial Y/\partial L_1)_{L=L_A} \cdot (\partial Y/\partial L_s)_{L=L_B} - (\partial Y/\partial L_s)_{L=L_A} \cdot (\partial Y/\partial L_1)_{L=L_B}; \text{ and}$$

changing $V_e$, $V_w$, $T_w$ and $\tau$ by amounts equal to $dV_e$, $dV_w$, $dT_w$ and $d\tau$, respectively, so as to satisfy relationships of $$-dL_1 = (\partial L_1/\partial V_e)dV_e + (\partial L_1/\partial V_w)dV_w + (\partial L_1/\partial T_w)dT_w + (\partial L_1/\partial \tau)d\tau, \text{ and}$$

$$-dL_s = (\partial L_s/\partial T_w)dT_w + (\partial L_s/\partial \tau)d\tau.$$

In another embodiment of the invention, the driving method further includes the steps of: measuring changes $dY_A$ and $dY_B$ in output light intensities of the spatial light modulator as a function of time with respect to two different writing light intensities $L=L_A$ and $L-L_B$; obtaining changes $dL_1$ and $dL_s$ of $L_1$ and $L_s$ by using equations of $$dL_1 = [(\partial Y/\partial L_s)_{L=L_B} \cdot dY_A - (\partial Y/\partial L_s)_{L=L_A} \cdot dY_B]/\Delta,$$

$$dL_s = [-(\partial Y/\partial L_1)_{L=L_B} \cdot dY_A + (\partial Y/\partial L_1)_{L=L_A} \cdot dY_B]/\Delta,$$

and $$\Delta = (\partial Y/\partial L_1)_{L=L_A} \cdot (\partial Y/\partial L_s)_{L=L_B} - (\partial Y/\partial L_s)_{L=L_A} \cdot (\partial Y/\partial L_1)_{L=L_B}; \text{ and}$$

changing $V_e$, $V_w$, $T_w$ and $\tau$ by amounts equal to $dV_e$, $dV_w$, $dT_w$ and $d\tau$, respectively, so as to satisfy relationships of $dv_e=0$, $dV_w[(\partial L_1/\partial T_w)dL_s-(\partial L_s/\partial T_w)dL_1]/[(\partial L_1/\partial V_w)(\partial L_s/\partial T_w)]$, $dT_w=-(\partial L_s/\partial T_w)^{-1}dL_s$, and $d\tau=0$.

In another embodiment of the invention, the driving method further includes the steps of: measuring changes $dY_A$ and $dY_B$ in output light intensities of the spatial light modulator as a function of time with respect to two different writing light intensities $L=L_A$ and $L=L_B$; obtaining changes $dL_1$ and $dL_s$ of $L_1$ and $L_s$ by using equations of $dL=[(\partial Y/\partial L_s)_{L=LB}\cdot dY_A-(\partial Y/\partial L_s)_{L=LA}\cdot dY_B]/\Delta$, $dL_s=[-(\partial Y/\partial L_1)_{L=LB}\cdot dY_A+(\partial Y/\partial L_1)_{L=LA}\cdot dY_B]/\Delta$, and $\Delta=(\partial Y/\partial L_1)_{L=LA}\cdot(\partial Y/\partial L_s)_{L=LB}-(\partial Y/\partial L_s)_{L=LA}\cdot(\partial Y/\partial L_1)_{L=LB}$; and changing $V_e$, $V_w$, $T_w$ and $\tau$ by amounts equal to $dV_e$, $dV_w$, $dT_w$ and $d\tau$, respectively, so as to satisfy relationships of $dV_e=0$, $dV_w-[(\partial L_1/\tau)_{dLs}-(\partial L_s/\tau)_{dL1}]/[(\partial L_1/\partial V_w)(\partial L_s/\partial \tau)]$, $dT_w=0$, and $d\tau-(\partial L_s/\partial \tau)^{-1}dL_s$.

In another embodiment of the invention, the driving method includes a step of measuring output light intensities of the spatial light modulator with respect to three or more different writing light intensities.

In another embodiment of the invention, the driving method further includes the steps of: irradiating the spatial light modulator with the writing light via an image presentation portion and an intensity modulating portion which modulates an intensity of an image presented on the image presentation portion; and performing a feedback to a transmittance of the intensity modulating portion, in accordance with a change of the output light intensity as a function of time.

In another embodiment of the invention, the writing light is generated from a CRT, and the driving method comprises a step of performing a feedback to an electron beam current value of the CRT in accordance with the change of the output light intensity as a function of time.

In another embodiment of the invention, the measurement of the output light intensities of the spatial light modulator is performed directly after the output side of the spatial light modulator.

In another embodiment of the invention, one period of the driving voltage waveform for driving the spatial light modulator is shorter than one display period of an image formed by the writing light.

In another embodiment of the invention, a ratio of one display period of an image formed by the writing light to one period of the driving voltage is in the range of 1.5 to 1000.

In another embodiment of the invention, the output light intensity of the spatial light modulator with respect to the writing light intensities with the first threshold light intensity or lower of the spatial light modulator is substantially 0, the output light intensity with respect to the writing light intensities between the first threshold light intensity and the second threshold light intensity is increased as the writing light intensity is increased, and the output light intensity with respect to the writing light intensities which exceeds the second threshold light intensity has substantially no dependence on the writing light intensity.

In another embodiment of the invention, the writing light intensity to the spatial light modulator is substantially monotonously decreased as a function of time in one display period of an image formed by the writing light, the maximum value of the writing light intensity directly prior to the end of the display period is the second threshold light intensity or higher, and the maximum value decays to be the first threshold light intensity or lower in a period in which an image is rewritten by the writing light.

In another embodiment of the invention, the writing light is generated from a CRT.

In another embodiment of the invention, the driving voltage applied in the erasure period is in the range of +2 V to +30 V by regarding a direction in which the photoconductive layer is forward-biased as a positive, and the driving voltage applied in the writing period is in the range of −30 V to +2 V.

In another embodiment of the invention, one period of the driving voltage is constituted by a sequence of the erasure period, a first low voltage period, the writing period, and a second low voltage period.

In another embodiment of the invention, the second low voltage period is longer than the first low voltage period.

In another embodiment of the invention, the driving voltage applied in the erasure period is in the range of +2 V to +30 V by regarding a direction in which the photoconductive layer is forward-biased as a positive, the driving voltage applied in the writing period is in the range of −30 V to −2 V, and the driving voltage applied in the second low voltage period is in the range of −2 V to +2 V.

In another embodiment of the invention, the ferroelectric liquid crystal layer and the photoconductive layer are electrically in contact with each other via a metal reflection film which is divided and separated into minute portions.

According to another aspect of the invention, a spatial light modulating apparatus is provided. The spatial light modulating apparatus includes: a spatial light modulator including a light-modulating layer and a photoconductive layer provided between two facing transparent electrodes, the light-modulating layer having different optical states depending on an applied charge amount, the light-modulating layer having: a first optical state when the applied charge amount is a first threshold charge amount or more; a second optical state when the applied charge amount is a second threshold charge amount or less; and a spatially uniform intermediate state between the first optical state and the second optical state depending on the applied charge amount; means for applying a driving voltage to the two transparent electrodes; means for irradiating the spatial light modulator with writing light; means for measuring an output light intensity of the spatial light modulator with respect to at least one writing light intensity; means for detecting a change of the output light intensity as a function of time with respect to the at least one writing light intensity; and means for performing a feedback to at least one of the writing light intensity and the driving voltage in accordance with the detected change of the output light intensity.

According to another aspect of the invention, a liquid crystal device is provided. The liquid crystal device includes a ferroelectric liquid crystal layer sandwiched by two opposing alignment films, and means for applying charges to the ferroelectric liquid crystal layer, wherein a specific resistance of the alignment films is in the range of $10^8$ Ω·cm to $10^{11}$ Ω·cm.

Thus, the invention described herein makes possible the advantages of (1) providing a spatial light modulator which can realize a half-tone display with high contrast, (2) providing a spatial light modulator which is stable for a long use of time, (3) providing a spatial light modulator which can display an image with uniform brightness, and (4) a driving method for such a spatial light modulator.

These and other advantages of the present invention will become apparent to those skilled in the art upon reading and understanding the following detailed description with reference to the accompanying figures.

BRIEF DESCRIPTION OF THE DRAWINGS

FIG. 22 shows waveforms for illustrating a driving method using a CRT according to the invention.

FIG. 24 shows another driving pulse wave-form and the output light intensity corresponding thereto.

DESCRIPTION OF THE PREFERRED EMBODIMENTS

Figure 1:
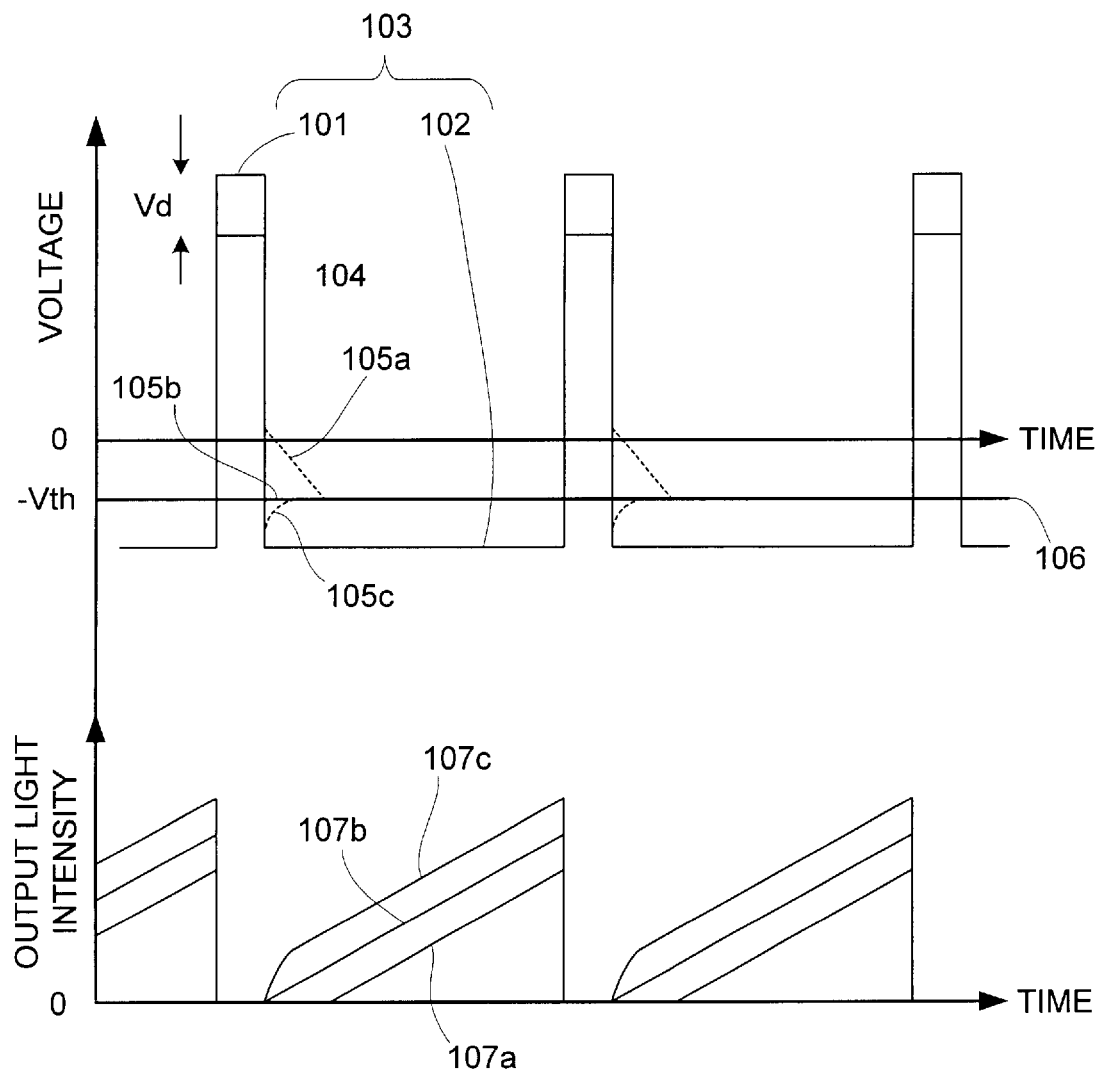
FIG. 1 shows waveforms for illustrating a driving method for an SLM according to the invention.
Figure 2A:
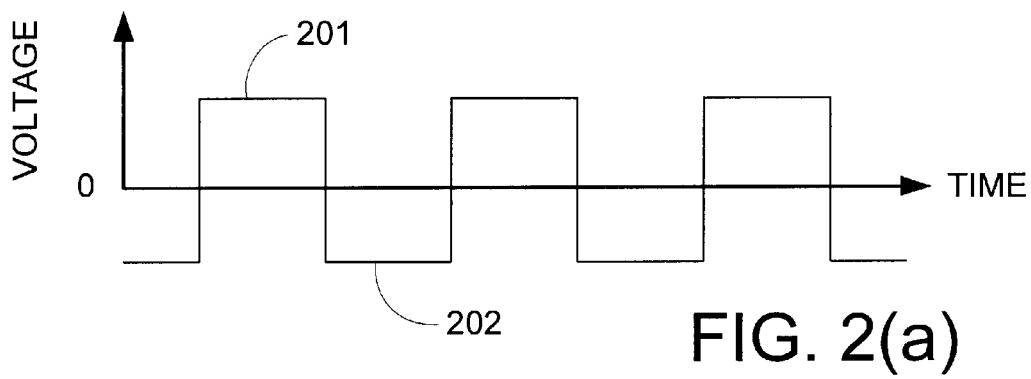
FIG. 2 shows conventional driving pulse waveforms.
Figure 2B:
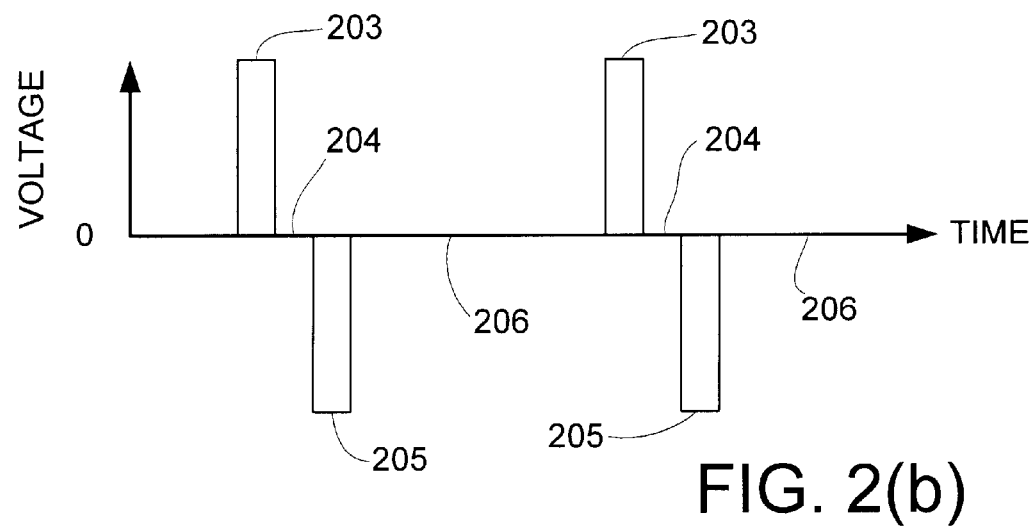

First, the principle for performing the grayscale display in an SLM according to the invention is described. If a medium which displays uniform and continuous gray-scale states is used as the light-modulating layer, it is possible to continuously realize the states between the ON and the OFF states, irrespective of the number of domains in one pixel. That is, even in an extreme case where only one domain exists in one pixel, the gray-scale can be displayed. Therefore, in a case where an image with high resolution is to be displayed (i.e., in a case where the size of a pixel is small), the gray-scale display can be performed.

If the medium used as the light-modulating layer can realize only two optical states, i.e., ON and OFF by controlling the applied voltage, there may be a case where a uniform state between the ON and the OFF states can be stably realized by controlling the amount of externally applied charges, instead of the voltage. By driving such a medium using a driving circuit of charge control type (for example, by connecting a current source, instead of a voltage source), the intermediate state can be realized. If the amount of currents output from the current source is varied depending on the intensity of writing light, it is possible to control the intermediate state in accordance with the intensity of writing light. A photoconductive layer with rectification can be used as such a current source.

Next, a driving method for the above-described SLM having a light-modulating layer which can take a uniform and stable intermediate state depending on the charge amount and a photoconductive layer with rectification will be described. Specifically, the case where the modulator is driven by using a driving voltage waveform including an erasure period and a writing period is described. The amount of charges at the transition from the OFF state to the intermediate state and the amount of charges at the transition from the intermediate state to the ON state are represented by $Q_1$ and $Q_2$, respectively. In other words, $Q \geq Q_1$, where $Q_1$ is the applied charge amount means the OFF state, $Q_1 > Q > Q_2$ means the intermediate state, and $Q_2 \geq Q$ means the ON state. When the erasure pulse is first applied in the erasure period, the applied charge amount Q to the light-modulating layer is equal to or larger than $Q_1$, so that the state is forcibly returned into the OFF state. Next, in the writing period, the photoconductive layer generates a photoelectric current depending on the writing light intensity. If the writing light intensity is sufficiently low, the state of $Q \geq Q_1$ is maintained during the writing period. If the writing light intensity is sufficiently high, a photoelectric current which is sufficient for changing the charge amount Q so as to be equal to or lower than $Q_2$ is generated. In this way, the intermediate state can be realized in a wide range between the OFF and the ON states. As a result, a gray-scale display with high contrast can be performed.

Next, a principle of stabilization of performance of the SLM in the time dimension is described. Physical parameters such as the switching threshold voltage of FLC may change by the driving for a long time. If the driving conditions are varied depending on the change, the input/output light intensity characteristics (the relationship between the writing light and the output light intensity) can be constantly maintained. Thus, a stable gray-scale display with good controllability is obtained.

Next, the principle of realizing a uniform image display is described. When plural units of driving signals (driving pulses) are applied to the SLM in one frame of the CRT, the writing and the erasure of the information displayed on the CRT screen to and from the SLM are repeatedly performed in one frame. In such a case, the writing information to the SLM or the output light intensity from the SLM in each unit driving signal (driving pulse) substantially corresponds to the fluorescence intensity from the phosphor on the CRT screen sampled at the time. Accordingly, if one period of this unit driving signal (driving pulse) is substantially shorter than the decay time constant of the fluorescence intensity from phosphor on the CRT screen, the envelope which smoothly links the peak values of output light intensities of the SLM in the respective unit driving signals (driving pulses) is substantially identical with the curve indicating the change of the fluorescence intensity from phosphor as the function of time. This means that an image which is obtained by directly viewing the CRT screen can be obtained on the output face of the SLM. As a result, uniform output light intensities can be obtained irrespective of the position on the screen of the SLM.

The emitted light intensity L from the phosphor on the CRT screen in one frame (the time is referred to as $T_{CRT}$) decays substantially as an exponential function, and the emitted light intensity L is expressed as in Equation (9) by using a time t, $$L = L_i exp(-t/\tau) \qquad (9)$$

$$(0 \leq t \leq T_{CRT})$$

where $L_i$ is an initial value of the emitted light intensity of the CRT, and $\tau$ is the decay time constant. A value $L_f$ at the end of one frame is expressed as in Equation (10) by substituting $T_{CRT}$ for t in Equation (9).

$$L_f = L_i \, exp(-T_{CRT}/\tau) \qquad (10)$$

The input light (writing light) intensity at which the output light intensity from the SLM starts to saturate is represented by $L_2$. If $Lf \geq L_2$, the SLM repeatedly performs almost the maximum output state over one frame, so that the maximum brightness as the integration over one frame can be obtained. In the case where the emitted light intensity from the CRT lowers below $L_2$ in the middle of one frame ($Lf<L_2$, i.e., $L_i<L_2 \, exp(T_{CRT}/\tau)$), the output light intensities of the SLM thereafter are not the maximum one. This means that if $L_i$ is varied in the range including $0 \leq L_i \leq L_2 \, exp(T_{CRT}/\tau)$, it is possible to realize the gray-scale display with full contrast as the integration value over one frame.

Figure 6:
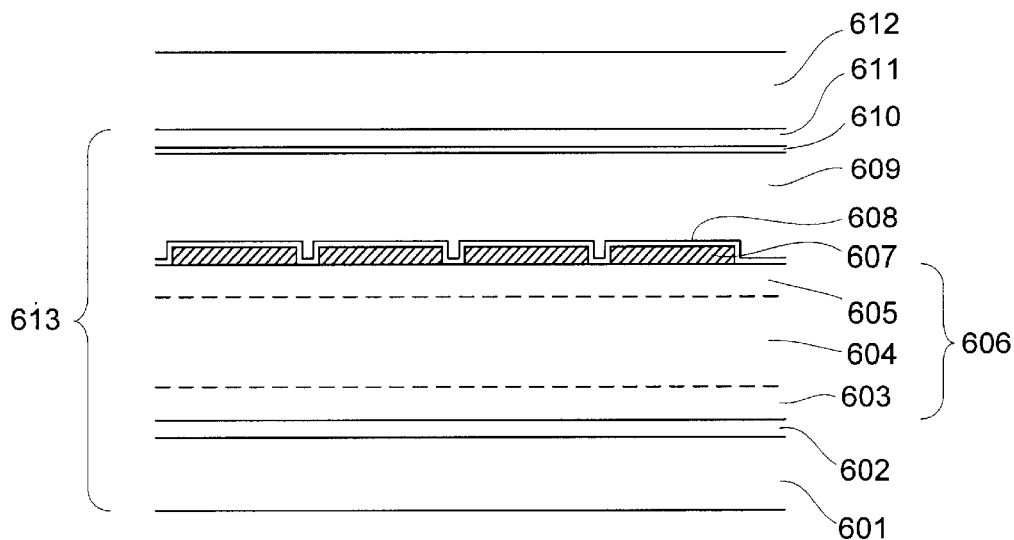
FIG. 6 is a cross-sectional view showing an exemplary construction of an SLM having a metal reflective film which is divided into minute portions.

An exemplary SLM according to the invention is shown in FIG. 6. A transparent conductive electrode 602 (e.g., ITO, ZnO, SnO$_2$, etc.), and a photoconductive layer with rectification 606, (or a photoresponsive layer) are formed on a transparent substrate 601 (e.g., glass). A metal reflective film 607 (e.g., a metal such as Al, Ti, Cr, or Ag, or a lamination of two or more kinds of metals) is formed thereon. The metal reflective film 607 is divided and separated into minute portions. Then, an alignment film 608 (e.g., a thin polymer film of polyimide or the like) for aligning liquid crystals is formed thereon. On another substrate 612 (e.g., glass), a transparent conductive electrode 611 (e.g., ITO, ZnO, SnO$_2$, etc.) is formed. An alignment film 610 (e.g., a thin polymer film of polyimide or the like) is coated thereon. As the final step, the two substrates 601 and 612 having the above constructions are attached to each other with a certain gap therebetween, and FLC 609 are injected and sealed in the gap.

The material for the photoconductive layer 606 can be selected, for example, from: compound semiconductors such as CdS, CdTe, CdSe, ZnS, ZnSe, GaAs, GaN, GaP, GaAlAs, and InP; amorphous semiconductors such as Se, SeTe, and AsSe; polycrystalline or amorphous semiconductors such as Si, Ge, $Si_{l-x}C_x$, $Si_{l-x}Ge_x$, and $Ge_{l-x}C_x$ (0<x<1); and organic semiconductors such as (1) phthalocyanine pigments (abbreviated as Pc) such as nonmetal Pc, XPc (X=Cu, Ni, Co, TiO, Mg, Si(OH)$_2$, etc.), AlClPcCl, TiOClPcCl, InClPcCl, InClPc, and InBrPcBr, (2) azo coloring matters such as mono azo coloring matters and dis azo coloring matters, (3) perylene pigments such as perylenic acid anhydride and perylenic imide, (4) indigoid dyes, (5) C.I. Pigment Violet 1, (6) polycyclic quinones such as anthraquinones, and pyrenequinones, (7) cyanine coloring matters, (8) xanthene dyes, (9) charge-transfer complexes such as PVK/TNF (Polyvinylcarbazole/Trinitrofluorenon), (10) eutectic complex formed of pyrylium salt dye and polycarbonate resin, and (11) azulenium salt compound.

If the amorphous semiconductors such as Si, Ge, $Si_{l-x}C_x$, $Si_{l-x}Ge_x$, and $Ge_{l-x}C_x$ (hereinafter abbreviated as a-Si, a-Ge, a-Si$_{x-l}$C$_x$, a-Si$_{l-x}$Ge$_x$, and a-Ge$_{l-x}$C$_x$) are used for the photoconductive layer 606, hydrogen or halogen elements may be contained, and oxygen or nitrogen for reducing the dielectric constant and for increasing the resistivity may be contained. In order to control the resistivity, elements such as B, Al, Ga which are p-type impurities, or elements such as P, As, Sb which are n-type impurities may be added. In order to control the dielectric constant and the dark resistance or the operating voltage polarity, a junction of p/n, p/i, i/n, or p/i/n is formed by depositing amorphous materials to which such impurities are added so as to form a depletion region in the photoconductive layer 606. Instead of the amorphous materials, two or more kinds of above-mentioned materials may be deposited for forming a heterojunction, so as to form a depletion region in the photoconductive layer 606. The thickness of the photoconductive layer 606 is desirably 0.1–10 $\mu$m.

Next, an example of a fabrication method for the SLM is specifically described. First, an ITO thin film as a transparent conductive electrode 602 was deposited on a glass substrate 601 (40 mm×40 mm×0.3 mm) by sputtering. The thickness of the ITO film was set to be 1,000 angstroms. Then, amorphous silicon (a-Si:H) having a pin structure as a photoconductive layer 606 was deposited by plasma chemical vapor deposition (CVD). In this deposition, the thicknesses of a p-layer 603, an i-layer 604, and an n-layer 605 were 1,000, 17,000, and 2,000 angstroms, respectively, and the total thickness as the photoconductive layer 606 was 2 $\mu$m. As impurities, B (boron) of 400 ppm was added to the p-layer 603, P (phosphorus) of 40 ppm was added to the n-layer 605. No impurities were added to the i-layer 604. Next, Cr was formed over the entire top face by vacuum evaporation, so as to form a metal reflective film 607. The metal reflective film 607 was then divided into minute portions by using a photolithography technique. Each minute portion of the metal reflective film 607 had a size of 20 µm×20 µm, and a width between pixels was set to be 5 µm. The number of pixels was $10^6$ (1,000×1,000). Then, a polyamic acid was applied thereon by a spin coat method, and the polyamic acid was thermally cured, so as to form a polyimide alignment film 608. The thickness of polyimide was set to be 100 angstroms. The aligning process was performed by unidirectionally rubbing the surface of the alignment film 608 with a nylon cloth.

In the same way, an ITO transparent conductive electrode 611 and a polyimide alignment film 610 were formed on the substrate 612 (glass), and the aligning process was performed. Next, beads each having a diameter of 1 µm were distributed over the substrate 612, and the substrate 601 was attached to the substrate 612. Thus, a gap of 1 µm was formed between the substrates. As the last step, FLC 609 were injected into the gap, and a thermal treatment was performed, whereby an SLM 613 was completed.

Figure 7:
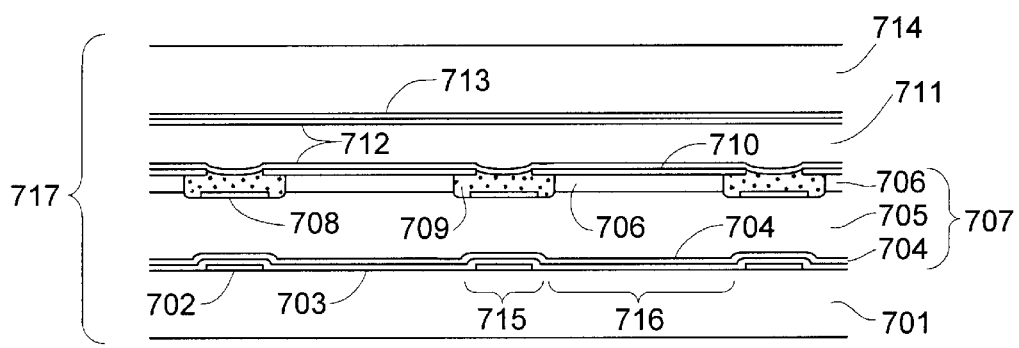
FIG. 7 is a cross-sectional view showing another exemplary construction of an SLM having a metal reflective film.

Another construction of the SLM is shown in FIG. 7. The SLM includes a photoconductive layer 707 with a p-layer 704, an i-layer 705, and an n-layer 706, a ferroelectric liquid crystal layer 711 which is sandwiched between alignment films 712 formed on a substrate 714, and a metal reflective film 710. The fundamental structure is the same as that of the SLM shown in FIG. 6, but the SLM shown in FIG. 7 is different in the following points.

(1) An input light blocking film 702 of a metal such as Cr, Al, Ti, or Ag is formed between a substrate 701 and a transparent conductive electrode 703. The input light blocking film 702 prevents the writing light from reaching a pixel separation 715, because the writing light reduces the resistance of the pixel separation 715 and causes the crosstalk to occur between pixels 716, thereby degrading the resolution.

(2) Between the adjacent portions of the metal reflective film 710, the whole of the n-layer 706 and part of the i-layer 705 of the photoconductive layer 707 are removed by etching, so as to form a groove. Accordingly, the adjacent portions of the metal reflective film 710 are prevented from being connected via the low-resistance n-layer, i.e., they are electrically separated from each other, so that the resolution is improved.

(3) An output light blocking film 708 of a metal such as Al, Cr, Ti, or Ag is formed on a bottom face of the groove which is formed in the above step (2). Accordingly, it is possible to avoid an erroneous switching operation which is caused by the reading output light which travels to the photoconductive layer 707 side. In addition, the intensity of the reading light can be increased.

(4) An organic output light blocking film 709 is inserted into the groove. Accordingly, the reading light can be more intensively blocked.

Figure 8:
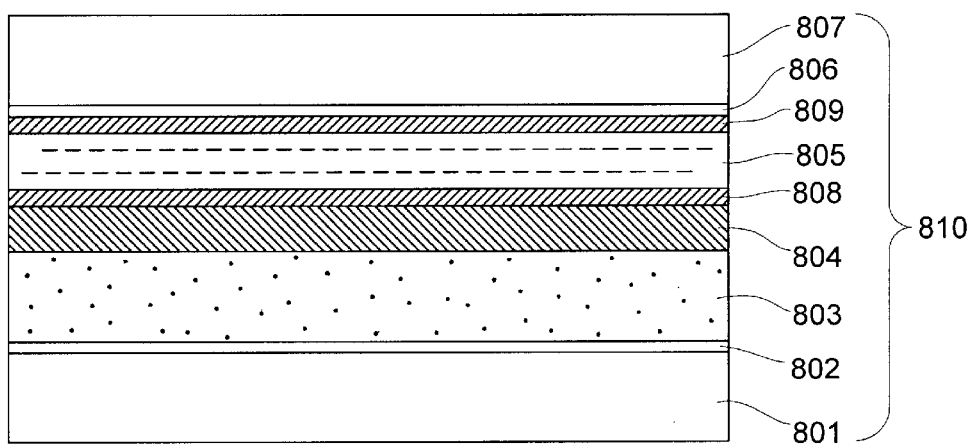
FIG. 8 is a cross-sectional view showing an exemplary construction of an SLM having a dielectric mirror.

An SLM can have other constructions such as shown in FIG. 8. The SLM 810 includes two transparent electrodes 802 and 806 formed on two substrates 801 and 807, a photoconductive layer 803, a dielectric mirror 804, and a ferroelectric liquid crystal layer 805. Alignment layers 808 and 809 are formed on the dielectric mirror 804 and the transparent electrode 806, respectively. In FIG. 8, a dielectric reflective film 804 is formed over the entire face instead of the metal reflective film 607 in FIG. 6.

Figure 3:
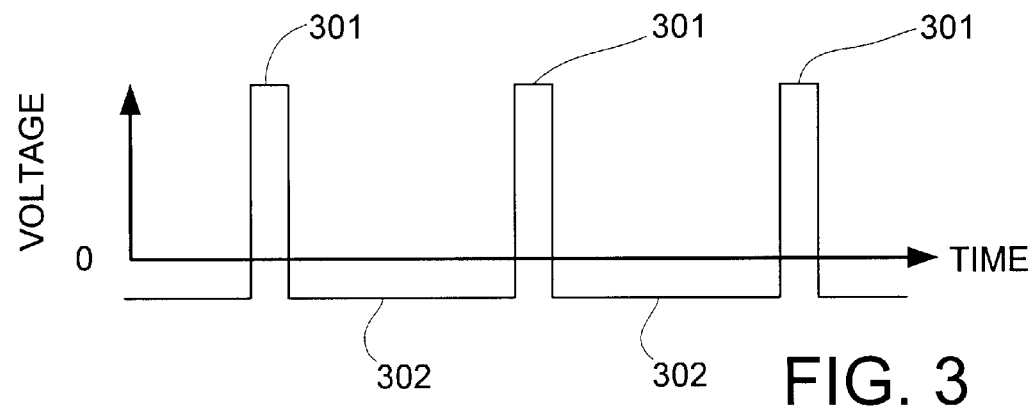
FIG. 3 shows a driving pulse waveform according to the invention.
Figure 4:
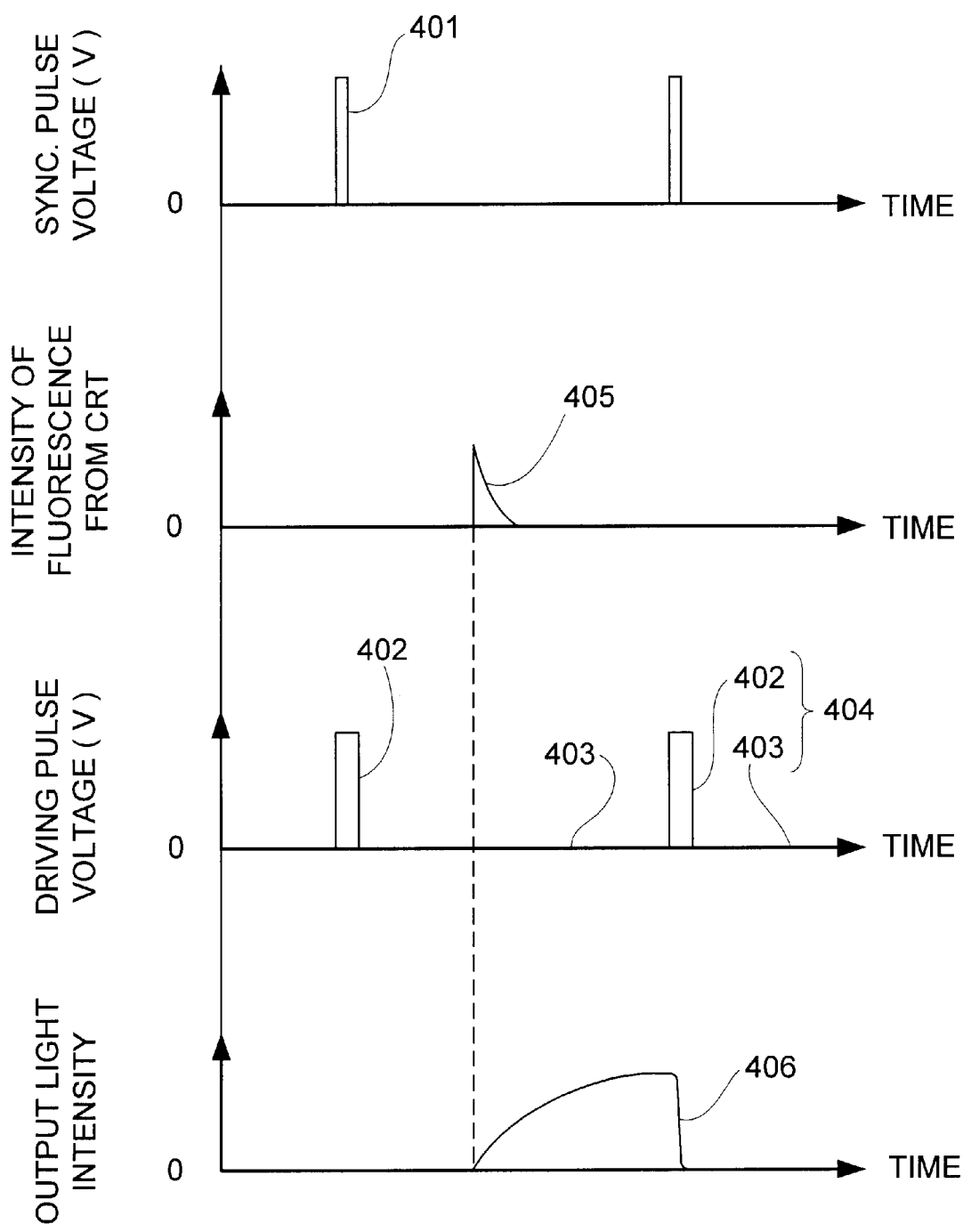
FIG. 4 shows an exemplary conventional driving method during the writing by a CRT.
Figure 5A:
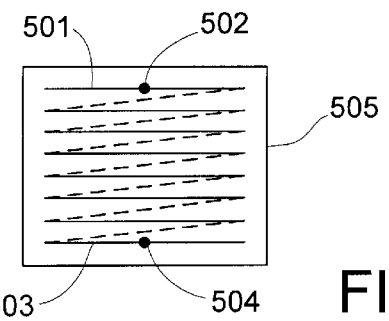
FIG. 5 shows pulse waveforms for illustrating that a uniform brightness is not obtained on the screen by the conventional driving method.
Figure 5B:
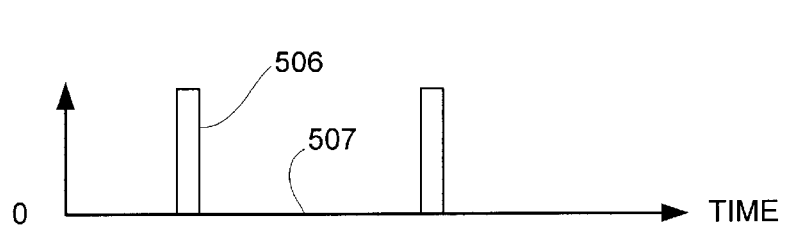
Figure 5C:
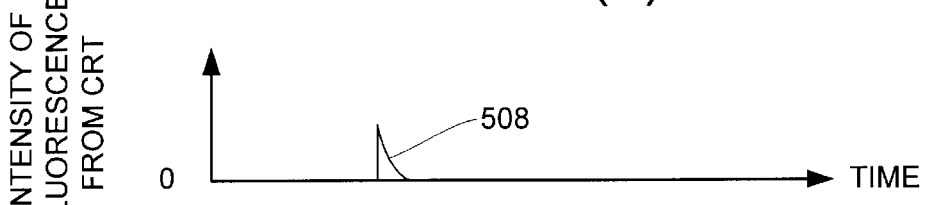
Figure 5D:
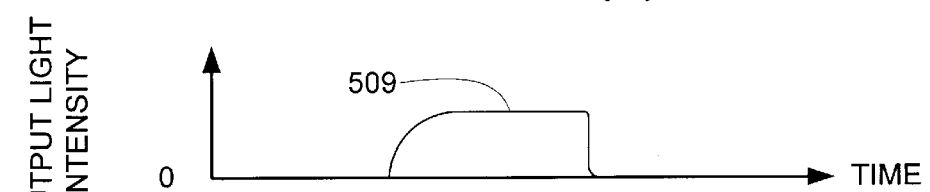
Figure 5E:
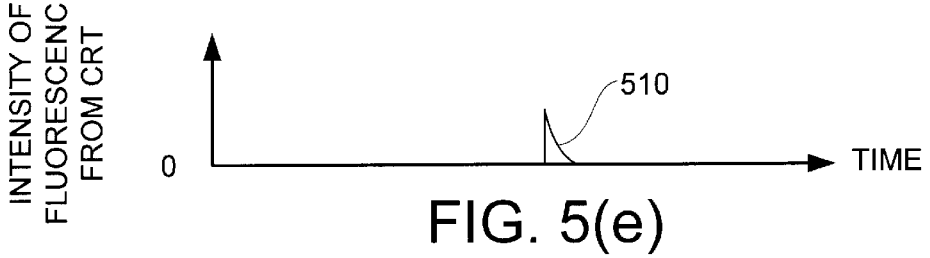
Figure 5F:
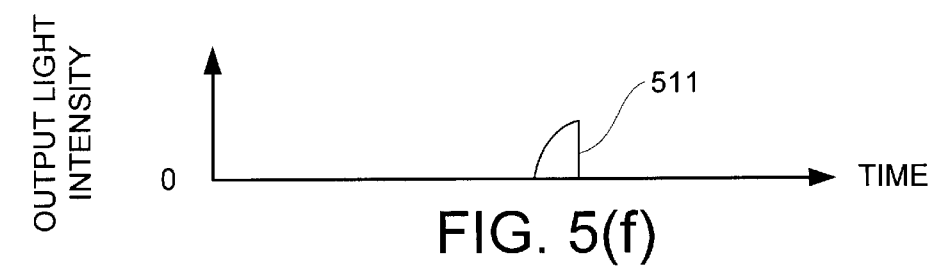

Next, the driving method and the operating principle of an SLM will be described. Herein, the SLM 717 shown in FIG. 7 is exemplarily used for the description. As the driving voltage applied between the two transparent conductive electrodes 703 and 713, a driving voltage having a waveform as shown in FIG. 3 is exemplarily used. In the waveform shown in FIG. 3, an erasure pulse 301 (the erasure voltage $V_e$ and the erasure period $T_e$) and a writing pulse 302 (the writing voltage $V_w$ and the writing period $T_w$) alternately continue.

Figure 9:
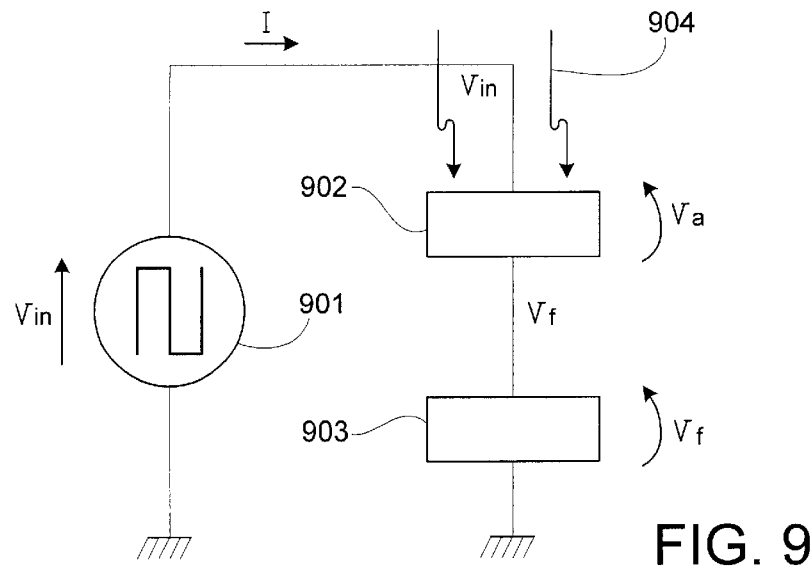
FIG. 9 is a circuit diagram illustrating the operation of the SLM.

FIG. 9 shows one pixel portion of the SLM 717 in FIG. 7. As is shown in FIG. 9, the pixel portion can be regarded as a series circuit of an FLC layer 903 and a photoconductive layer 902. Herein, the driving voltage supplied from a driving power source 901 is indicated by $V_{in}$, a voltage across the FLC layer 903 is indicated by $V_f$, and a voltage across the photoconductive layer 902 is indicated by $V_a$ ($-V_{in}-V_f$). Thus, the potential of the metal reflective film 710 is $V_f$. The reference numeral 904 denotes a writing light.

Figure 10:
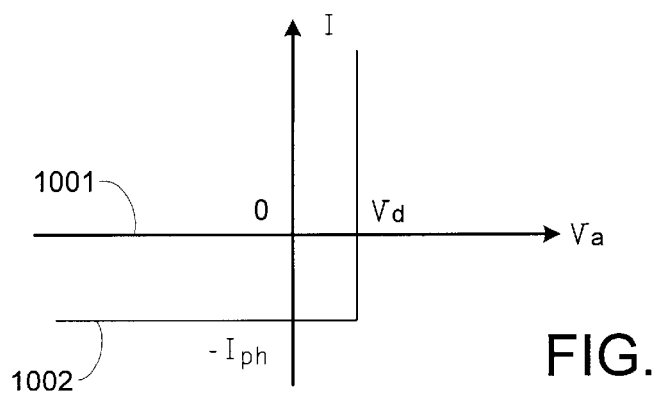
FIG. 10 shows the current-voltage characteristics of a photoconductive layer with rectification.
Figure 11:
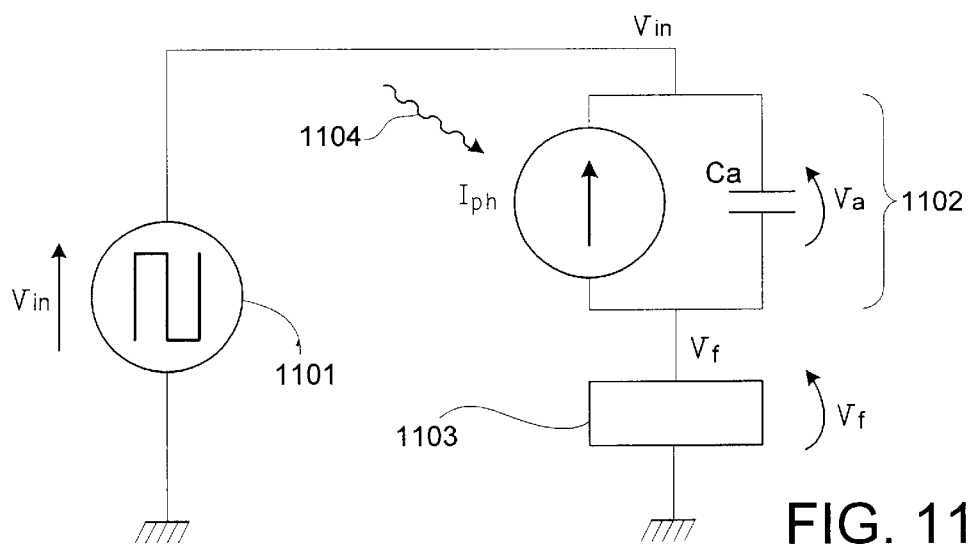
FIG. 11 is a circuit diagram corresponding to that of FIG. 9 except that the photoconductive layer is shown as an equivalent circuit.

The photoconductive layer 902 has the diode characteristics, so that the photoconductive layer 902 is in a low-resistance state during the application of forward bias voltage, and is in a high-resistance state during the application of reverse bias voltage, so as to generate a photoelectric current. For simplicity, the diode characteristics are assumed to be ideal (i.e., the forward resistance is 0, and the reverse resistance is infinity), and the dark current is assumed to be so small as compared with the photoelectric current that it can be neglected during the application of the reverse bias voltage. The current-voltage characteristics of the photoconductive layer under the above conditions are shown in FIG. 10. FIG. 10 shows current-voltage characteristics 1002 and 1001 with and without light irradiation. Herein, $V_d$ indicates the diffusion potential of the diode, and $V_d$ can be defined as a value of $V_a$ at the crossing of the curve of current-voltage characteristics 1002 during the light irradiation and the horizontal axis. The value of $V_d$ is usually in the range of about 0.1 V to 5 V. The photoelectric current indicated by $I_{ph}$ has the following relationship with the writing light intensity L.

$$I_{ph} = (\eta e/h\nu)L \quad (11)$$

where e denotes the charge of an electron, h ν denotes the energy of the photon, η denotes the quantum efficiency of carrier generation by the photon. In the case where the photoconductive layer 902 is in the reverse bias state, and a transient phenomenon is to be treated, it is necessary, as is shown in FIG. 11, to perform the analysis by regarding a photoconductive layer 1102 as a parallel circuit of the current source $I_{ph}$ and the capacitance of the photoconductive layer $C_a$ ($=\epsilon_a\epsilon_0/d_a$, where $\epsilon_a$ denotes a specific dielectric constant, $\epsilon_0$ denotes a dielectric constant of vacuum, and $d_a$ denotes the thickness of the photoconductive layer). The reference numeral 1101 indicates a driving power source and the reference numeral 1104 indicates writing light.

Figure 12A:
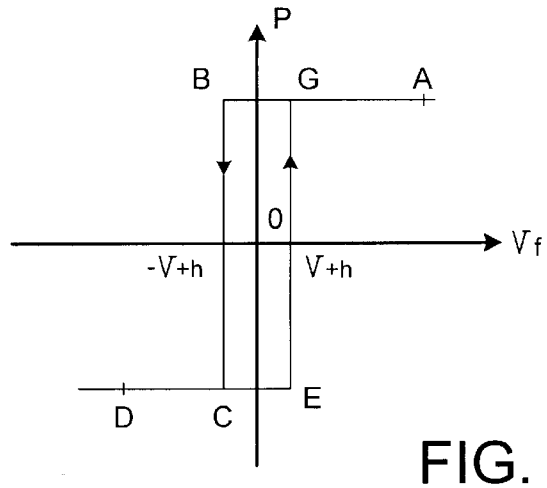
FIG. 12 shows the polarization inversion characteristics of an FLC layer.

The resistance of the FLC layer 1103 is very high, so that only the capacitance component is considered. If there is no polarization inversion of liquid crystals, it is assumed that there only exists the capacitance $C_f$ ($=\epsilon_f\epsilon_0/d_f$, where (f denotes a dielectric constant without the polarization inversion, and $d_f$ denotes the thickness of the liquid crystal layer) which is determined by the geometric shape of the FLC layer 1103. However, if there occurs a polarization inversion, the hysteresis of the polarization should be considered. In general, there exists the hysteresis characteristics between the applied voltage $V_f$ and the polarization charge P of the FLC as is shown in FIG. 12(a). In FIG. 12(a), as the applied voltage changes from the positive voltage to the negative voltage, the polarization has a path A→G→B→C→D. As the applied voltage changes from the negative voltage to the positive voltage, the polarization has a path D→C→E→G→A. Herein, $P_s$ denotes the magnitude of the spontaneous polarization, and $V_{th}$ or $-V_{th}$ denotes the threshold voltage of switching.

The charge Q stored in the metal reflective film 710 is expressed as follows by considering the polarization charge P.

$$Q = C_f V_f + P \tag{12}$$

The transmittance T of the liquid crystal layer is expressed as follows.

$$T = (1 - P/P_s)/2 \tag{13}$$

Figure 28:
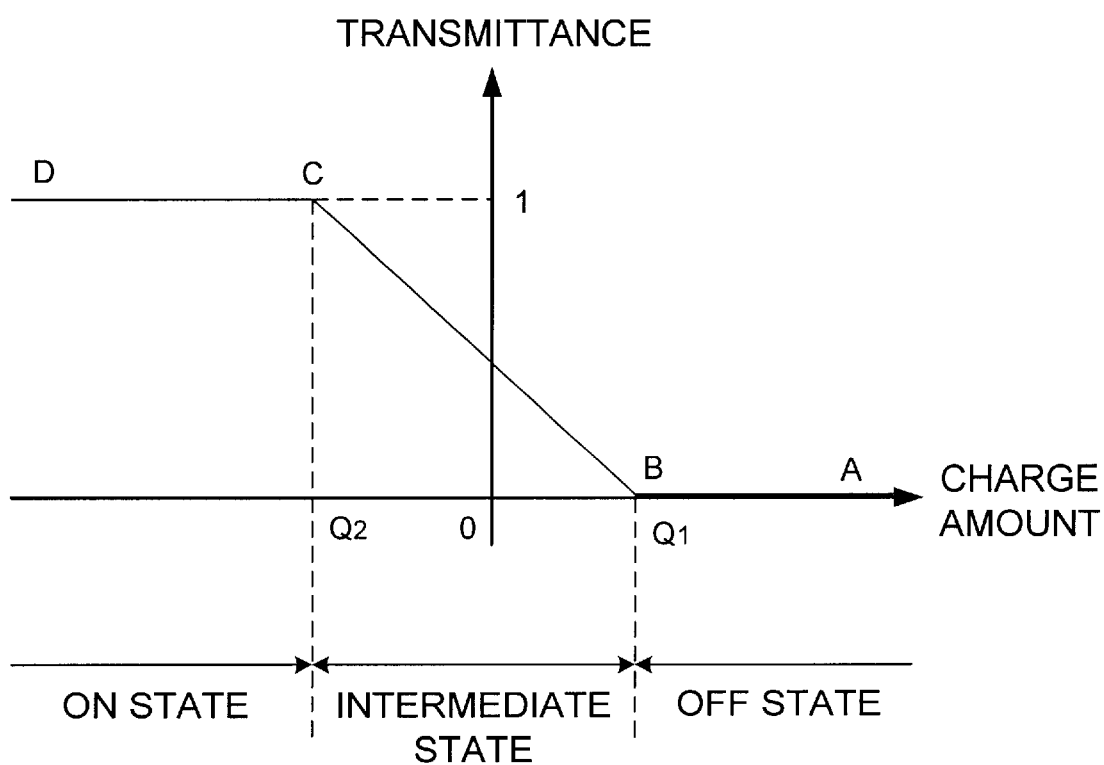
FIG. 28 shows that the half-tone state can be realized by controlling the applied charge amount.

The path A→B→C→D is considered in accordance with Equations (12) and (13). First, as to the path A→B, P=P_s, T=0, and Q=C_f V_f+P_s (where V_f≧-V_{th}, and Q≧-C_f V_{th}+P_s). As to the path B→C, P=Q+C_f V_{th}, T=[1-(Q+C_f V_{th})/P_s]/2 (where V_f=-V_{th}, -C_f V_{th}-P_s<Q<-C_f V_{th}+P_s). As to the path C→D, P=-P_s, T=1, and C=C_f V_f-P_s (where V_f≦-V_{th}, Q≦-C_f V_{th}-P_s). Considering the above, the charge amount Q and the transmittance T have the relationship as shown in FIG. 28. Herein, Q_1 and Q_2 are threshold charge amounts defined by the following expressions.

$$Q_1 = -C_f V_{th} + P_s \tag{101}$$

$$Q_2 = -C_f V_{th} - P_s$$

In FIG. 28, the symbols A to D correspond to those shown in FIG. 12(a). As is seen from the figure, an intermediate state (between B and C; Q_2<Q<Q_1) is surely generated other than the OFF state (between A and B; Q_1<Q) and the ON state (between C and D; Q<Q_2) The intermediate state is regarded as a state in which the charges of the polarization of +P_s and the polarization of -P_s are two-dimensionally distributed or a state in which the FLC molecules are uniformly in the middle of the polarization inversion.

Figure 12B:
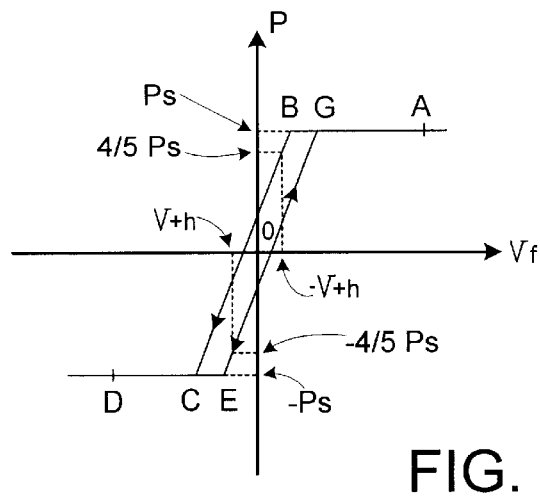
Figure 12C:
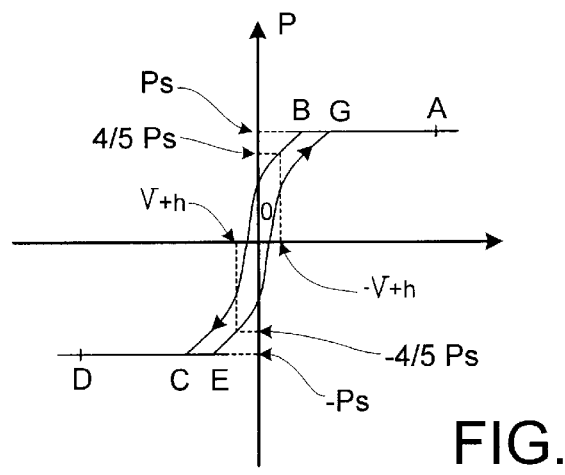

The characteristics in FIG. 12(a) are very ideal, so that in actuality the threshold voltage has no specific value and the voltage value in the switching intermediate state (between B and C) may have a width as is shown in FIGS. 12(b) and 12(c). In such a case, if the slope dP/dV_f is sufficiently larger than C_f in the intermediate state, the following analysis is approximately applied. In this case, in the curve of A→G→B→C→D, the value of V_f at the position where the polarization inversion progresses 10% (T=0.1, i.e., P=(4/5) P_s) is defined as -V_{th} (there may be a case where V_{th}<0). In some cases, the curve itself may not be symmetric with respect to the origin. In such cases, the curve D→C→E→G→A is neglected, and only the curve A→G→B→C→D is used, so as to obtain -V_{th}. In the cases of FIGS. 12(b) and (c), the same Q-T curve as that in FIG. 28 can be obtained. In both cases, Q_1 and Q_2 are obtained by the following equations.

$$Q_1 = C_f V_B + P_s - C_f V_{th} + P_s \tag{102}$$

$$Q_2 = C_f V_C - P_s$$

where V_B and V_C denote voltage values at the points B and C, respectively.

By considering the above, the operation of the SLM is described by using the driving pulse wave-form shown in FIG. 1. FIG. 1 shows the driving pulse and the output light intensities corresponding to the driving voltage. The driving pulse 103 includes an erasure pulse 101 and a writing pulse 102. The reference numeral 104 indicates a voltage applied to a ferroelectric liquid crystal layer during an erasure period. The reference numerals 105a, 105b and 105c indicate voltages applied to the ferroelectric liquid crystal layer in case of V_{f0}>-V_{th}, V_{f0}>-V_{th}, and V_{f0}<-V_{th}, respectively.

The reference numerals 107a, 107b, and 107c indicate the output light intensities corresponding to the applied voltages 105a, 105b, and 105c, respectively.

First, the case where the erasure pulse 101 is applied (V_{in}=V_e) is considered. The width of this pulse T_e (erasure period) and the voltage value V_e (erasure voltage) are sufficient, the photoconductive layer 902 becomes into the forward-biased state, and the FLC layer 903 becomes into the OFF state (corresponding to the A point in FIG. 12, P=P_s). In this case, the applied voltage V_f to the FLC layer 903 is obtained by the following equation, as indicated by the broken line. V_f=V_e-V_d. The applied charge Q is obtained by Q=C_f (V_e-V_d)+P_s (>Q_1).

Next, the instance (time t=0) at which the driving voltage is varied from V_{in}=V_e to V_{in}=V_w is considered. At this instance, a current flows, so that the stored charges to the FLC layer 903 and the photoconductive layer 902 as a capacitor are changed. The capacitance of the photoconductive layer 902 is C_a, and the polarization inversion is not induced in the FLC layer 903 due to its inertia at this instance. Accordingly, the value of P is not changed in Equation (12), and P remains P=P_s. Assuming that the value of V_f at this instance is represented by V_{f0}, the following relationship is established by considering the charge preservation in the metal reflective film portion.

$$(C_f V_{f0} + P_s) - \{C_f(V_e - V_d) + P_s\} = C_a\{(V_w - V_{f0}) - V_d\} \tag{14}$$

In this relationship, the charge in the FLC layer 903 is obtained by Equation (12), and the photoelectric current at this instance is neglected. By Equation (14), V_{f0} is represented as follows:

$$V_{f0} = (C_f V_e + C_a V_w)/(C_f + C_a) - V_d \tag{15}$$

If the applied charge amount at this instance is represented by Q_0, Q_0 is represented as follows:

$$Q_0 = C_f V_{f0} + P_s = Q_1 + C_f(V_{f0} + V_{th}) \tag{103}$$

Next, the variation of the potential V_f in the case where the writing period T_w is infinitely long is considered.

(1) If V_{f0}≧-V_{th}, i.e., if Q_0≧Q_1, the polarization change at t=0 exists between A and B in FIG. 12 (the OFF state). In t>0, until reaching the B point, V_f is changed by the photoelectric current I_{ph}. The variation of the potential V_f in this state is represented as follows by the circuit shown in FIG. 11.

$$C_a(d/dt)(V_w - V_f) - I_{ph} = dQ/dt = C_f dV_f/dt \tag{16}$$

that is, $$dV_f/dt = -I_{ph}/(C_f + C_a) \tag{17}$$

When this equation is evaluated by using the initial condition of V_f=V_{f0} at t=0, V_f, P, Q and the transmittance T are obtained as follows:

$$V_f = V_{f0} - I_{ph} t/(C_f + C_a)$$

$$P = P_s \tag{18}$$

$$Q = Q_0 - \{C_f/(C_f + C_a)\} I_{ph} t$$

$$T = 0$$

The time t=t_1 at which the polarization charges reach the point B is the time at which V_f=-V_{th} (i.e., Q=Q_1).

$$t_1 = (C_f + C_a)(V_{f0} + V_{th})/I_{ph} \quad (19)$$

After reaching the point B, the polarization inversion is performed while maintaining the relationship of $V_f = -V_{th}$ (between B and C in FIG. 12). The change of the polarization charge P is represented as follows by Equation (12).

$$-I_{ph} = dQ/dt = dP/dt \quad (20)$$

When $t=t_1$, $P=P_s$, so that $V_f$, P, Q and the transmittance T are represented as follows:

$$V_f = -V_{th}$$

$$P = P_s - I_{ph}(t-t_1) \quad (21)$$

$$Q = Q_1 - I_{ph}(t-t_1)$$

$$T = (I_{ph}/2P_s)(t-t_1)$$

The above equations indicate that the polarization inversion state is defined by the charges generated by the photoelectric current in this period. The time at which the polarization inversion is terminated, i.e., the time $t_2$ at which the polarization charges reach the point C in FIG. 12 ($Q=Q_2$) is the time at which $P=-P_s$ in Equation (21) and represented as follows:

$$t_2 = t_1 + 2P_s/I_{ph} \quad (22)$$

When $t > t_2$, the polarization charges P are fixed ($P=-P_s$), so that the change of $V_f$ is represented in the same way as in Equation (16) or (17). The equation is evaluated by using the condition of $V_f = -V_{th}$ at $t=t_2$, the following are obtained.

$$V_f = -V_{th} - I_{ph}(t-t_2)/(C_f + C_a)$$

$$P = -P_s \quad (23)$$

$$Q = Q_2 - \{C_f/(C_f + C_a)\}I_{ph}(t-t_2)$$

$$T = 1$$

Figure 13:
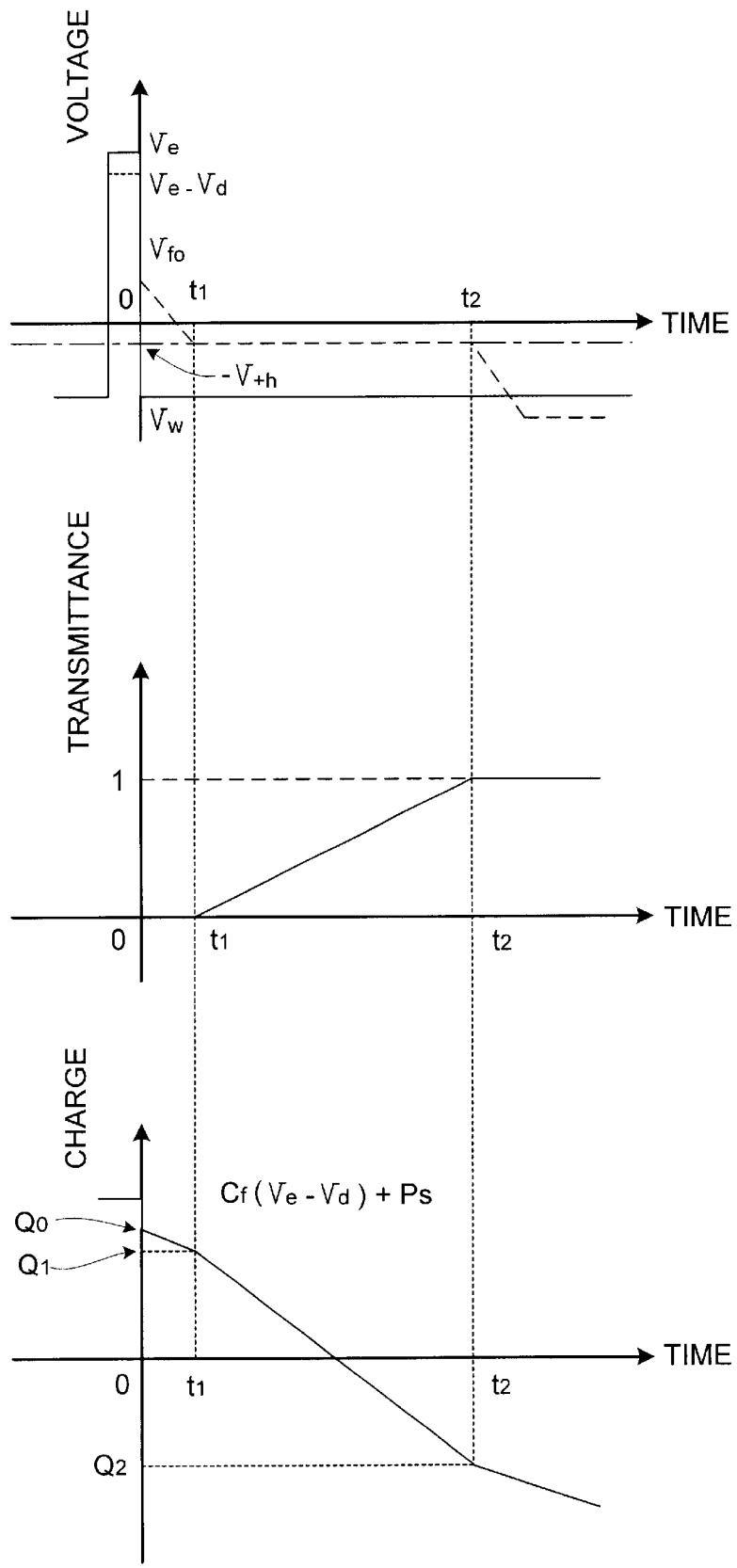
FIG. 13 is a timing diagram showing the changes as a function of time in potential and transmittance of a metal reflective portion of the SLM.

FIG. 13 shows the changes of $V_f$, T, and Q in the writing period of writing pulse 302 which are described above.

(2) Next, the case of $V_{f0} < -V_{th}$, i.e., $Q_0 < Q_1$ is considered. At the instance of $t=0$, the liquid crystal layer does not follow the polarization inversion due to its inertia. However, the polarization inversion occurs in a very short time period (several tens of μsec.), and it is fixed to a certain polarization state between B and C in FIG. 12. The potential $V_f$ is also fixed to $V_{f0}$. If the polarization charge P is represented by $P_0$, the following relationship is established based on the charge preservation.

$$(-C_f V_{th} + P_0) = (C_f V_{f0} + P_s) = C_a(V_w + V_{th}) - C_a(V_w = V_{f0}) \quad (24)$$

Equation (24) can also be represented in the following way.

$$P_0 P_s + (C_a + C_f)(V_{th} + V_{f0}) \quad (25)$$

This transient phenomenon occurs instantaneously, so that it is analyzed supposing the equilibrium state $P=P_0$ is realized at $t=0$. The change of the polarization charge P in $t>0$ is indicated by the path from B to C in FIG. 12. The polarization charge is changed in accordance with Equation (20). If $P=P_0$ at $t=0$, $V_f$, P, Q and T are represented by the following equations:

$$V_f = -V_{th}$$

$$P = P_0 - I_{ph} t \quad (26)$$

$$Q = Q_1 + P_0 - P_s - I_{ph} t$$

$$T = \{1 - (P_0 - I_{ph} t)/P_s\}/2$$

In FIG. 12, when $P=-P_s$, the point C is reached at a time $t_3$ which is represented as follows:

$$t_3 = (P_0 + P_s)/I_{ph} \quad (27)$$

Since $V_f$ in $t>t_3$ can be represented in the same way as Equation (17), P, Q, and T are represented as follows:

$$V_f = -V_{th} - I_{ph}(t-t_3)/(C_f + C_a)$$

$$P = -P_s \quad (28)$$

$$Q = Q_2 - \{C_f/(C_f + C_a)\}I_{ph}(t-t_3)$$

$$T = 1$$

Figure 14:
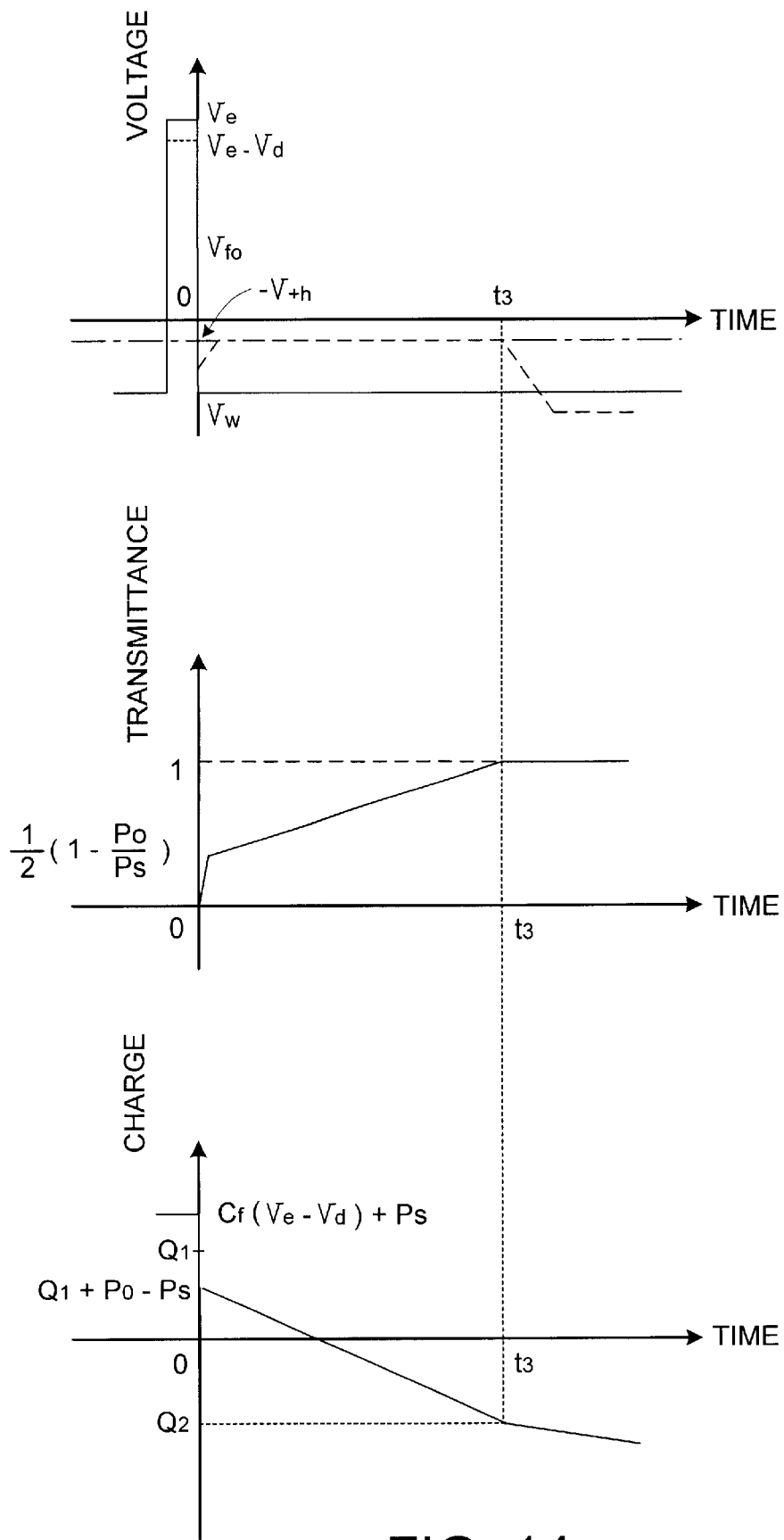
FIG. 14 is another timing diagram showing the changes as a function of time in potential and transmittance of a metal reflective portion of the SLM.

FIG. 14 shows the changes of $V_f$ and T in the writing period of the writing pulse 302 which are described above.

Next, the change of the output light intensity Y with respect to the input light intensity L is analyzed in each of the above cases (1) and (2). In the above description, it is assumed that $T_w$ is infinitely large, and the progress after the erasure pulse 301 is analyzed. However, in the actual driving pulse waveform, the reset is performed again at $t=t_w$, and the same operation is repeated in each of succeeding periods. Therefore, the output light intensity Y is observed as the time averaged value of the transmittance $T=T(t)$ in the writing period of the writing pulse 302 ($0 \leq t \leq T_w$) as follows:

$$Y = \frac{1}{T_w} \int_0^{T_w} T(t) dt \quad (30)$$

As the input light intensity L is varied, the photoelectric current $I_{ph}$ is changed in accordance with Equation (11). Also, the values of the time $t_1$, $t_2$, or $t_3$ in Equation (19), (22), or (27) is changed. When $T_w$ is fixed, the magnitude relationship among $T_w$ and $t_1$, $t_2$ or $t_3$ is changed in accordance with L. As a result, the region in the integration interval of Equation (30) is changed, so that the expression is also changed. By considering the above, when the value of Y in Equation (30) is actually calculated, the results are as follows:

(1) In the case of $V_{f0} \geq -V_{th}$:

$$Y = 0 \quad (L < L_1)$$

$$Y = (L/2L_s)(1 - L_1/L)^2 \quad (L_1 \leq L \leq L_1 + L_s)$$

$$Y = 1 - (2L_1 + L_s)/2L \quad (L_1 + L_s < L) \quad (31)$$

(2) In the case of $V_{f0} < -V_{th}$:

$$Y = (L < 2L_1)/2L_s \quad (L < L_1 + L_s)$$

$$Y = 1 - (L_1 + L_s)^2/2L_s L \quad (L_1 + L_s \leq L) \quad (32)$$

where, $$L_1 = (h\nu/\eta e)(c_f + C_a)(V_{f0} + V_{th})/T_w \quad (33)$$

$$L_s = (h\nu/\eta e)(2P_s/T_w)$$

Figure 15A:
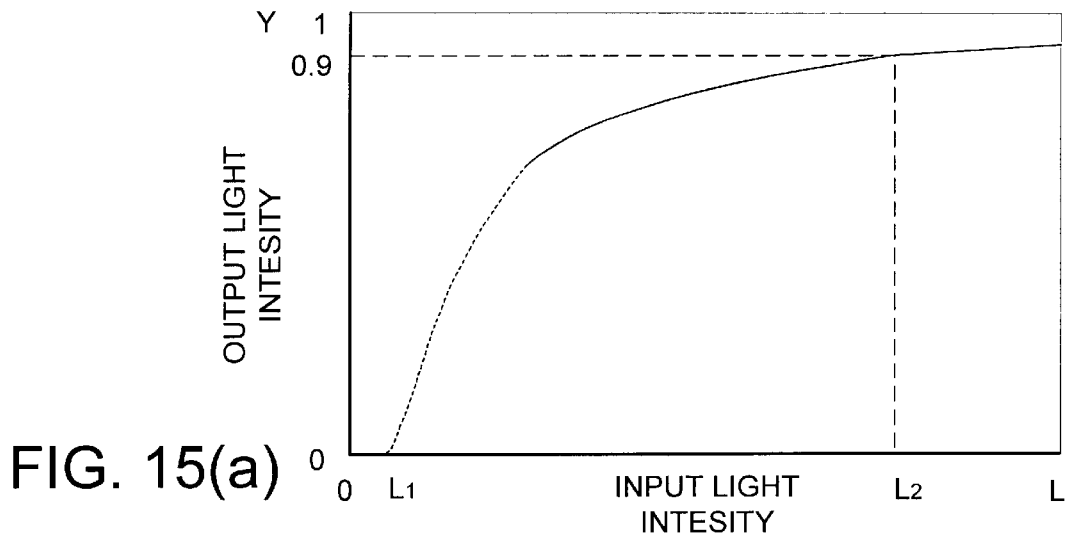
FIG. 15 shows theoretical curves showing the relationship between input and output light intensities of the SLM.
Figure 15B:
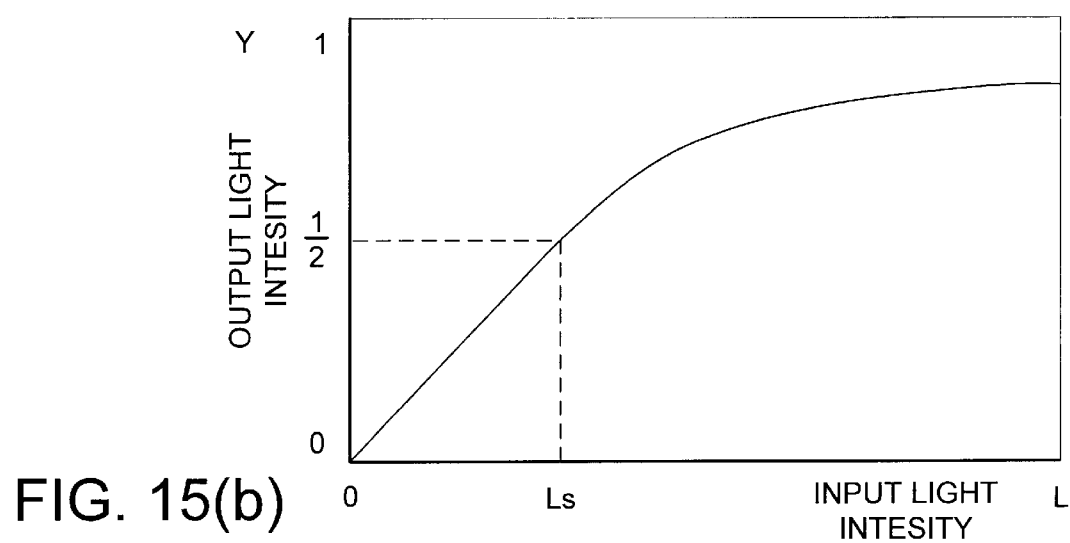

FIG. 15 is a graph showing the relationship between the input light intensity L and the output light intensity Y. In FIG. 15, (a) is a case of $V_{f0} > -V_{th}$, (b) is a case of $V_{f0} = -V_{th}$, and (c) is a case of $V_{f0} < -V_{th}$. As is seen from the graph, in the case of (a), the reading light intensity does not rise until the writing light intensity reaches a predetermined value $L_1$.

In $L>L_1$, both of the writing light intensity and the reading light intensity increase. In $L>L_1+L_s$, it is possible to obtain the light output which has almost no dependence on the writing light intensity. In the case of (b), in the region where the input light intensity is low, the writing light intensity is almost in proportion to the reading light intensity. In this case, the input image with the original gray-scale is amplified and output. In the case of (c), even when the input light intensity is 0, the output light intensity has a finite value which is not equal to 0, so that the contrast of the output image is degraded. In view of the above results, in the case of (1), the gray-scale display can be performed without degrading the contrast.

Whereas the analyses in each of the above cases (1) and (2) show that $V_f$ can be infinitely small in accordance with Equation (23) or (28), these analyses are correct only in the range where the photoconductive layer is in the state capable of generating photoelectric currents, i.e., in the reverse bias state. In the actual operation, once $V_f=V_w=V_d$ is reached, the photoconductive layer no longer generates a photoelectric current, even if the writing light intensity is set as high as possible. That is, Q has the lower limit which is expressed as follows:

$$Q_{lo}=C_f(V_w-V_d)+P_s, \text{ (in the case of } V_w-V_d=V_{th}) \quad (104)$$

$$Q_{lo}=C_f(V_w=V_d)-P_s, \text{ (in the case of } V_w=V_d=-V_{th})$$

In order to reach the ON state, the condition of $Q_{lo} \leq Q_2$, i.e., the following condition should be satisfied.

$$V_w=V_d \leq -V_{th} \quad (29)$$

As described above, the conditions for the optimal contrast are derived as follows:

$$-V_{th} \leq (C_f V_e + C_a V_w)/(C_f+C_a)-V_d, \text{ and}$$

$$V_w-V_d \leq -V_{th} \quad (105)$$

The above-described operation principle can be applied to the SLM represented by the circuit of FIG. 9. In other words, the operation principle can be applied to the SLM in which the photoconductive layer and the FLC layer are in contact with each other via the metal reflective film, such as shown in FIGS. 6 and 7. However, even in the SLM in which the dielectric reflective film (including a light absorbing layer or an overcoating layer) is provided as is shown in FIG. 8, if the dielectric reflective film and the liquid crystal layer are regarded as a single light-modulating layer, and the curve in FIG. 12 can be obtained by measuring the relationship between the applied voltage $V_f$ and the polarization charge P (or the transmittance T), $-V_{th}$ can be obtained.

Figure 29A:
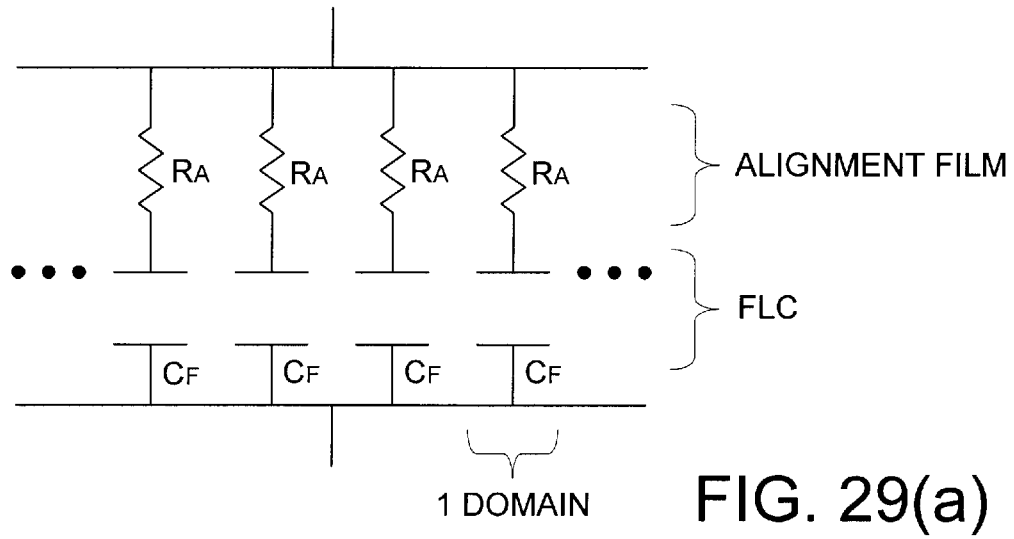
FIG. 29 shows equivalent circuits of FLC considering the alignment film.

The above discussion holds true in either the uniform state or the multi-domain switching state. However, in order to obtain both a sufficient resolution and the number of gray scales, the former state is desirable. The conditions for obtaining the state are mentioned below. FIG. 29(a) shows an equivalent circuit of one pixel portion of the FLC considering the resistance of the alignment film in the thickness direction. In FIG. 29(a), a plurality of series connections of the capacitance CF for one domain of FLC and the resistance $R_A$ of a portion of the alignment film which is in contact with the domain in the thickness direction are arranged in parallel.

Figure 29B:
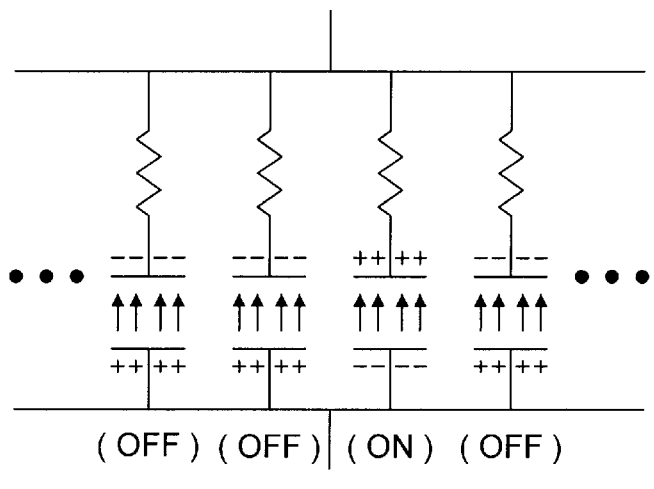
Figure 29C:
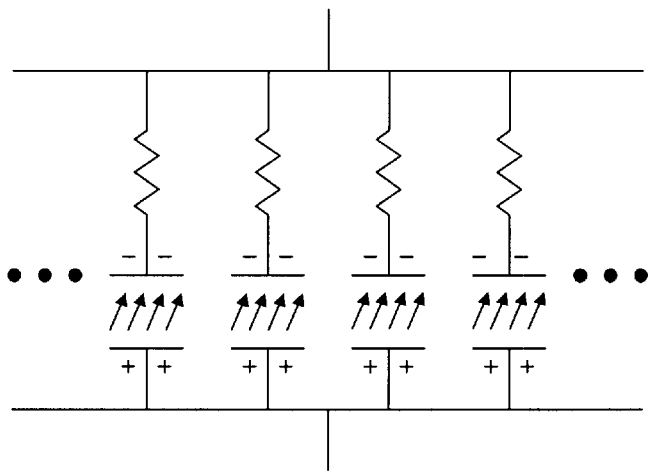

It is assumed that the initial state is the OFF state, i.e., the state where the polarizations of FLC are uniformly oriented upwardly (↑). Also, it is assumed that the charges sufficient for inverting the polarization in one domain are externally injected. The state at this instance may be the multi-domain switching state as shown in FIG. 29(b) or the uniform state as shown in FIG. 29(c) (specifically referred to herein as a "spatially uniform intermediate state"). In the state of FIG. 29(b), the orientation states between adjacent domains are different from each other. Accordingly, the stress acts between the domains, so as to transit to the uniform orientation state as shown in FIG. 29(c). However, such transition is rate-controlled by the mobility of applied charges. Therefore; in order to obtain the rapid transition, it is necessary that the charges move rapidly (in-plane averaging). For this purpose, it is sufficient to set the resistance $R_A$ (or the resistivity) of the alignment film to be small.

EXAMPLE 1

First, the intermediate state of liquid crystal was studied. Two glass substrates with transparent electrodes on which alignment films were formed were attached to each other with a gap of 1 μm interposed therebetween. Ferroelectric liquid crystals were injected into the gap, so as to form a liquid crystal panel. The construction of the liquid crystal panel is the same as that of an SLM excluding the photoconductive layer 606 and the metal reflective film 607 from the SLM shown in FIG. 6. Thus, the liquid crystal panel is referred to as a simple panel. Simple panels were produced by using various types of alignment films.

A charged capacitor (the capacitance of the capacitor was set to be sufficiently smaller than that of the simple panel) was connected in parallel to each of the simple panels, so as to inject charges into the simple panel. The orientation state of the FLC molecules at this time was observed with a polarization microscope. The amount of injected charges was set to be smaller than the amount of charges required for completely inverting the polarization of FLC molecules. In all the cases, the FLC molecules were in the intermediate state. However, there were two states as the intermediate state, i.e., the multi-domain switching state and the uniform orientation state. The latter state was confirmed by observing them under the cross Nicol conditions by the polarization microscope. When the stage of the polarization microscope on which the simple panel was located was rotated, the entire plane of the panel was observed to be uniformly dark. The liquid crystal panels in the uniform orientation state were proved to be liquid crystal panels with the alignment film of polyimide having a specific resistance of $10^{11}$ Ω·cm or less. Accordingly, it is preferable that the specific resistance of the alignment film in order to achieve the uniform orientation state is in the range of $10^8$ Ω·cm to $10^{11}$ Ω·cm. If the specific resistance of the alignment film is more than $10^{11}$ Ω·cm, the in-plane moving speed of charges in the alignment film is slow, so that the uniform orientation cannot be attained. On the other hand, if the specific resistance is less than $10^8$ Ω·cm, the reliability is deteriorated. As the material of the alignment film used in this invention, a series of conductive polyimide described, for example, in J. Photopolym. Sci. Technol., Vol. 3, No. 1 (1990) pp. 73–81.

The above uniform orientation state was stably realized for about several seconds. The reason why the time is finite is that the applied charges decay due to the leak resistance of the FLC molecules. In any case, the time is significantly longer than the switching time (about 100 μsec.) of the FLC molecules, so that it can be regarded as the stable state. The FLC molecules exhibited various orientation directions depending on the amount of injected charges. As a result, it was found that the orientation direction, i.e., the optical state could be controlled by the amount of injected charges.

As the alignment film, instead of the above-mentioned one, a high-resistive alignment film which is mixed with a conductive material, or an alignment film of which the resistance is decreased by doping an appropriate material can be used. In this example, the alignment film is applied on the entire face of the transparent electrode. Alternatively, the alignment film may be applied on the transparent electrode while some portions of the transparent electrode are not covered by the alignment film. In the portions, the FLC molecules are directly in contact with the transparent electrode, so that the resistivity of the alignment film is equivalently reduced. As a result, the charges rapidly move among domains. The liquid crystal panel is usually used by the irradiation of reading light, so that an alignment film may have photoconductivity.

The following examples mainly describe an SLM using the above-mentioned conductive polyimide.

EXAMPLE 2

Figure 16:
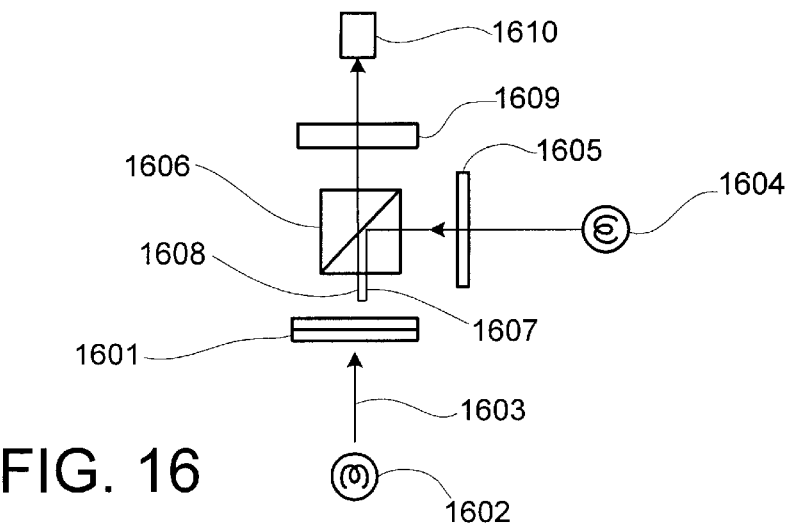
FIG. 16 shows a system for measuring the input/output light intensity characteristics of the SLM.

The SLM shown in FIG. 7 was actually driven by the driving pulse shown in FIG. 3, and the relationship between the writing light intensity L and the reading light intensity Y was measured. For the measuring, an optical system shown in FIG. 16 was used. On the reading side of an SLM 1601, a polarizer 1605 and an analyzer 1609 are provided so as to be perpendicular to each other. Writing light 1603 from a writing light source 1602 is incident on the SLM 1601. Reading light 1607 from a reading light source 1604 is incident on the SLM 1601 via the polarizer 1605 and a beam splitter 1606. In the SLM 1601, the direction of the liquid crystal molecules in the OFF state was set parallel to the polarizing direction of the polarizer 1605. As the intensity of the output light 1608, the time averaged value of light intensities measured by the photodetector 1610 was used. In order to drive the SLM 1601, the driving pulse shown in FIG. 3 was used. For the erasure pulse 301, the voltage $V_e$ was fixed to be +15 V, the time $T_e$ was fixed to be 100 $\mu$sec. For the writing pulse 302, the time $T_w$ was fixed to be 1100 $\mu$sec. and the voltage $V_w$ was variously changed. The measured values are plotted in FIG. 17. In this figure, six cases of the writing voltage $V_w$, (A) −5.40 V, (B) −4.05 V, (C) −2.70 V, (D) −1.35 V, (E) −0 V, and (F) 1.35 V are shown. As is apparent from FIG. 17, as the voltage $V_w$ increases, the whole plots are shifted to the right at substantially equal intervals. If the value of $V_w$ is in the range of −5.40 V (A) to 1.35 V (F), the Y-L relationship at any value of $V_w$ can be analogized by interpolation of the curves.

Table 1 shows the measured result of $V_{f0}$ and the calculated $V_{f0}-(-V_{th})$ for the respective cases.

|     | $V_W$ (V) | Measured value of $V_{f0}$ (V) | $V_{f0} - (-V_{th})$ (V) |
| --- | --- | --- | --- |
| (A) | −5.40 | −1.34 | −1.34 |
| (B) | −4.05 | −0.31 | −0.31 |
| (C) | −2.70 | 0.71 | 0.71 |
| (D) | −1.35 | 1.74 | 1.74 |
| (E) | 0 | 2.77 | 2.77 |
| (F) | 1.35 | 3.80 | 3.80 |

Here, how $V_{f0}$ is measured is described. Each pixel portion of the SLM in FIG. 7 has a very small area (400 $\mu m^2$), so that the impedance is large. For this reason, it is difficult to directly insert a probe for the measurement therefore, instead of the SLM shown in FIG. 7, an SLM in which an electrode corresponding to the metal reflective film was formed on the entire face (10 $cm^2$) was used for the measurement. In such an SLM, the entire surface of the SLM could be regarded as one large pixel. A probe was inserted into the electrode, and the potential at the transition from the erasure pulse 301 to the writing pulse 302 was observed by an oscilloscope.

Alternatively, when $C_a$, $C_f$, and $V_d$ are independently measured, and $V_{f0}$ is calculated from Equation (15), the calculated value of $V_{f0}$ is substantially equal to the value shown in Table 1.

A simple panel (in which liquid crystal is injected between two substrates with transparent conductive electrodes) was fabricated and the relationship between the applied voltage and the transmittance was measure. As a result, it was proved that $V_{th}$ was substantially equal to 0 V.

Figure 15C:
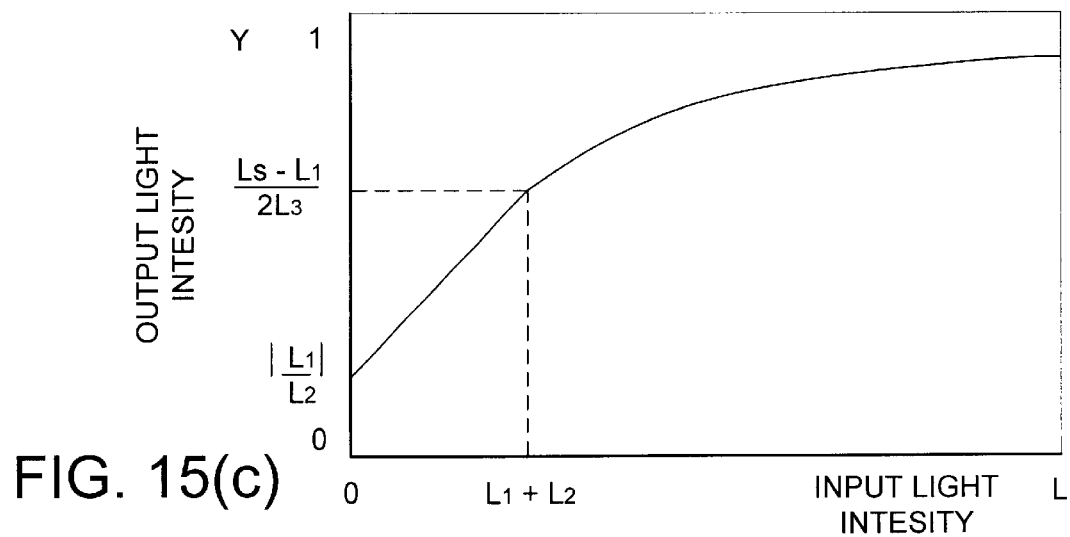
Figure 17:
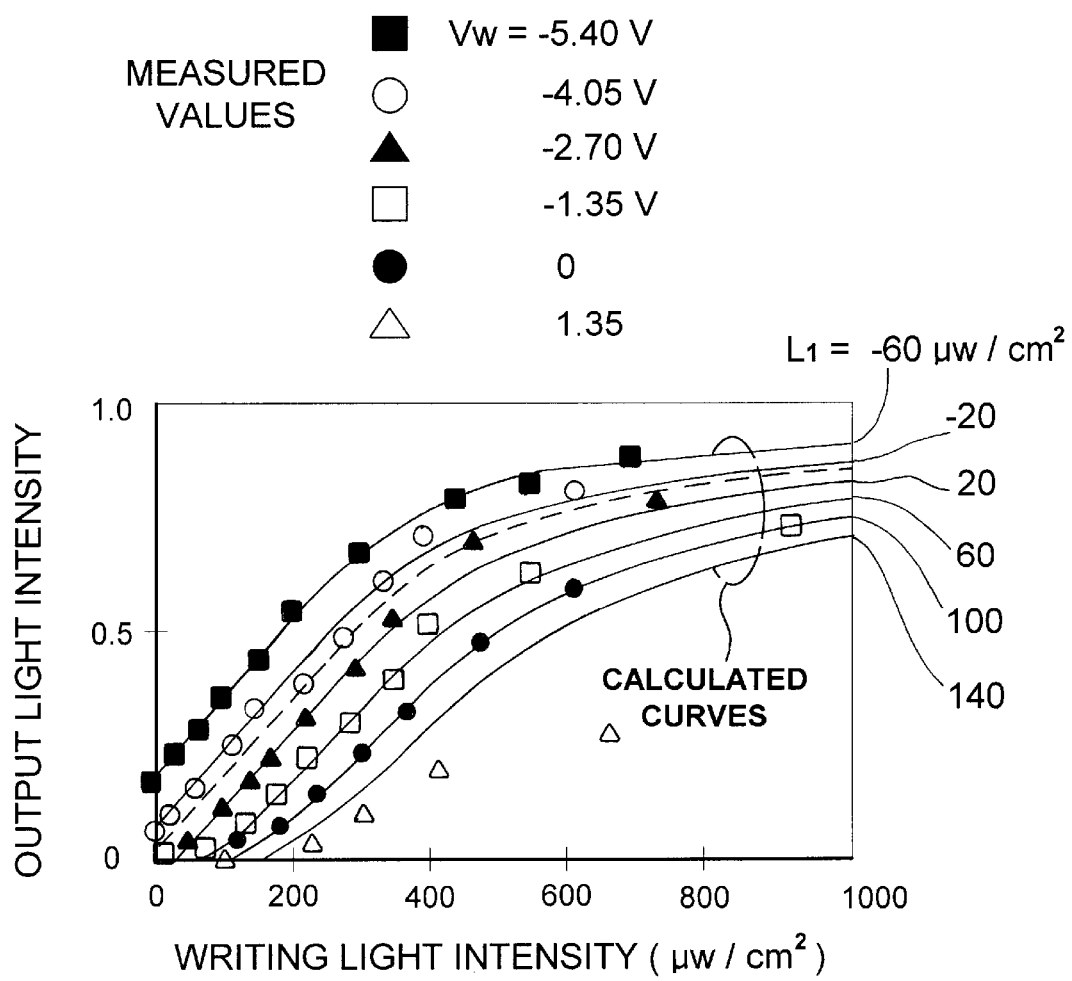
FIG. 17 shows the measured input/output light intensity characteristics of the SLM.

If the values of $V_{f0}-(-V_{th})$ in Table 1 are compared with the plots of the measured values in FIG. 17, the relationship corresponds to FIG. 15(c) when the value of $V_{f0}-(-V_{th})$ is negative (in the cases (A) and (B)), and the relationship corresponds to FIG. 15(a) when the value of $V_{f0}-(-V_{th})$ is positive (in the cases (C) to (F)). The compared result sufficiently coincides with the above-described analysis.

A broken line shown in FIG. 17 indicates the characteristics corresponding to the equation $V_{f0}-(-V_{th})=0$ which is analogized by the obtained plots. In the region below the broken line, a response with good contrast can be obtained. In other words, it is concluded that the condition $V_{f0} \geq -V_{th}$ is suitable.

In FIG. 17, in the case (F), if the writing light intensity is increased, the output light intensity does not increase. This is because the case does not satisfy the condition of Equation (29). In fact, if $V_d=0.7$ V, and $V_{th}=0$ V, the condition of Equation (29) is $V_w \leq 0.7$ V. Thus it is proved that the cases (A) to (E) satisfy this condition, but the case (F) does not satisfy the condition.

In this example, the SLM shown in FIG. 7 is described. As to the SLM shown in FIG. 6, the same results were obtained.

Figure 18:
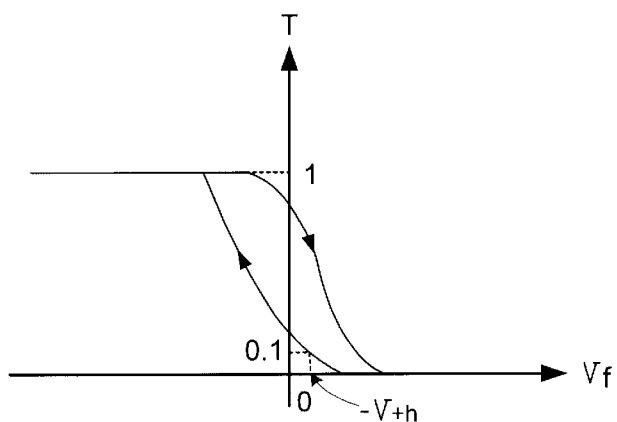
FIG. 18 shows the relationship between a transmittance of the FLC layer and a voltage when the switching threshold voltage is not clear.

In the case of the SLM shown in FIG. 8, the switching threshold voltage is not clear due to the dielectric mirror 804. The liquid crystal layer is actually attached to the dielectric mirror and they are regarded as a spurious light-modulating layer. A simple panel is constructed by using the spurious light-modulating layer, and the voltage-transmittance characteristics are measured. The measured result is shown in FIG. 18. As is seen from FIG. 18, the threshold voltage has a width. This corresponds to the polarization inversion characteristics shown in FIG. 12(c). However, if the voltage at the position where the transmittance increases by 10% of the maximum value is defined as $-V_{th}$, a good linearity and a contrast ratio are obtained in the range of Equation (105 ).

As to the experiment in FIG. 17, the value of the erasure voltage is $V_e=15$ V. If $V_e$ exceeds 40 V, the FLC molecules are decomposed by the electric field, and are likely to disadvantageously deteriorate as a function of time. If $V_e$ is smaller than 1 V, the sufficient reset can not be performed in the erasure period, which is not preferred.

If the writing voltage $V_w$ becomes less than −20 V, it is difficult to satisfy the condition of $V_{f0} \geq -_{th}$ for any value of $V_e$ in the range of 1 V $\leq V_e \leq$ 40 V. On the other hand, if $V_w$ exceeds 4 V, it is difficult to satisfy the condition of Equation (29) by any type of FLC.

Figure 27A:
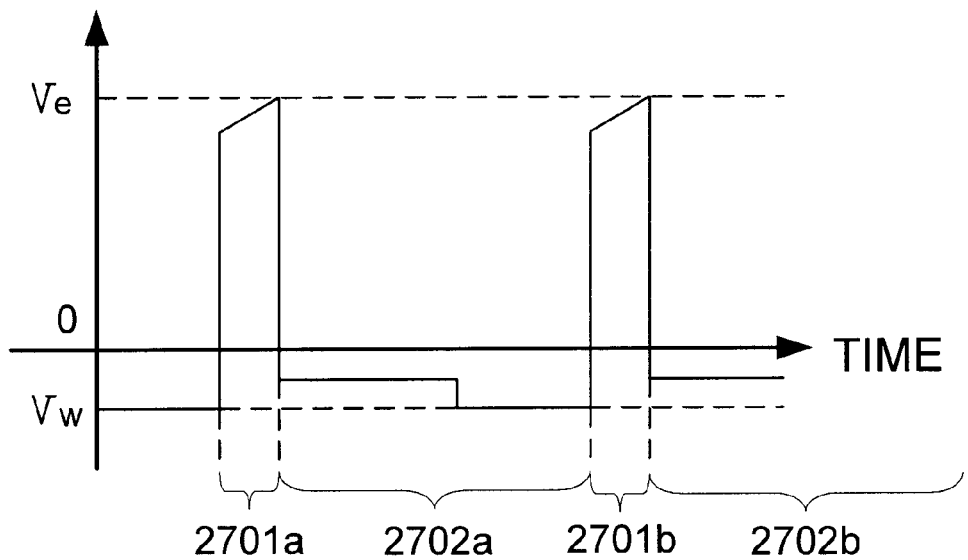
FIG. 27 shows particular waveforms of the driving pulse according to the invention.
Figure 27B:
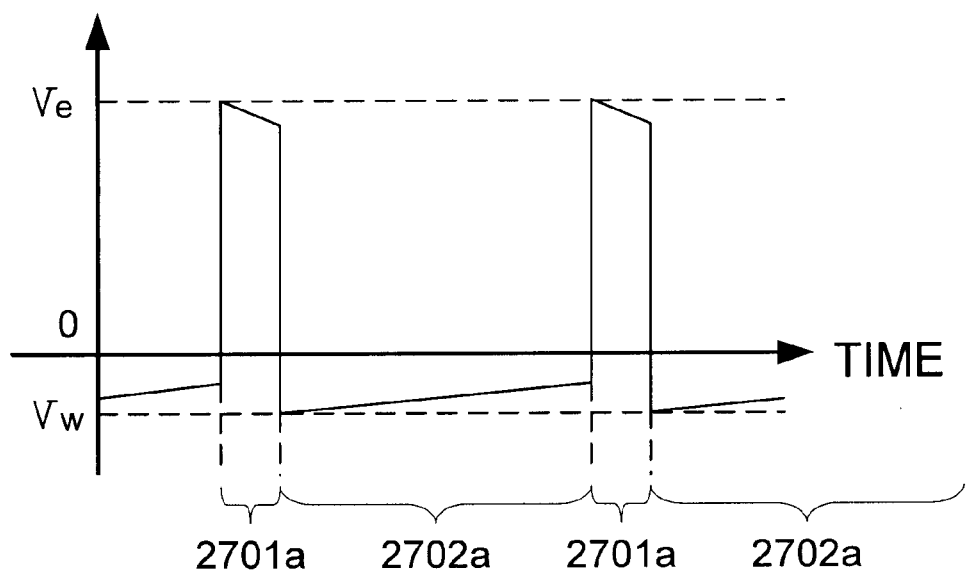

If, in the driving pulse waveform, the voltage value is not constant in an erasure pulse 2701 and a writing pulse 2702, for example, as is shown in FIGS. 27(a) and 27(b), there is no problem. However, in such a case, the condition of Equation (105) is preferable by regarding the maximum value in the erasure voltage of the erasure pulse 2701 as $V_e$ and the minimum value in the writing voltage of the writing pulse 2702 as $V_w$.

EXAMPLE 3

Figure 19:
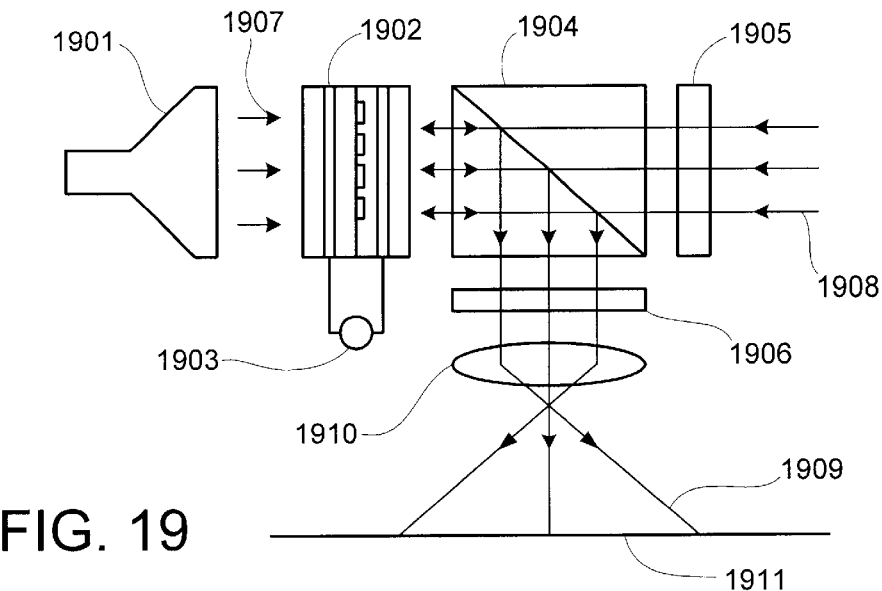
FIG. 19 shows a system of a projection-type display.

A projection-type display system was produced by using the SLM shown in FIG. 7. The system is shown in FIG. 19. As the writing information of an SLM 1902, an image presented on a CRT 1901 is used. Writing light 1907 is incident on the SLM 1902. A driving pulse is supplied by a driving power source 1903 and applied to the SLM 1902. On the reading side, reading light 1908 from a metal halide lamp is directed to the SLM 1902 via a polarizer 1905 and a beam splitter 1904. The output light is taken out via an analyzer 1906 and a lens 1910, so that an image is projected on a screen 1911. The screen of the SLM 1902 has a square size of 2.5 cm×2.5 cm. On the screen 1911, the projected image is magnified so as to have a square size of 100 cm×100 cm. For the erasure pulse, the same as in Example 2, $V_e$=15 V, $T_e$=100 μsec. For the writing period, $T_w$1100 μsec. and $V_w$ was set to be six different values (Table 1).

In all the cases, image was observed on the screen. In the cases (C), (D), and (E), the gray scales in the input image on the CRT 1901 were reproduced with good contrast. This coincides with the result in Example 2, and corresponds to the most ideal case. In these cases, the gray-scale display characteristics of image were asymmetric with respect to the writing light intensity, but it was possible to perform a faithful gray-scale display by appropriately adjusting the δ characteristics of the writing image. The brightness on the screen was 1000 lx. The contrast ratio on the screen was 400:1. On the screen, one pixel was magnified to have a square size of 1 mm×1 mm, but the crosstalk between adjacent pixels was not observed. Thus, a fine image could be obtained. In the cases (A) and (B), the contrast was poor, and the image was entirely whitish. In the case (F), only a dark image could be obtained, and the brightness on the screen was 300 lx.

In an alternative example, a TFT liquid crystal display was used instead of the CRT 1901. In this alternative example, the same results were obtained.

In another alternative example, a system is constructed by assembling three sets of a CRT and a SLM. The three sets correspond to RGB (red, green, and blue), respectively. By the system, an image was synthesized an the screen. As a result, a vivid color image could be obtained.

EXAMPLE 4

Figure 20:
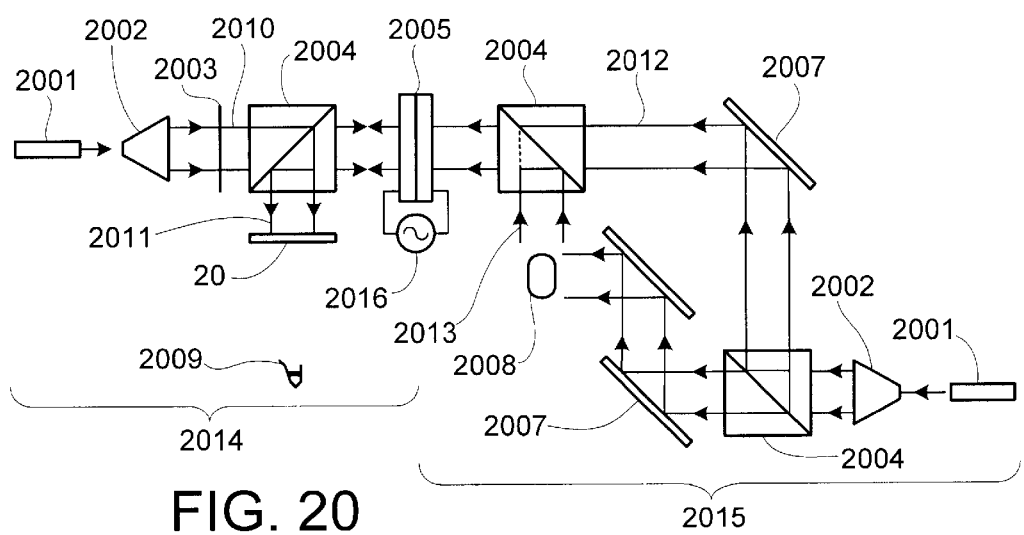
FIG. 20 shows a system of a holography television.

A holography television system was produced by using the SLM shown in FIG. 7. The system includes a He—Ne laser 2001, a beam expander 2002, a polarizer 2003, a beam splitter 2004, an SLM 2005 and a screen 2006 in a reading side 2014. The system also includes a He—Ne laser 2001, a beam expander 2002, two beam splitters 2004 and two reflective mirrors 2007 in a writing side 2015. A driving pulse is supplied by a driving power source 2016 to the SLM 2005. The reference numerals 2010 and 2011 indicate reading light and output light, respectively. The reference numeral 1009 indicates an observer. Specifically, the SLM had 5,000×5,000 pixels with a pixel pitch of 5 μm. The employed system was shown in FIG. 20. The fringe pattern formed by reference light 2012 from a He-Ne laser 2001 and object light 2013 was written into an SLM 2005, then was read out by the He—Ne laser 2001, and the observation was conducted on a screen 2006. The driving was performed under the five conditions ((A)–(E)) in Example 2. As a result, a vivid 3D image could be obtained on the screen 2006. When an object 2008 was moved, the output image was accordingly moved in real time. Under the conditions (C), (D), and (E) in Example 2, the fringe pattern information was reproduced on the output side with high contrast, so that the obtained 3D image was most vivid and included reduced noises.

If the fringe pattern information was captured by a CCD imaging device, and the information was presented on the CRT and written into the SLM, the same results were obtained.

EXAMPLE 5

In this example, the feedback to the driving conditions or optical writing conditions is considered. If a filter having a transmittance τ is inserted on the input side of the SLM as a means for modulating the intensity of the input light (writing light), the relationship between the writing light intensity L and the output light intensity Y is expressed as follows on the basis of Equations (30) to (33):

(1) When $L_1 > 0$ (i.e., $V_{f0} > -V_{th}$), $$Y=0 (L<L_1)$$

$$Y=(L/2L_S)(1-L_1/L)^2, (L_1 \leq L \leq L_1+L_S)$$

$$Y=1-(2L_1+L_S)/2L, (L_1+L_S<L) \tag{34}$$

(2) When $L_1 \leq 0$ (i.e., $V_{f0} \leq -V_{th}$), $$Y=1-(L-2L_1)/2L_S (L<L_1+L_S)$$

$$Y=1-(L_1+L_S)^2/2L_S L (L_1+L_S \leq L) \tag{35}$$

where $L_1$ and $L_S$ are defined as follows:

$$L_1=(h\nu/\eta e)(C_f+C_a)(V_{f0}+V_{th})/T_w \tau$$

$$L_S=(h\nu/\eta e)(2P_S/T_w \tau) \tag{36}$$

$$V_{f0}=(C_f V_e + C_a V_w)/(C_f + C_a) - V_d$$

The characteristics of Equations (34) to (36) are simplified as follows irrespective of the case (1) or (2):

$$Y=Y(L; L_1, L_S)$$

$$L_1 L_1(C_f, V_{th}, V_e, V_w, T_w \tau) \tag{37}$$

$$L_S=L_S(P_S; T_w, \tau)$$

In other words, the input/output light intensity characteristics are determined by only the two parameters $L_1$ and $L_S$. Therefore, if $V_e$, $V_w$, $T_w$, and τ can be adjusted so that $L_1$ and $L_S$ are fixed even when the parameters relating to the ferroelectric liquid crystal such as $C_f$, $V_{th}$, and $P_S$ are changed, the input/output light intensity characteristics are not changed (fixed).

It is assumed that the parameters $C_f$, $V_{th}$, and $P_S$ are changed and hence $L_1$ and $L_1$ are changed by $dL_1$ and $dL_S$, respectively. The change of the output light intensity L for the fixed writing light intensity L is given as follows:

$$dY=(\partial Y/\partial L_1)dL_1+(\partial Y/\partial L_S)dL_S \tag{38}$$

By using the above equation, the changes $dL_1$ and $dL_S$ of $L_1$ and $L_S$ are reversely obtained by the following equations, by measuring the changes $dY_A$ and $dY_B$ of the output light intensity for two different writing light intensities $L=L_A$ and $L=L_B$.

$$dL_1 = [(\partial Y/\partial L_S)_{L=LB} \cdot dY_A - (\partial Y/\partial L_S)_{L=LA} \cdot dY_B]/\Delta$$

$$dL_S = [-(\partial Y/\partial L_1)_{L=LB} \cdot dY_A + (\partial Y/\partial L_1)_{L=LA} \cdot dY_B]/\Delta$$

$$\Delta = (\partial Y/\partial L_1)_{L=LA} \cdot (\partial Y/\partial L_S)_{L=LB} - (\partial Y/\partial L_S)_{L=LA} \cdot (\partial Y/\partial L_1)_{L=LB} \quad (39)$$

In the above equations, for example, $(\partial Y/\partial L_1)_{L=LA}$ denotes the partial differential coefficient at the writing light intensity of $L=L_A$. Once the values of $dL_1$ and $dL_S$ are thus obtained, the driving conditions and the optically writing conditions are corrected so as to change $L_1$ and $L_S$ by $-dL_1$ and $-dL_S$. That is, the conditions ($V_e$, $V_w$, $T_w$, and $\tau$) are changed by $dV_e$, $dV_w$, $dT_w$, and $d\tau$, so as to satisfy the following conditions:

$$-dL_1 = (\partial L_1/\partial V_e)dV_e + (\partial L_1/\partial V_w)dV_w + (\partial L_1/\partial T_w)dT_w + (\partial L_1/\partial \tau)d\tau$$

$$-dL_S = (\partial L_S/\partial T_w)dT_w + (\partial L_S/\partial \tau)d\tau \quad (40)$$

As to the changing manner, for example, the feedback can be performed only for the driving conditions according to the following equations:

$$dV_e = 0$$

$$dV_w = [(\partial L_1/\partial T_w)dL_S - (\partial L_S/\partial T_w)dL_1]/[(\partial L_1/\partial V_w)(\partial L_S/\partial T_w)] \quad (41)$$

$$dT_w = -(\partial L_S/\partial T_w)^{-1}dL_S$$

$$d\tau = 0$$

Alternatively, for example, the feedback can be performed for both of the driving conditions and the optically writing conditions according to the following equations:

$$dV_e 0$$

$$dV_w [(\partial L_1/\partial \tau)dL_S - (\partial L_S/\partial \tau)dL_1]/[(\partial L_1 \partial V_w)(\partial L_S/\partial \tau) \quad (42)$$

$$dT_w 0$$

$$d\tau = -(\partial L_S/\partial \tau)^{-1}dL_S$$

There may be still another changing way, for example, in which $dV_e$ is not 0.

In this example, the two values of $L_A$ and $L_B$ are set as the writing light intensity and then the values of $dL_1$ and $dL_S$ are obtained. Alternatively, three or more values can be used. For example, specifically, for three or more writing light intensities $L^{(i)}$ ($i=1, 2, 3, \ldots$), the corresponding output light intensities $y^{(i)}$ ($i=1, 2, 3, \ldots$) are measured, respectively, and then the values of $L_1$ and $L_S$ which make D to be minimum are calculated by using the following equation with Y in Equation (37):

$$D = \sum_i \{Y^{(i)} - Y(L^{(i)}; L_1, L_s)\}^2 \quad (43)$$

Then, the changes of the values of $L_1$ and $L_S$ can be obtained.

If there is only one value $L_A$ which is used as the writing light intensity, only one relationship can be obtained in accordance with Equation (38). Therefore, it is impossible to determine a unique set of $dL_1$ and $dL_S$. That is, it is impossible to find the feedback way so as to keep the input/output light intensity characteristics constant. However, it is possible to approximately stabilize the input/output light intensity characteristics by using the writing light intensity in the vicinity of $L_A$.

As described above, FIG. 17 shows the plots of actually measured values and illustrates the relationship between the input light intensity and the output light intensity for the SLM 717 shown in FIG. 7. As to the driving conditions, the erasure period of the erasure pulse 301 was $T_e 0.1$ msec., the voltage value was $V_e=15$ V, the writing period of the writing pulse 302 was $T_w 1.1$ msec. The obtained input/output light intensity characteristics were compared with the theoretical characteristics given be Equations (31) to (33). When the value of $L_S$ is fixed to be 290 $\mu$W/cm$^2$ and the value of $L_1$ is set to be $100+30$ $V_w$ (the units of $L_1$ and $V_w$ are $\mu$W/cm$^2$ and V respectively), the plots of all the values of $V_w$ coincide with the theoretical curves (except for the case (F)). The theoretical curves for respective values of $V_w$ are also shown in FIG. 17.

In this measurement, if a filter with transmittance $\tau$ is inserted on the input side, and the writing period is varied from 1.1 msec., it is analogized by Equation (36) the values should be set as follows:

$$L_1 = (110 + 33V_w)/T_w\tau \quad (44)$$

$$L_S 319/T_w\tau$$

The unit of $L_1$ and L is $\mu$W/cm$^2$, the unit of $V_w$ is V, the unit of $T_w$ is msec. and $\tau$ is a dimensionless number. In this example, the voltage value of erasure pulse is fixed to be $V_e=15$ V.

EXAMPLE 6

Figure 21:
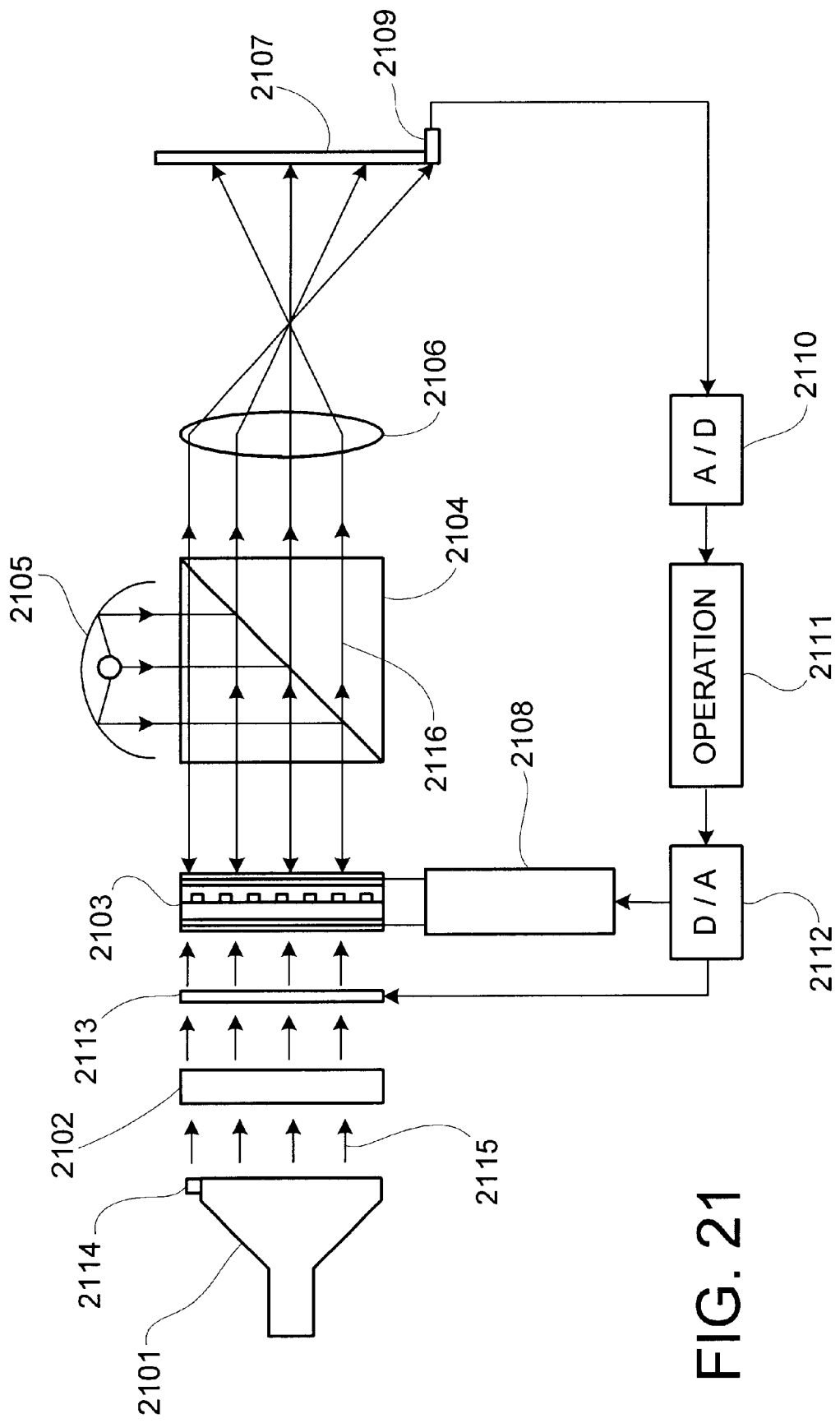
FIG. 21 shows a system of a projection-type display additionally having a feedback system.

FIG. 21 shows an exemplary construction of a projection-type display system including means for maintaining the input/output light intensity characteristics of an SLM constant. An SLM 2103 has a construction shown in FIG. 7 and includes 10$^6$ pixels with a pixel pitch of 25 $\mu$m, which was produced in the previous example. As an input image information source, a CRT 2101 located on the writing side of the SLM 2103 was used. The period of image presentation of the CRT 2101 was 16.7 msec. A SELFOC lens array 2102 was used for forming an image of writing light 2115 from the CRT 2101 on an input face of the SLM 2103. The reading side of the SLM 2103 was irradiated with light of 250 w from a metal halide lamp 2105. The output image is projected onto a screen 2107 via a polarization beam splitter 2104 and a lens 2106. A reference light generator 2114 is provided in a portion of an image presentation face of the CRT 2101. The reference light generator 2114 can generate continuous light having various different intensities. The intensity of the output light 2116 corresponding to the reference light is monitored by a photodetector 2109 on the screen 2107. In accordance with the monitored value, a control signal is generated by a signal processing system constituted of an A/D converter 2110, an operation unit 2111, and a D/A converter 2112. The generated control signal is fed to a driving pulse generator 2108 or a transmittance variable filter 2113. The driving pulse waveform generated by the driving pulse generator 2108 and the transmittance of the transmittance variable filter 2113 are varied in accordance with the control signal.

In FIG. 21, instead of the SELFOC lens array 2102, an imaging optical system with usual lenses can be used. Instead of the polarization beam splitter 2104, a combination of a usual beam splitter, a polarizer, and an analyzer can be used In FIG. 21, for the convenience, the A/D converter 2110, the operation unit 2111, the D/A converter 2112, and the driving pulse generator 2108 are separately shown in terms of their functions. They can be constructed as a combined single electric circuit having the same functions. In the case where the photodetector 2109 is located on the screen 2107, the signal can be fed to the A/D converter 2110 by various methods. In this example, the signal is fed to the A/D converter 2110 via electric wiring. Alternatively, the signal can be fed by a radio system using radio waves, infrared rays, or the like. In another construction, the A/D converter 2110 is provided near the photodetector 2109, and a digitized signal is fed by such a radio system. The reference light generator 2114 may alternatively be implemented by a portion of the image presentation portion of the CRT 2101.

In this example, the photodetector 2109 is provided on the screen. Alternatively, the photodetector 2109 may be provided, for example, directly in front of the lens 2106 or directly in the rear of the lens 2106. The number of lenses may be increased. If plural lenses are used, the photodetector may be provided in the lens system. Such a construction in which the photodetector is located in the vicinity of the lens system has an advantage in that the positional alignment of the projection system and the screen is not required.

The transmittance variable filter is constructed in various styles, and the transmittance thereof is controlled in accordance with the construction. For example, in the transmittance variable filter, a liquid crystal panel is sandwiched between a polarizer and an analyzer, and the transmittance is controlled by changing the voltage applied to the liquid crystal panel. Alternatively, in the transmittance variable filter, two polarizing plates are faced each other and the transmittance is controlled by rotating one of the polarizing plates. In this example, the former construction and transmittance control means are used.

In order to actually operate the system, the reference operating conditions are obtained in the following manner. First, as the optically writing conditions and the driving conditions, $V_w$ was set to be −2.7 V, $T_w$ be 1.1 msec. and $\tau$ be 0.8. In accordance with Equation (44), $L_1$ was obtained as 23.8 $\mu W/cm^2$, and $L_S$ as 363 $\mu W/cm^2$. As the intensity of the light from the reference light generator 2114, two values were set, e.g., $L_A$ 100 $\mu W/cm^2$ and $L_B$=400 $\mu W/cm^2$. The output light intensities corresponding to these values were obtained as $Y_A$=0.08, and $Y_B$−0.49, respectively, on the basis of Equations (34) to (36).

Next, the operation of the operation unit 2111 when the system is actually operated in the above conditions is specifically described. The output light intensities corresponding to the two values of writing light intensities $L_A$ and $L_B$ are measured (the measured values are represented by $Y_A'$ and $Y_B'$, respectively), and the deviation from the reference conditions, i.e., $dY_A$−$Y_A'$−$Y_A$ and $dY_B$=$Y_B'$−$Y_B$ are calculated. By applying the calculated values into Equation (39), the changed amount of $L_1$ and $L_S$, i.e., $dL_1$ and $dL_S$ are obtained. In Equation (39), the partial differential coefficients such as $(\partial Y/\partial L_S)_{L=LA}$ are obtained by applying $L_1$=23.8 $\mu W/cm^2$ and $L_S$=363 $\mu W/cm^2$, and $L_A$100 $\mu W/cm^2$ and $L_B$=400 $\mu W/cm^2$, etc. into partial differential equations of Equation (34) or (35). If $dL_1$ and $dL_S$ are actually calculated by Equation (39), the result is given as follows:

$$dL_1 = -596 dY_A + 97.9 dY_B \tag{45}$$

$$dL_S = 1149 dY_A - 931 dY_B$$

Here, the unit of $L_1$ and $L_S$ is $\mu W/cm^2$, and $dY_A$ and $dY_B$ are dimensionless numbers. If the values of $dL_1$ and $dL_S$ are applied into Equation (42), it is determined how much $V_w$ and $\tau$ should be varied. The partial differential coefficients such as $\partial L_1/\partial \tau$ in Equation (42) are obtained by applying $V_w$−2.7 V, $T_w$=1.1 msec. and $\tau$=0.8 into partial differential equations of Equation (44). The equations for actually obtaining $dV_w$ and $dT$ are given as follows:

$$dV_w = (-26.7 dL_1 + 1.747 dL_S) \times 10^{-3} \tag{46}$$

$$d\tau = 2.21 dL_S \times 10^{-3}$$

When $V_w$ and $\tau$ are actually varied by $dV_w$ and $d\tau$ obtained above, the standard input/output light intensity characteristics ($L_1$=23.8 $\mu W/cm^2$, $L_S$=363 $\mu W/cm^2$) are maintained. The above series of processes are repeated at a predetermined cycle (e.g., 10 sec. ), the input/output light intensity characteristics are always kept constant.

As to the measurement timing, for example, $Y_A$ is measured in the first 1 sec. of 10 sec. cycle, and $Y_B$ is measured in the second 1 sec. In the remaining 8 sec., $dV_w$ and $d\tau$ are calculated and the driving conditions and the optically writing conditions are corrected. Alternatively, two reference light generators 2114 which emit two types of light having fixed intensities $L_A$ and $L_B$ may be adjacently provided. In such a case, the output $Y_A$ and $Y_B$ corresponding thereto are simultaneously monitored.

The system was actually operated in the above manner. The gray-scale display characteristics of the output image on the screen were not changed from the initial conditions even after 500 hours. This means that the input/output light intensity characteristics of the SLM 2103 are kept constant. Next, as an comparative example, the system was operated in the constant driving and optically writing conditions without feedback. The gray-scale display characteristics were changed only after few minutes, and the entire screen was observed as becoming whitish. As a result, it is proved that the feedback stabilizes the gray-scale display characteristics.

In this example, the measurement of $Y_A$ and $Y_B$ is performed at one point. Alternatively, in order to increase the accuracy, a plurality of reference light 25 generators 2114 are provided and a plurality of sets ($Y_A$, $Y_B$) are measured correspondingly. Then, the averaged value is calculated, and used for the process. If the temperature distribution in the effective area of the SLM 2103 is not uniform, for example, the characteristic quantities of the FLC such as $P_S$ are also varied in an in-plane distribution manner. Therefore, if the transmittance variable filter 2113 has the inplane distribution of the transmittance variation for compensating such temperature distribution in the SLM 2103, the gray-scale display can be more stably performed In this example, a monochrome display is performed on the screen. It is appreciated that the display can be expanded into a three-color display. Specifically, for example, when three sets of a CRT and an SLM are used as the optically writing means so as to perform the writing of RGB image signals, respectively, there should be provided three sets of the reference light generators 2114 and the photodetectors 2109. In each of the sets, prior to the photodetector 2109, a corresponding set of monochrome filters of red, blue and green is located, so as to detect the light intensity of each color component. Thus, the feedback can separately performed for each of the three sets of driving systems and optically writing systems.

In this example, the SLM having a construction shown in FIG. 7 is used. Alternatively, for example, even in the cases where SLMs shown in FIGS. 6 and 8 are used, a stable gray-scale display can be obtained by performing the feedback in the same way.

It is understood that the way of feedback can be applied to, in addition to the projection-type display, a holography television, an optical computer, and the like.

EXAMPLE 7

Next, the system was operated by performing the feedback only to $V_w$ and $T_w$ in the driving conditions on the basis of Equation (41) instead of Equation (42). The operation was performed in the same way as in Example 6, except that the feedback was performed for the length of the writing period $T_w$, instead of the transmittance of the transmittance variable filter 2113. As the result of the operation, the same effects could be attained as in Example 6. In the operation method of Example 7, it is possible to eliminate the transmittance variable filter 2113 itself. Thus, the system can have a more simplified construction.

EXAMPLE 8

Next, the system was operated by changing the electron beam current value in the CRT 2101, instead of changing the transmittance of the transmittance variable filter 2113 in Example 6. Specifically, in an electron gun of the CRT 2101, a direct current bias voltage is superimposed on a control grid to which a video signal is applied, and the feedback is performed for the direct current bias voltage value, so as to perform the operation. The construction of the system is the same as that shown in FIG. 21 except that the transmittance variable filter 2113 is not provided and that the feedback is performed for the direct current bias voltage value of the control grid of the CRT 2101. According to the method of Example 8, the same effects can be attained as in the case where the transmittance variable filter 2113 is provided in front of the CRT 2101, and the obtained image is as stable as in Example 6.

EXAMPLE 9

Next, the system shown in FIG. 21 was operated by using a liquid crystal panel with backlight instead of the CRT 2101. The obtained image was as stable as in the case where the CRT 2101 was used.

It is possible to vary the transmittance by performing the feedback for the driving system of the liquid crystal panel, or to perform the feedback to the brightness of the backlight, instead of the use of the transmittance variable filter 2113.

In Examples 2 to 9 described above, the CRT is often used as the optical writing means. If the lifetime of the fluorescence is sufficiently longer than the driving pulse period of the SLM (e.g., the lifetime of the fluorescence is 3 msec, while the driving pulse period is 1.2 msec.), the fluorescence from the phosphor on the CRT can be regarded as the continuous light

EXAMPLE 10

Next, the principle for realizing a uniform image display by the method of the invention is described. The timing chart (a) of FIG. 22 indicates the intensity of an electron beam 2203 in the CRT. The timing chart (b) indicates the emitted light intensity from a phosphor on the CRT screen. The timing charts (c) and (e) indicate the waveforms of driving signals 2208 and 2215, respectively. The timing charts (d) and (f) indicate the intensities of output light 2209 and output light 2216 from the SLM, respectively. The electron beam scans the CRT screen. In terms of a certain pixel on the CRT, the pixel is reached by the electron beam every one frame (one display period) 2202 of the image. At this time, the intensity of the electron beam 2203 is approximately in proportion to the brightness of the pixel in the image to be displayed on the CRT in the frame. Therefore, the electron beams 2203 having different intensities 2201a, 2201b, and 2201c continuously reach each pixel at a predetermined interval. The phosphor on the CRT emits light having an intensity which is approximately in proportion to the intensity of the reached electron beam 2203. The emitted light from the phosphor decays with its characteristic time constant. Accordingly, the characteristic curve of the intensity 2204 of the light emitted from the phosphor shown in the timing chart (b) of FIG. 22 is obtained.

In one frame 2202 of the CRT, when an SLM is driven by a plurality of unit driving signals (driving pulses) 2207, the intensity 2209 of the output light for each unit driving signal (driving pulse) 2207 is in proportion to the intensity 2204 of the emitted light from the phosphor at that time. As a result, the brightness of the pixel sensed by the eyes of a person, i.e., the time averaged value of the output light intensity 2209 in the frame 2202 is substantially in proportion to the fluorescence intensity 2204 from the phosphor. Accordingly, a faithful image is reproduced on the SLM. As the number of unit driving signals (driving pulses) 2207 in one frame 2202 is increased, the envelope linking the peaks of output light intensity 2209 in each unit driving signal 2207 becomes closer to the curve of fluorescence intensity 2204 shown in the timing chart (b) in FIG. 22. As a result, the output light intensity 2209 does not depend on the time difference between the driving signal (driving pulse voltage) 2208 and the electron beam intensity 2203. In other words, in whichever portion of the driving signal 2208 the electron beam pulses 2201 having different intensities 2201a, 2201b, and 2201c enter, the time averaged value of the output light intensity 2209 in one frame 2202 is not so changed. This means that the output light intensity 2209 can be obtained at the same sensitivity with respect to the intensity of the electron beam 2263 in any portion on the screen of the SLM, so that the brightness of the output image of the SLM is uniform.

The image was displayed by using the SLM shown in FIG. 7 and the optical system shown in FIG. 19 in which the CRT was used as the optical writing means. The pixel pitch of the CRT 1901 may coincide with the pixel pitch of the SLM 1902, but alternatively may not coincide therewith. In this example, in the employed CRT 1901, the pixel pitch was 50 μm, and the number of scanning lines was 525. The decay time constant τ of the fluorescence from the phosphor on the CRT expressed by Equation (9) was 7 msec. In order to form the image of the CRT 1901 on the photoconductive layer of the SLM 1902, an imaging optical system such as a lens system or a SELFOC lens array (the trade mark of NIHON ITA GLASS K.K.) may be inserted.

One frame of the CRT 1901 was 16.7 msec., and the driving period of the SLM 1902 was set to be shorter than this (e.g., about 1 msec.). As to the mutual driving method, they may be driven independently without synchronization, or they may be driven with synchronization by generating a trigger pulse every several times driving periods of the SLM (e.g., every sixteenth period) and sending the trigger pulse to the CRT 1901. In this optical system, the former method was adopted.

As is shown in the timing chart (c) of FIG. 22, the SLM 1902 was actually driven by using a driving signal 2208 including a number of unit driving signals (driving pulses) 2207, and a moving image was reproduced on the CRT 1901. Then, the output light from the SLM 1902 was monitored. In the unit driving signal (driving pulse) 2207, the width of the erasure pulse 2205 was 0.1 msec. and the voltage (height) was +10 V. The width of the reading pulse 2206 was 1.1 msec., and the voltage (height) was −0.91 V. In this case, one period of the CRT was 1.2 msec. The output light from the SLM 1902 was directly monitored by an observer at the position of the lens 1910 via the beam splitter 1904. As the result of the observation, it was proved that the image-displayed on the CRT 1901 was faithfully reproduced on the output face of the SLM 1902. The brightness of the reproduced image was uniform over the entire screen of the SLM. In addition, the gray-scale representation was faithfully reproduced. Moreover, for the brightness of the reading light 1908 as much as $10^6$ lx, an image with good contrast was obtained. The contrast ratio in this condition was 200:1. On the output face of the SLM, the residual image phenomenon was not observed with respect to the moving image of the CRT. Since conductive polyimide with high stability was used for the alignment film for the liquid crystal molecules of the SLM 1902, the temporal change did not occur but was stable even after the continuous driving over several hundreds of hours. Therefore, the quality and the brightness of the output image from the SLM would not be changed.

Moreover, the intensity of the reading output light 1909 was detected by the photodetector, and the temporal change was observed with an oscilloscope. As the result of the observation, the waveform of the output light intensity 2209 shown in the timing chart (d) of FIG. 22 was obtained for the driving signal 2208 shown in the timing chart (c). The envelope smoothly linking the peaks of the output light intensity 2209 in each unit driving signal (driving pulse) 2207 substantially coincided with the waveform of the fluorescence intensity 2204 from the phosphor shown in the timing chart (b). The response of the output light intensity 2209 was not saturated even for the fluorescence intensity 2204 from the phosphor in the case where the intensity pulse of the electron beam 2203 was maximum.

EXAMPLE 11

Next, a driving signal (driving pulse) 2215 including a unit driving signal (driving pulse) 2214 shown in the timing chart (e) of FIG. 22 was used for driving the optical system shown in FIG. 19. The unit driving signal 2214 includes an erasure pulse 2210, a first low voltage pulse 2211, a writing pulse 2212, and a second low voltage pulse 2213. In the unit driving signal (driving pulse) 2214, the width of the erasure pulse 2210 was 0.1 msec., and the voltage (height) was +10 V. The width of the first low voltage pulse 2211 was 0.1 msec., and the voltage (height) was 0 V. The width of the writing pulse 2212 was 0.1 msec., and the voltage (height) was −10 V. The width of the second low voltage pulse 2213 was 0.9 msec., and the voltage was 0 V. In this example, the SLM having the construction shown in FIG. 7 was employed. In this case, the image on the CRT 1901 was faithfully reproduced on the output face of the SLM 1902 with uniform brightness. In addition, on the output face of the SLM, the gray-scale representation was performed, and the residual image phenomenon was not observed. The brightness of the reading light from the SLM 1902 could be increased as high as $10^6$ lx. However, the switching phenomenon of FLC occurred due to the electric field caused by the writing pulse 2212 included in the driving signal 2215. Accordingly, the image contrast on the output face of the SLM was somewhat inferior to that in Example 10, and the contrast was 80:1. The reproduced image was observed sufficiently. The positive and negative portions of the driving signal 2215 were symmetric with respect to the voltage, so that the driving stability of SLM was further enhanced. The SLM was stable after continuous driving for several thousands of hours.

In the same way as in Example 10, the intensity of the output light 1909 was detected by the photodetector, and the change as a function of time was observed by the oscilloscope. As a result, the wave-form of the output light intensity 2216 shown in the timing chart (f) in FIG. 22 was obtained for the driving signal 2215 shown in the timing chart (e).

EXAMPLE 12

Figure 23A:
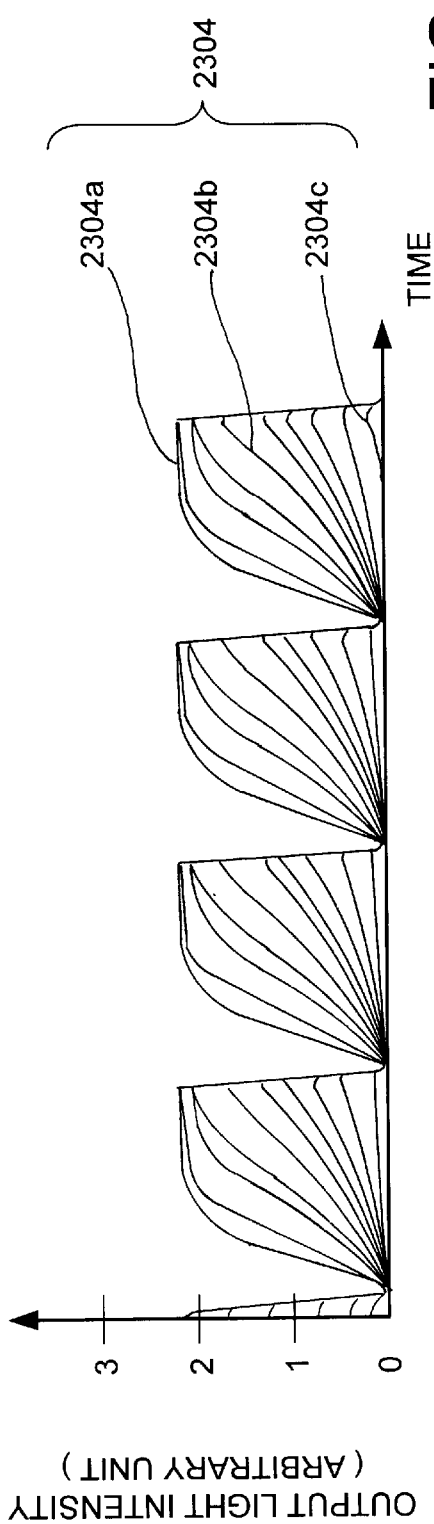
FIG. 23 shows a driving pulse waveform and the output light intensity corresponding thereto.
Figure 23B:
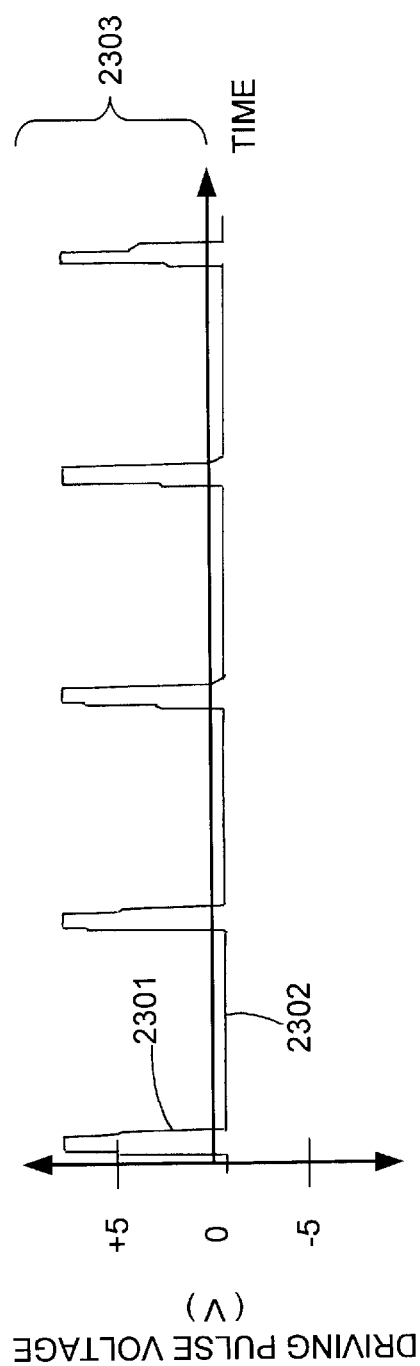

Next, in order to study the response characteristics of an SLM, the following experiments were conducted. A halogen lamp was used as the writing light source, instead of the CRT, and how the brightness of the reading light was changed for the intensity of the writing light was observed. In the experiment, in order to examine how liquid crystal molecules are switched for the driving signal (driving pulse), the waveform of the driving signal and the change of the reading light as a function of time were observed by the oscilloscope. The results were shown in FIG. 23. In FIG. 23, the timing chart (a) shows the variation of intensity of the output light from the SLM 717 when the SLM 717 shown in FIG. 7 is driven by the driving signal 2208 for writing light having various intensities. The driving signal 2208 is substantially the same as the driving signal in Example 10. In the timing chart (a) in FIG. 23, the characteristic curve 2304a indicates the case where the writing light having an intensity of 3000 $\mu$W/cm$^2$ is used, the characteristic curve 2304b indicates the case where the writing light having an intensity of 500 $\mu$W/cm$^2$ is used, and the characteristic curve 2304c indicates the case where the writing light is not used. It is apparent from the timing chart (a) of FIG. 23 that as the intensity of the writing light is increased, the output light intensity 2304 in the reading period of the reading pulse 2302 rises more steeply (i.e., more rapidly), and the time average of the reading light intensity becomes larger. In the timing chart (b) of FIG. 23, the driving signal (driving pulse voltage) 2303 includes an erasure pulse 2301 and a reading pulse 2302. It is apparent from the timing chart (b) that a photoelectric current which is in proportion to the writing light intensity is generated in the photoconductive layer in the reading period of the reading pulse 2302, and charges are accumulated at the interface between the photoconductive layer and the FLC layer. Then, the polarization of the liquid crystals is gradually inverted so as to meet the charge amount. As a result, the gray-scale display of SLM can be obtained.

In the same way, the measurement was performed by using the driving pulse voltage 2215. The obtained results are shown in FIG. 24. In the timing chart (a) of FIG. 24, the characteristic curve 2406a indicates the case where writing light having an intensity of 3000 $\mu$W/cm$^2$ is used, the characteristic curve 2406b indicates the case where writing light having an intensity of 500 $\mu$W/cm$^2$ is used, and the characteristic curve 2406c indicates the case where writing light is not used. In the timing chart (b) of FIG. 24, the driving signal (driving pulse voltage) 2405 includes an erasure pulse 2401, a first low voltage pulse 2402, a writing pulse 2403, and a second low voltage pulse 2404. FIG. 24 shows that the gray-scale display is obtained by changing the writing light intensity. When the writing pulse 2403 is applied to the SLM, the electric field switching occurs in the FLC of the SLM. In addition, it is seen that even in the case where the intensity of the writing light is 0, there occurs a slight peak of the output light intensity in the characteristic curve 2406c.

Figure 25:
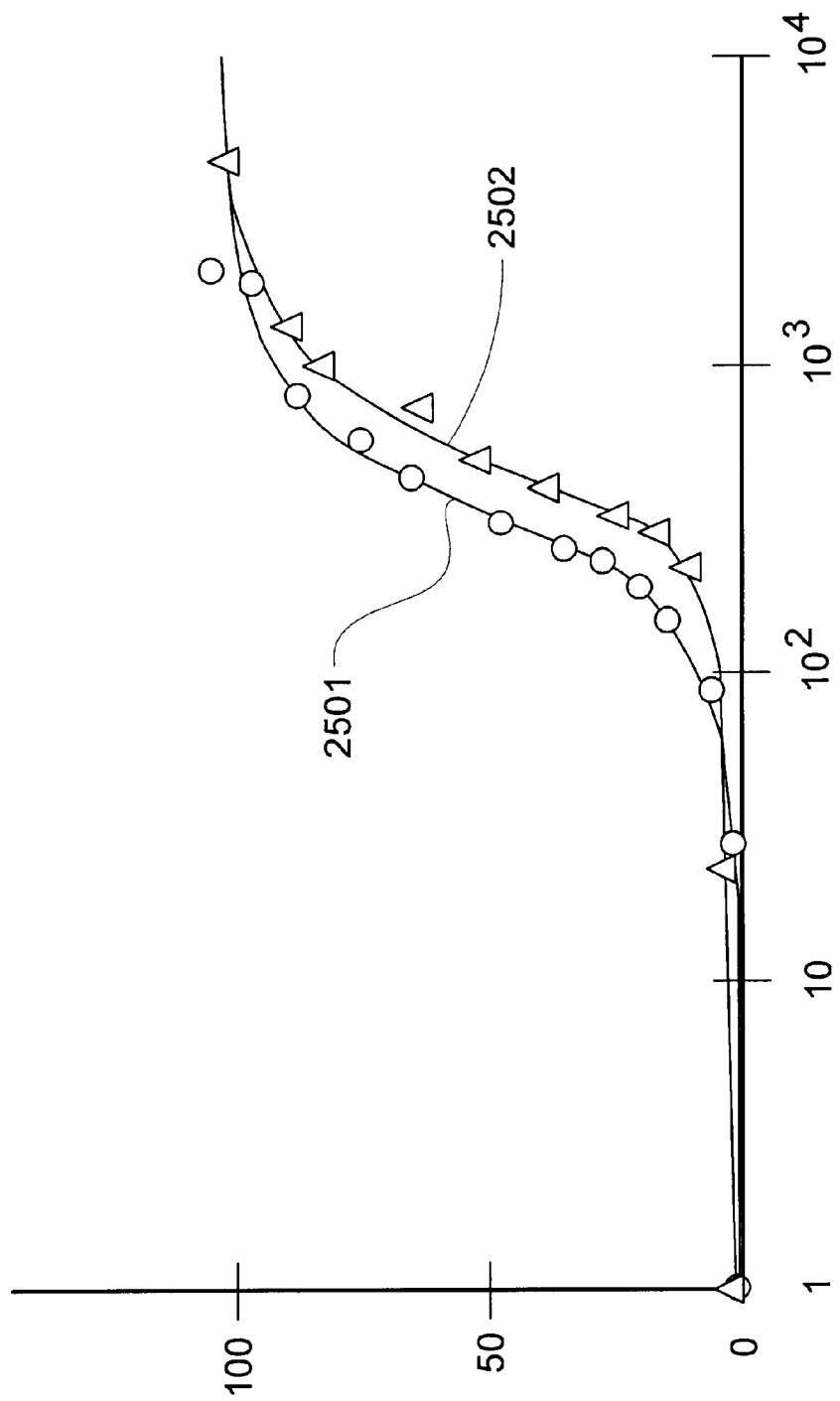
FIG. 25 shows the input/output light intensity characteristics of the SLM.
Figure 26A:
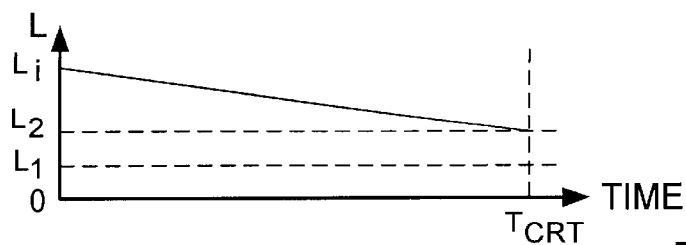
FIG. 26 shows the change of fluorescence intensity of a CRT as a function of time and shows waveforms for illustrating the relationship between two threshold values of the SLM.
Figure 26B:
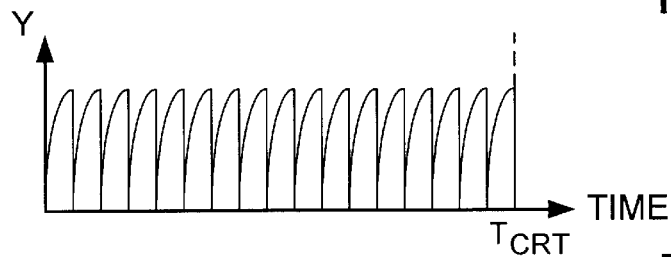
Figure 26C:
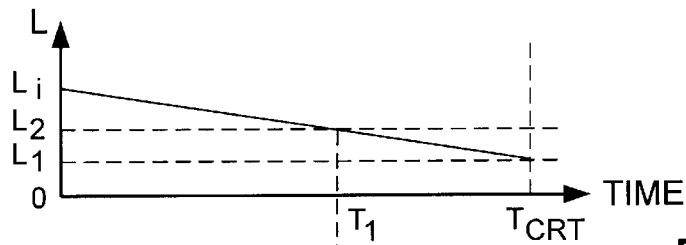
Figure 26D:
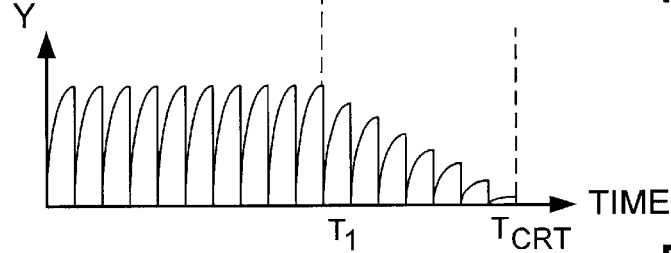
Figure 26E:
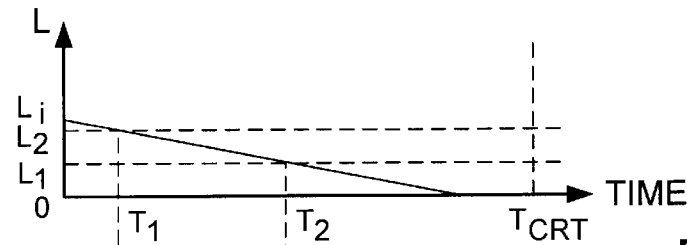
Figure 26F:
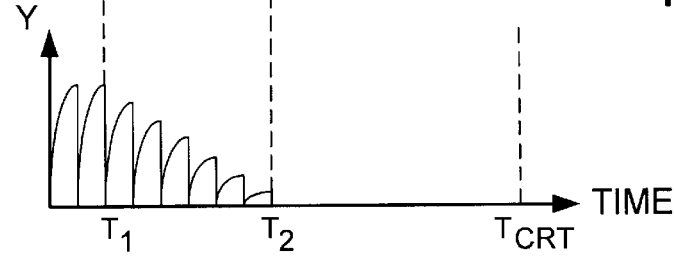

The time averages of output light intensities for the respective writing light intensities are calculated with respect to the above-described two driving methods. FIG. 25 shows the calculated results. In FIG. 25, the characteristic curve 2501 indicates the case where a driving signal without including a writing pulse in the unit driving signal, e.g., a driving signal 2207 shown in the timing chart (c) of FIG. 22 is used for driving the SLM. The other characteristic curve 2502 indicates the case where a driving signal with a writing pulse 2212 in the unit driving signal, e.g., a driving signal 2214 shown in the timing chart (e) of FIG. 22 is used for driving the SLM. In both of the driving methods, it is found that the gray-scale control can be performed in the writing light intensity range of 100 to 1000 $\mu W/cm^2$. In addition, it is found that below 100 $\mu W/cm^2$, the output light intensity is substantially 0, and over 1000 $\mu W/cm^2$ the output light intensity is saturated.

The contrast ratio of time averaged reading output light is calculated to be 530:1 for the driving pulse voltage 2208, and 320:1 for the driving pulse voltage 2215. Thus, the obtained contrast ratios are relatively good.

EXAMPLE 13

With regard to two types of driving signals (driving pulses), the reading was performed by the optical system shown in FIG. 19 without changing the pulse waveform and voltage value while changing the period for one cycle. In this way, the uniformity of the brightness of the output light from SLM was measured. An image with uniform brightness which was displayed on the CRT 1901 was written into the SLM 1902 having the construction shown in FIG. 7. For the output light 1909 from the SLM 1902, a ratio R of the brightness in the brightest portion to the brightness in the darkest portion was calculated. The ratio R was used as a criteria for judging the nonuniformity of the image brightness. The calculated results are shown in Table 2 below. In Table 2, $T_{SLM}$ denotes a period of a driving signal (driving pulse) for the SLM, and $T_{CRT}$ denotes one display period of the CRT. Also, $R_1$ and $R_2$ denote the ratios R in the cases where the driving signal (driving pulse) 2208 shown in the timing chart (c) in FIG. 22 and the driving signal (driving pulse) 2215 shown in the timing chart (e) are used for the driving, respectively. The period $T_{CRT}$ is fixed to be 16.7 msec.

TABLE 2

| $T_{SLM}$ (msec.) | $T_{CRT}/T_{SLM}$ | $R_1$ | $R_2$ |
|---|---|---|---|
| 0.00835 | 2000 | – | – |
| 0.0167 | 1000 | 1.0 | 1.0 |
| 0.167 | 100 | 1.0 | 1.0 |
| 1.67 | 10 | 1.1 | 1.1 |
| 8.35 | 2 | 1.2 | 1.3 |
| 11.1 | 1.5 | 2.1 | 2.0 |
| 16.7 | 1 | 11.3 | 12.7 |
| 33.4 | 0.5 | – | – |

From Table 2, it is found that the output light has substantially uniform intensity when the value of $T_{CRT}/T_{SLM}$ is in the range of 1.5 to 1000. If the value of $T_{CRT}/T_{SLM}$ exceeds 1000, the switching speed of the FLC in the SLM cannot follow the change of the driving pulse. As a result, the contrast of the reproduced image on the output face of the SLM is deteriorated. If the value of $T_{CRT}/T_{SLM}$ becomes smaller than 1, the flicker of the output light becomes noticeable. As a result, the quality of the image is deteriorated.

EXAMPLE 14

In the driving signal (driving pulse) 2208 shown in the timing chart (c) of FIG. 22, the length of the period of the erasure pulse 2205 was fixed to be 0.1 msec., and the length of the period of the reading pulse 2206 was fixed to be 1.1 msec. The voltages (heights) of these pulses were varied, so as to drive the SLM 717 having the construction shown in FIG. 7. In one specific example, the voltage of the erasure pulse 2205 was fixed to be 10 V, and the voltage of the reading period 2206 was varied in the range of −30 V to +2 V. There occurred no change in the quality of the image read out from the SLM. When the voltage of the reading pulse 2206 exceeds +2 V, the photoconductive layer did not generate photoelectric current in the reading period, so that the brightness of the output light was reduced. In another specific example, the voltage of the reading pulse 2206 was fixed to be −0.91 V, and the voltage of the erasure pulse 2205 was varied in the range of +2 V to +30 V. The quality of the image read out from the SLM did not vary so much. When the voltage of the erasure pulse 2205 was lowered to less than +2 V, the photoconductive layer of the SLM did not come into the forward condition, so that the contents recorded in the SLM (in more detail, in the respective pixels of the SLM) could not be properly erased. As a result, the contrast of the image was deteriorated.

EXAMPLE 15

In the driving signal (driving pulse voltage) shown in the timing chart (e) of FIG. 22, those used in Example 11 were used as the basic signal, and one of the voltage (heights) of the erasure pulse 2210, the writing pulse 2212 and the second low voltage pulse 2213 was varied, so as to drive the SLM 717 shown in FIG. 7. If the voltage of the erasure pulse 2210 was varied, for the same reasons described for the case of the driving signal (driving pulse voltage) in Example 14, an image with good quality was obtained on the output face of the SLM when the voltage of the erasure pulse 2210 was in the range of +2 V to +30 V. If the voltage of the writing pulse 2212 was varied, an image with good quality was obtained on the output face of the SLM when the voltage of the writing pulse 2212 was in the range of −30 V to −2 V. Even when the voltage exceeds −2 V, the image quality is good, but such a range is equivalent to that of the driving signal (driving pulse voltage) 2208 shown in the timing chart (c) of FIG. 22. Next, the voltage of the second low voltage pulse 2213 was changed. In this case, an image with good quality was obtained on the output face of the SLM in the range of −30 V to −2 V. This period corresponds to the reading period of the reading pulse 2206 in the driving signal 2208, so that it is thought that the proper operation can be attained only in the voltage range in which the photoconductive layer of the SLM generate a photoelectric current.

EXAMPLE 16

In each of Examples 10 to 15, in one frame 2202 of the timing chart (a) of FIG. 22, the waveform of the output light intensity 2209 or 2216 of the SLM shown in the timing chart (d) or (f) reproduces the fluorescence intensity 2204 from a phosphor on the CRT screen shown in the timing chart (b). Accordingly, even if the fluorescence intensity from a phosphor is the maximum, the response of the output light intensity 2209 or 2216 is decreased in the latter half of the frame 2202. This means that there arises a loss in brightness if the brightness is considered as the integration with respect to time. This example describes a driving method for solving such a problem and for enabling a gray-scale display, in detail.

Herein, it is assumed that the CRT rewrites the images at a frequency f (a period $T_{CRT}=1/f$). The ratio of the driving period $T_{CRT}$ of the CRT to the driving period $T_{SLM}$ of the SLM is represented by n. In other words, they have the following relationship:

$$T_{CRT}=n \times T_{SLM} \tag{47}$$

For simplicity, n is assumed to be an integer. The following time-averaged value of the output light intensity 2209 shown in the timing chart (d) of FIG. 22 is actually observed by the eyes of a person, as the output light intensity of the SLM.

$$Y=\{\Sigma Y_i\})/n \tag{48}$$

In Equation (48), $Y_i$ denotes the output light intensity in each writing period, and $Y_i$ is given by the relationship shown in FIG. 25 by using the output light L of the CRT in the unit driving signal (driving pulse) 2207 or 2214 as the writing light intensity.

The output light L of the CRT monotonously decreased as a function of time in one period. Accordingly, the output Y of the SLM in the period $T_{CRT}$ is changed in accordance with the relationship between the light output L(t) at the time t and the threshold values $L_1$ and $L_2$ (e.g., in the case where the driving is performed by the driving signal 2208, $L_1$=100 $\mu$W/cm$^2$ and $L_2$=1000 $\mu$W/cm$^2$ in FIG. 25). The variation of the output $Y_i$ when n=16 in Equation (47) is shown in FIG. 26. In FIG. 26, the timing chart (a) indicates the light output from the CRT when the light output L at the time t=$T_{CRT}$ is larger than the threshold value $L_2$, and the timing chart (b) indicates the intensity of the output light from the SLM in such a case. The timing chart (c) indicates the light output from the CRT in the case where L=$L_2$ at time t=$T_1$, and the light output L at time t=$T_{CRT}$ is larger than $L_1$. The timing chart (d) indicates the intensity of the output light from the SLM in such a case. The timing chart (e) indicates the light output from the CRT when L<$L_1$ at t=$T_2$, and the timing chart (f) indicates the intensity of the output light from the SLM in such a case. The change of L in each unit driving signal (driving pulse) 2207 is negligible.

As is expressed by Equation (48), the light output of the SLM is represented as the linear sum of the light pulse intensities $Y_i$ output for each driving period of the SLM. In this case, each pulse intensity $Y_i$ when L$\geq L_2$ can be approximated as being substantially constant. If each pulse intensity $Y_i$ when $L_1 \leq$L<$L_2$ can be divided into at least m scales in accordance with L, it is possible to easily realize at least n×m gray-scales by the above-described driving method of the invention. In the SLM having the construction shown in FIG. 6 or 7 which is actually produced in the experiment, the number of levels m into which $Y_i$ can be divided in accordance with L is as much as 90. Therefore, in order to realize 256 gray-scales, it is preferred to be at least n$\geq$3.

By using the driving pulse 2208, $T_{CRT}$ was set to be 16.7 msec., and $T_{SLM}$ was equal to $T_{CRT}$/16, i.e., 1.04 msec., so as to actually display an image. In the driving signal (driving pulse) 2208, the width of the erasure pulse was set to be 0.104 msec. and the voltage to be 15 V. The width of the writing pulse was set to be 0.936 msec. and the voltage to be −3.63 V. In these driving conditions, the response was the same as that shown in FIG. 25. Two threshold values $L_1$ and $L_2$ were actually calculated to be $L_1$=100 $\mu$W/cm$^2$, and $L_2$=800 $\mu$W/cm$^2$.

According to the driving method of the invention, it is necessary to carefully treat the residual image phenomenon which depends on the decay characteristics of the fluorescence (output L) of the CRT. For example, as is shown in the timing charts (a) and (b) in FIG. 26, when the brightest light output Y is to be obtained, L$\geq L_2$ at time t=$T_{CRT}$. Accordingly, if black is to be displayed in the next period ($T_{CRT} \geq t \geq 2T_{CRT}$), Y>0 since L>$L_1$. That is, if the first image display means (e.g., CRT) rewrites the image at 60 Hz, the actually observed image is not rewritten at 60 Hz, so that there occurs the residual image phenomenon. In order that the residual image cannot be observed by the eyes of a person, it is necessary to attenuate the light output L to be lower than $L_i$ after at least the time t=2$T_{CRT}$. In other words, it is necessary to use a phosphor with residual light characteristics by which the light amount of $L_2$ decays below $L_1$ within $T_{CRT}$.

The phosphor on the CRT used as the first image display means in this example has the characteristic shown by Equation (49):

$$L=L_i \exp(-t/\tau)(0 \geq t \geq T_{CRT}) \tag{49}$$

In Equation (49), $L_i$ denotes the initial value of the fluorescence intensity of the CRT, and $\tau$ denotes the decay time constant. In the phosphor used in this example, $\tau$=8 msec. Accordingly, at time t=$T_{CRT}$, L is 0.124 $L_i$, and at time t=$^2T_{CRT}$, L is 0.015 $L_i$. In the case where the brightest output Y is to be obtained, $L_i$ was set so as to satisfy the condition of 0.124 $L_i$=$L_2$=800 $\mu$W/cm$^2$. Thus, $L_i$ was set to be 6450 $\mu$W/cm$^2$. At this time, 0.015 $L_i$=97 $\mu$W/cm$^2$<$L_i$, so that the residual image could be suppressed to be minimum.

In order to reduce the initial light amount $L_i$, it is sufficient to increase $\tau$ and $L_1/L_2$. For example, it is assumed that $\tau$=440 msec. (i.e., it is assumed that L=0.103 $L_i$ at time t=1 s), the residual light at time t=$T_{CRT}$ was 0.963 $L_i$ and the residual light at time t=2 $T_{CRT}$ was 0.927 $L_i$. Accordingly, the initial light amount for obtaining the brightest output Y could be reduced to be $L_i$=11.4 $\mu$W/cm$^2$. In addition, by increasing the ratio of $L_1$ to $L_2$ of the SLM (in this case, $L_1/L_2$=0.963), the residual light can be suppressed to a minimum.

In this example, the case where the driving signal (driving pulse voltage) 2208 is used is mainly described. Alternatively, in the case of the driving signal (driving pulse voltage) 2215, the signal includes two threshold values as is shown in FIG. 25, so that the operation can be performed by the same method.

The invention provides a driving method for an SLM which can perform a gray-scale display with high contrast, uniformity and controllability, and which is stable for a long time use. A projection-type display adopting the driving method can obtain a faithful gray-scale display with good contrast. A holography television apparatus adopting the driving method can obtain a vivid three-dimensional image with reduced noise.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A spatial light modulator according to claim 1, wherein said photoconductive layer has rectification, and generates, when said photoconductive layer is in a reversed bias condition, a photoelectric current having a magnitude depending on an intensity of writing light incident on said photoconductive layer.

2. A spatial light modulator according to claim 1, wherein said light-modulating layer includes a ferroelectric liquid crystal layer which is sandwiched by two alignment films.

3. A spatial light modulator according to claim 2, wherein a specific resistance of said alignment films is in the range of $10^8$ $\Omega$·cm to $10^{11}$ $\Omega$·cm.

4. A driving method for a spatial light modulator,
wherein said spatial light modulator includes a pair of facing transparent electrodes, and a light-modulating layer and a photoconductive layer provided between said transparent electrodes, said light-modulating layer having different optical states depending on an applied charge amount, said light-modulating layer having: a first optical state when said applied charge amount is a first threshold charge amount or more; a second optical state then said applied charge amount is a second threshold charge amount or less; and a spatially uniform intermediate state between said first optical state and said second optical state depending on said applied charge amount,
wherein said photoconductive layer has rectification, and generates, when said photoconductive layer is in a reversed bias condition, a photoelectric current having a magnitude depending on an intensity of writing light incident on said photoconductive layer,
wherein one period of a waveform of a driving voltage includes an erasure period in which the photoconductive layer is in a forward bias condition and a charge amount larger than said first threshold charge amount is applied, and a writing period in which the photoconductive layer is in a reversed bias condition so as to generate a photoelectric current having a magnitude depending on an intensity of writing light, and
wherein said method includes a step of applying said driving voltage to said two transparent electrodes, so that in said writing period, said applied charge amount to said light-modulating layer is kept in the range of said first threshold charge amount or more when the intensity of said writing light is a first threshold light intensity or lower, and said applied charge amount to said light-modulating layer is reduced to said second threshold charge amount or less when the intensity of said writing light is a second threshold light intensity of higher.

5. A driving method according to claim 4, wherein said light-modulating layer includes a ferroelectric liquid crystal layer which is sandwiched by two alignment films, and
wherein conditions of:

$-V_{th} \leq (C_f V_e + C_a V_w)/(C_f + C_a) - V_d$, and $V_w - V_d \leq -V_{th}$ are satisfied, where $V_e$ denotes the maximum value of the driving voltage in said erasure period, $V_w$ denotes the minimum value of the driving voltage in said writing period, $C_f$ denotes a capacitance of said ferroelectric liquid crystal layer without polarization inversion of said ferroelectric liquid crystal layer, $C_a$ denotes a capacitance of said photoconductive layer, $V_d$ denotes a diffusion potential of said photoconductive layer, and $-V_{th}$ denotes a threshold voltage of said ferroelectric liquid crystal layer.

6. A driving method according to claim 5, wherein the driving voltage $V_e$ in said erasure period and the driving voltage $V_w$ in said writing period are respectively in the ranges of:

$1\ V \leq V_e \leq 40\ V$, and $-20\ V \leq V_w \leq 4\ V$.

7. A driving method according to claim 5, wherein said ferroelectric liquid crystal layer and said photoconductive layer are electrically in contact with each other via a metal reflection film which is divided and separated into minute portions.

8. A driving method according to claim 4, wherein one period of said driving voltage waveform for driving said spatial light modulator is shorter than one display period of an image formed by said writing light.

9. A driving method according to claim 8, wherein a ratio of one display period of an image formed by said writing light to one period of said driving voltage is in the range of 1.5 to 1000.

10. A driving method according to claim 8, wherein the output light intensity of said spatial light modulator with respect to the writing light intensities with said first threshold light intensity or lower of said spatial light modulator is substantially 0, the output light intensity with respect to the writing light intensities between said first threshold light intensity and said second threshold light intensity is increased as the writing light intensity is increased, and the output light intensity with respect to the writing light intensities which exceeds said second threshold light intensity has substantially no dependence on said writing light intensity.

11. A driving method according to claim 8, wherein the writing light intensity to said spatial light modulator is substantially monotonously decreased as a function of time in one display period of an image formed by said writing light, the maximum value of said writing light intensity directly prior to the end of said display period is said second threshold light intensity or higher, and said maximum value decays to be said first threshold light intensity or lower in a period in which an image is rewritten by said writing light.

12. A driving method according to claim 8, wherein said writing light is generated from a CRT.

13. A driving method according to claim 8, wherein the driving voltage applied in said erasure period is in the range of +2 V to +30 V by regarding a direction in which the photoconductive layer is forward-biased as a positive, and the driving voltage applied in said writing period is in the range of −30 V to +2 V.

14. A driving method according to claim 8, wherein one period of the driving voltage is constituted by a sequence of said erasure period, a first low voltage period, said writing period, and a second low voltage period.

15. A driving method according to claim 14, wherein said second low voltage period is longer than said first low voltage period.

16. A driving method according to claim 14, wherein the driving voltage applied in said erasure period is in the range of +2 V to +30 V by regarding a direction in which the photoconductive layer is forward-biased as a positive, the driving voltage applied in said writing period is in the range of −30 V to −2 V, and the driving voltage applied in the second low voltage period is in the range of −2 V to +2 V.

17. A driving method for a spatial light modulator,
wherein said spatial light modulator includes a pair of facing transparent electrodes, and a light-modulating layer and a photoconductive layer provided between said transparent electrodes, said light-modulating layer having different optical states depending on an applied charge amount, said light-modulating layer having: a first optical state when said applied charge amount is a first threshold charge amount or more; a second optical state when said applied charge amount is a second threshold charge amount or less; and a spatially uniform intermediate state between said first optical state and said second optical state depending on said applied charge amount, and
wherein said driving method includes the steps of:
applying a driving voltage to said two transparent electrodes;

irradiating said spatial light modulator with writing light;

measuring an output light intensity of said spatial light modulator with respect to at least one writing light intensity;

detecting a change of the output light intensity as a function of time; and performing a feedback to at least one of the writing light intensity and the driving voltage, in accordance with the detected change of the output light intensity, in order to keep a ratio of writing light intensity to output light intensity approximately constant.

18. A driving method according to claim 17, wherein said photoconductive layer has rectification, and generates, when said photoconductive layer is in a reversed bias condition, a photoelectric current having a magnitude depending on an intensity of writing light incident on said photoconductive layer, wherein one period of a waveform of a driving voltage includes an erasure period in which the photoconductive layer is in a forward bias condition and a charge amount larger than said first threshold charge amount is applied, and a writing period in which the photoconductive layer is in a reversed bias condition so as to generate a photoelectric current having a magnitude depending on an intensity of writing light, and wherein the driving voltage, in said writing period, keeps said applied charge amount to said light-modulating layer in the range of said first threshold charge amount or more when the intensity of said writing light is a first threshold light intensity or lower, and reduces said applied charge amount to said light-modulating layer to said second threshold charge amount or less when the intensity of said writing light is a second threshold light intensity of higher.

19. A driving method according to claim 18, wherein said light-modulating layer includes a ferroelectric liquid crystal layer which is sandwiched by two alignment films, wherein conditions of:

$$-V_{th} < (C_f V_e + C_a V_w)/(C_f + C_a) - V_d, \text{ and}$$

$$V_w - V_d \leq -V_{th}$$

are satisfied, where $V_e$ denotes the maximum value of the driving voltage in said erasure period, $V_w$ denotes the minimum value of the driving voltage in said writing period, $C_f$ denotes a capacitance of said ferroelectric liquid crystal layer without polarization inversion of said ferroelectric liquid crystal layer, $C_a$ denotes a capacitance of said photoconductive layer, $V_d$ denotes a diffusion potential of said photoconductive layer, and $-V_{th}$ denotes a threshold voltage of said ferroelectric liquid crystal layer, wherein said driving method includes a step of keeping values of $L_1$ and $L_s$ constant by changing at least one of $V_e$, $V_w$, $T_w$ and $\tau$, said values of $L_1$ and $L_s$ being defined by $$L_1 = (h\nu/\eta e)(C_f + C_a)(V_{f0} + V_{th})/T_w \tau,$$

$$L_s = (h\nu/\eta e)(2P_s/T_w \tau), \text{ and}$$

$$V_{f0} = (C_f V_e + C_a V_w)/(C_f + C_a) - V_d,$$

where $T_w$ denotes a width of said writing period, $\tau$ denotes a ratio (utilization efficiency) of an intensity of light actually incident on said photoconductive layer to the intensity of said writing light, $h\nu$ denotes a photon energy of said writing light, $\eta$ denotes a quantum efficiency of said photoconductive layer, e denotes an electron charge, and $P_s$ denotes a magnitude of spontaneous polarization.

20. A driving method according to claim 19, wherein said ferroelectric liquid crystal layer and said photoconductive layer are electrically in contact with each other via a metal reflection film which is divided and separated into minute portions.

21. A driving method according to claim 18, further comprising the steps of:

measuring changes $dY_A$ and $dY_B$ in output light intensities of said spatial light modulator as a function of time with respect to two different writing light intensities $L=L_A$ and $L=L_B$;

obtaining changes $dL_1$ and $dL_s$ of $L_1$ and $L_s$ by using equations of $$dL_1 = [(\partial Y/\partial L_s)_{L=L_B} \cdot dY_A - (\partial Y/\partial L_s)_{L=L_A} \cdot dY_B]/\Delta,$$

$$dL_s = [-(\partial Y/\partial L_1)_{L=L_B} \cdot dY_A + (\partial Y/\partial L_1)_{L=L_A} \cdot dY_B]/\Delta, \text{ and}$$

$$\Delta = (\partial Y/\partial L_1)_{L=L_A} \cdot (\partial Y/\partial L_s)_{L=L_B} - (\partial Y/\partial L_s)_{L=L_A} \cdot (\partial Y/\partial L_1)_{L=L_B}; \text{ and}$$

changing $V_e$, $V_w$, $T_w$ and $\tau$ by amounts equal to $dV_e$, $dV_w$, $dT_w$ and $d\tau$, respectively, so as to satisfy relationships of $$-dL_1 = (\partial L_1/\partial V_e)dV_e + (\partial L_1/\partial V_w)dV_w + (\partial L_1/\partial T_w)dT_w + (\partial L_1/\partial \tau)d\tau, \text{ and}$$

$$-dL_s = (\partial L_s/\partial T_w)dT_w + (\partial L_s/\partial \tau)d\tau$$

where $V_e$ denotes the maximum value of the driving voltage in said erasure period, $V_w$ denotes the minimum value of the driving voltage in said writing period, $T_w$ denotes a width of said writing period, and $\tau$ denotes a ratio (utilization efficiency) of an intensity of light actually incident on said photoconductive layer to the intensity of said writing light.

22. A driving method according to claim 18, further comprising the steps of:

measuring changes $dY_A$ and $dY_B$ in output light intensities of said spatial light modulator as a function of time with respect to two different writing light intensities $L=L_A$ and $L=L_B$;

obtaining changes $dL_1$ and $dL_s$ of $L_1$ and $L_s$ by using equations of $$dL_1 = [(\partial Y/\partial L_s)_{L=L_B} \cdot dY_A - (\partial Y/\partial L_s)_{L=L_A} \cdot dY_B]/\Delta,$$

$$dL_s = [-(\partial Y/\partial L_1)_{L=L_B} \cdot dY_A + (\partial Y/\partial L_1)_{L=L_A} \cdot dY_B]/\Delta, \text{ and}$$

$$\Delta = (\partial Y/\partial L_1)_{L=L_A} \cdot (\partial Y/\partial L_s)_{L=L_B} - (\partial Y/\partial L_s)_{L=L_A} \cdot (\partial Y/\partial L_1)_{L=L_B}; \text{ and}$$

changing $V_e$, $V_w$, $T_w$ and $\tau$ by amounts equal to $dV_e$, $dV_w$, $dT_w$ and $d\tau$, respectively, so as to satisfy relationships of:

$$dV_e = 0,$$

$$dV_w = [(\partial L_1/\partial T_w)dL_s - (\partial L_s/\partial T_w)dL_1]/[(\partial L_1/\partial V_w)(\partial L_s/\partial T_w)],$$

$$dT_w = -(\partial L_s/\partial T_w)^{-1} dL_s, \text{ and}$$

$$d\tau = 0$$

where $V_e$ denotes the maximum value of the driving voltage in said erasure period, $V_w$ denotes the minimum value of the driving voltage in said writing period, $T_w$ denotes a width of said writing period, and τ denotes a ratio (utilization efficiency) of an intensity of light actually incident on said photoconductive layer to the intensity of said writing light.

23. A driving method according to claim 18, further comprising the steps of:

measuring changes $dY_A$ and $dY_B$ in output light intensities of said spatial light modulator as a function of time with respect to two different writing light intensities $L=L_A$ and $L=L_B$;

obtaining changes $dL_1$ and $dL_s$ of $L_1$ and $L_s$ by using equations of $$dL_1 = [(\partial Y/\partial L_s)_{L=L_B} \cdot dY_A - (\partial Y/\partial L_s)_{L=L_A} \cdot dY_B]/\Delta,$$

$$dL_s = [-(\partial Y/\partial L_s)_{L=L_B} \cdot dY_A + (\partial Y/\partial L_s)_{L=L_A} \cdot dY_B]/\Delta, \text{ and}$$

$$\Delta = (\partial Y/\partial L_1)_{L=L_A} \cdot (\partial Y/\partial L_s)_{L=L_B} - (\partial Y/\partial L_s)_{L=L_A} \cdot (\partial Y/\partial L_1)_{L=L_B}; \text{ and}$$

changing $V_e$, $V_w$, $T_w$ and τ by amounts equal to $dV_e$, $dV_w$, $dT_w$ and dτ, respectively, so as to satisfy relationships of $$dV_e = 0,$$

$$dV_w = [(\partial L_1/\partial \tau)dL_s - (\partial L_s/\partial \tau)dL_1]/[(\partial L_1/\partial V_w)(\partial L_s/\partial \tau)],$$

$$dT_w = 0, \text{ and}$$

$$d\tau = -(\partial L_s/\partial \tau)^{-1} dL_s$$

where $V_e$ denotes the maximum value of the driving voltage in said erasure period, $V_w$ denotes the minimum value of the driving voltage in said writing period, $T_w$ denotes a width of said writing period, and τ denotes a ratio (utilization efficiency) of an intensity of light actually incident on said photoconductive layer to the intensity of said writing light.

24. A driving method according to claim 18, comprising a step of measuring output light intensities of said spatial light modulator with respect to three or more different writing light intensities.

25. A driving method according to claim 18, further comprising the steps of:

irradiating said spatial light modulator with said writing light via an image presentation portion and an intensity modulating portion which modulates an intensity of an image presented on said image presentation portion; and performing a feedback to a transmittance of said intensity modulating portion, in accordance with a change of the output light intensity as a function of time.

26. A driving method according to claim 18, wherein said writing light is generated from a CRT, and said driving method comprises a step of performing a feedback to an electron beam current value of said CRT in accordance with the change of the output light intensity as a function of time.

27. A driving method according to claim 18, wherein the measurement of the output light intensities of said spatial light modulator is performed directly after the output side of said spatial light modulator.

28. A spatial light modulating apparatus comprising:

a spatial light modulator including a light-modulating layer and a photoconductive layer provided between two facing transparent electrodes, said light-modulating layer having different optical states depending on an applied charge amount, said light-modulating layer having: a first optical state when said applied charge amount is a first threshold charge amount or more; a second optical state when said applied charge amount is a second threshold charge amount or less; and a spatially uniform intermediate state between said first optical state and said second optical state depending on said applied charge amount;

means for applying a driving voltage to said two transparent electrodes;

means for irradiating said spatial light modulator with writing light;

means for measuring an output light intensity of said spatial light modulator with respect to at least one writing light intensity;

means for detecting a change of the output light intensity as a function of time with respect to said at least one writing light intensity; and means for performing a feedback to at least one of the writing light intensity and the driving voltage in accordance with the detected change of the output light intensity in order to keep a ratio of writing light intensity to output light intensity approximately constant.

29. A liquid crystal device including a ferroelectric liquid crystal layer sandwiched by two opposing alignment films, and means for applying charges to said ferroelectric liquid crystal layer whereby said ferroelectric liquid crystal layer exhibits a spatially uniform intermediate state between bistable states, wherein a specific resistance of said alignment films is in the range of $10^8$ Ω·cm to $10^{11}$ Ω·cm.

* * * * *